(12) United States Patent
Ide

(10) Patent No.: US 8,310,607 B2
(45) Date of Patent: Nov. 13, 2012

(54) LIQUID CRYSTAL OPTICAL MODULATION ELEMENT, LIQUID CRYSTAL OPTICAL MODULATION DEVICE AND METHOD FOR DRIVING LIQUID CRYSTAL OPTICAL MODULATION ELEMENT

(75) Inventor: Masafumi Ide, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 471 days.

(21) Appl. No.: 12/515,186

(22) PCT Filed: Nov. 12, 2007

(86) PCT No.: PCT/JP2007/071904
§ 371 (c)(1),
(2), (4) Date: May 15, 2009

(87) PCT Pub. No.: WO2008/059787
PCT Pub. Date: May 22, 2008

(65) Prior Publication Data
US 2009/0244415 A1    Oct. 1, 2009

(30) Foreign Application Priority Data
Nov. 15, 2006 (JP) .................... 2006-309261

(51) Int. Cl.
*G02F 1/133*    (2006.01)
(52) U.S. Cl. ................ 349/33; 349/18; 349/24; 349/25; 349/31; 349/34
(58) Field of Classification Search .............. 349/18, 349/24, 25, 31, 33, 34, 37
See application file for complete search history.

(56) References Cited

U.S. PATENT DOCUMENTS

| | | | |
|---|---|---|---|
| 5,151,814 A | 9/1992 | Grinberg et al. | |
| 5,930,012 A * | 7/1999 | Mears et al. | 359/15 |
| 6,469,822 B1 | 10/2002 | Zhu | |
| 6,538,791 B2 * | 3/2003 | Trezza | 359/237 |
| 6,643,054 B1 | 11/2003 | Weidlich | |
| 2003/0179426 A1 | 9/2003 | Ide | |
| 2006/0067611 A1 | 3/2006 | Frisken et al. | |

(Continued)

FOREIGN PATENT DOCUMENTS
EP    1465004 A1    10/2004
(Continued)

OTHER PUBLICATIONS

Communication pursuant to Rule 70(2) and 70a(2) EPC dated Aug. 10, 2010, issued in corresponding European Patent Application No. 07831634.6.

(Continued)

*Primary Examiner* — Jennifer Doan
(74) *Attorney, Agent, or Firm* — Westerman, Hattori, Daniels & Adrian, LLP

(57) ABSTRACT

A liquid crystal spatial light modulator for adjusting an optical signal is configured in such a manner that a region of one element is partitioned into two regions so as to perform intensity modulation in one region and phase modulation in the other region. Since the region for performing the intensity modulation and the region for performing the phase modulation can be formed by partitioning one region of the liquid crystal spatial light modulator, only one element allows adjusting functions, both the optical signal intensity modulation and phase modulation.

18 Claims, 38 Drawing Sheets

U.S. PATENT DOCUMENTS

2006/0076711 A1    4/2006    Rossanese et al.

FOREIGN PATENT DOCUMENTS

| | | |
|---|---|---|
| FR | 2541784 A1 | 8/1984 |
| GB | 2250605 A | 6/1992 |
| GB | 2405521 A | 3/2005 |
| JP | 6-51340 A | 2/1994 |
| JP | 2002-244167 A | 8/2002 |
| JP | 2003-172912 A | 6/2003 |
| JP | 2003-295153 A | 10/2003 |
| JP | 2005-070439 A | 3/2005 |
| WO | 02/19018 A1 | 3/2002 |
| WO | 02/29774 A2 | 4/2002 |

OTHER PUBLICATIONS

European Search Report dated Jun. 22, 2010, issued in corresponding European Application No. 07831634.6.

Notification of Transmittal of Translation of the International Preliminary Report on Patentability (Form PCT/IB/338) of International Application PCT/JP2007/071904 mailed Jun. 4, 2009 with Forms PCT/IB/373 and PCT/ISA/237.

K. M. Iffekharuddin et al. "Operation of liquid-crystal displays for optical computing," Proceedings of SPIE; vol. 5907; Aug. 2005; cited in ISR.

J. A. Davis et al. "Encoding Amplitude Information onto Phase-Only Filters," Applied Optics; vol. 38; No. 23; Aug. 10, 1999; pp. 5004-5013, cited in ISR.

International Search Report of PCT/JP2007/071904; date of mailing Mar. 11, 2008.

European Office Action dated Sep. 5, 2011, issued in corresponding European Patent Application No. 07831634.6.

Jeffrey A. Davis et al., "Encoding amplitude information onto phase-only filters", Applied Optics, vol. 38, No. 23, Aug. 10, 1999, pp. 5004-5013. Cited in Office Action of Feb. 6, 2012, issued in corresponding Japanese Patent Application No. 2006-309261.

Notification of Reasons for Refusal dated Feb. 6, 2012, issued in corresponding Japanese Patent Application No. 2006-309261. English Translation.

\* cited by examiner

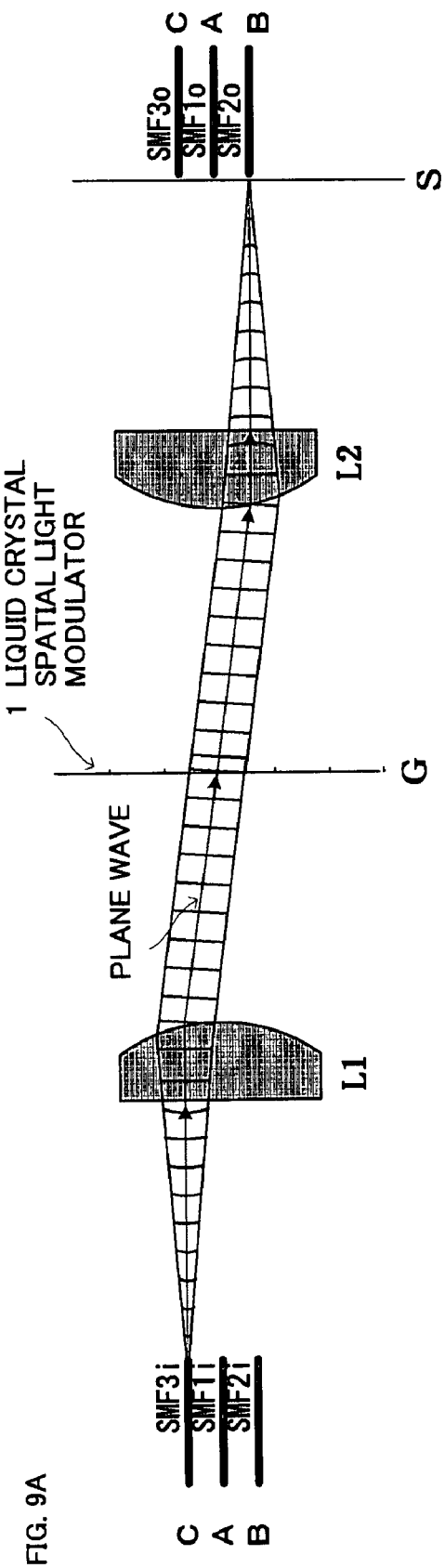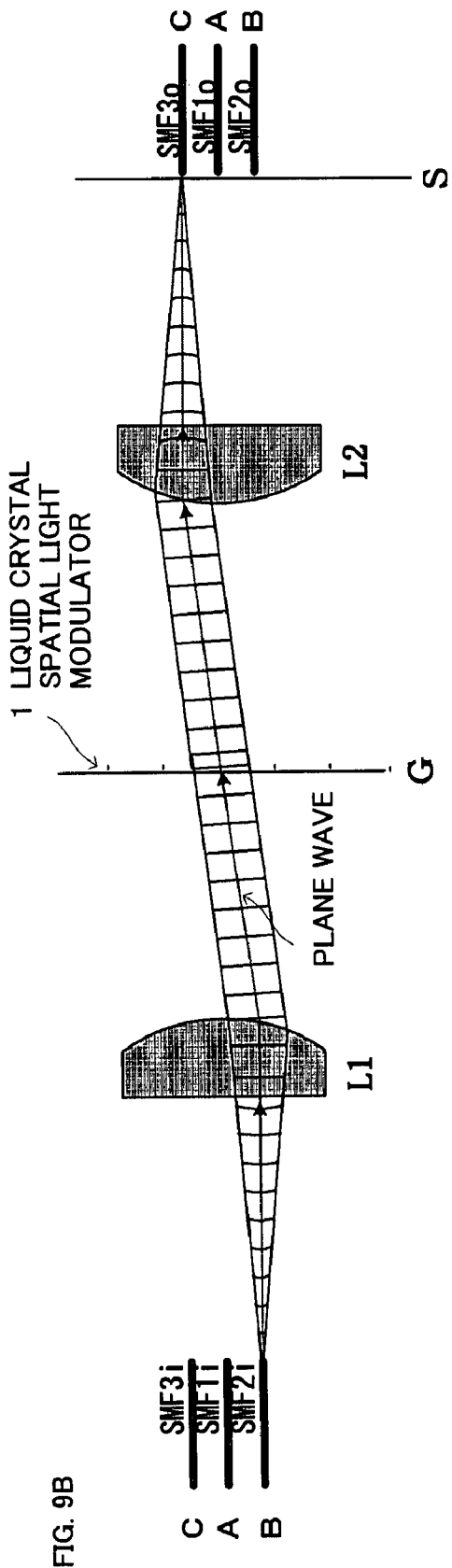

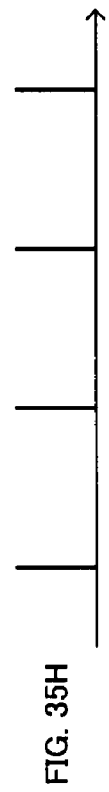
FIG. 35H
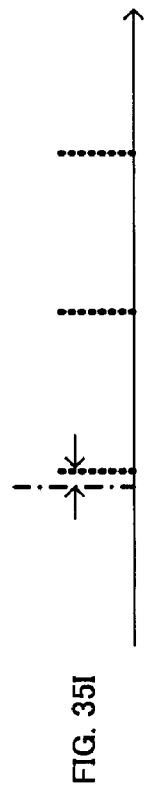
FIG. 35I
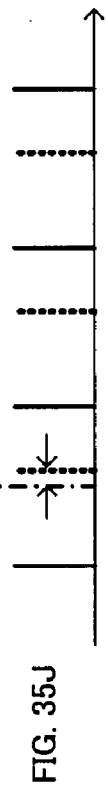
FIG. 35J
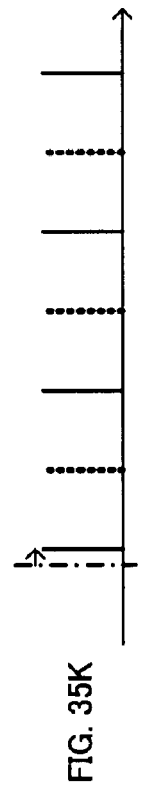
FIG. 35K
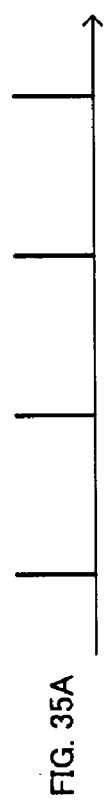
FIG. 35A
FIG. 35B
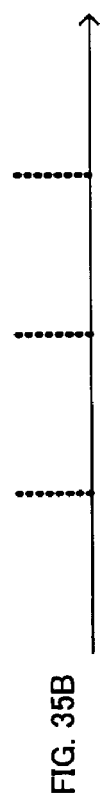
FIG. 35C
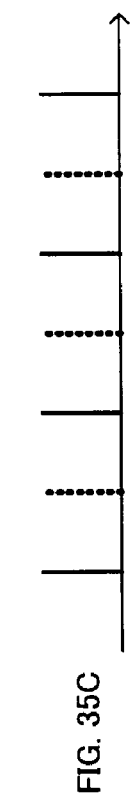
FIG. 35D
FIG. 35E
FIG. 35F
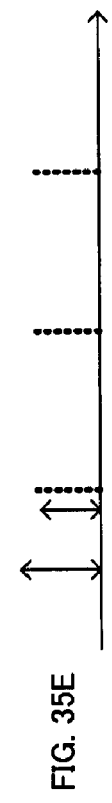
FIG. 35G

LIQUID CRYSTAL OPTICAL MODULATION ELEMENT, LIQUID CRYSTAL OPTICAL MODULATION DEVICE AND METHOD FOR DRIVING LIQUID CRYSTAL OPTICAL MODULATION ELEMENT

TECHNICAL FIELD

The present invention relates to a liquid crystal spatial light modulator, a liquid crystal spatial light modulator module provided with the liquid crystal spatial light modulator, and a method for driving the liquid crystal spatial light modulator constituting the liquid crystal spatial light modulator module.

BACKGROUND ART

In optical communications, an optical clock multiplexer is used for multiplying a low-rate optical clock signal in an optical time division multiplexing (OTDM) system. By way of example, optical carrier wave pulses of 10 GHz are divided into two systems, and the optical carrier wave pulses of the respective systems are modulated according to data signals of 10 Gigabit/Second, for instance. One pulse wave of these modulated carrier waves is given a phase difference of half cycle (p) relative to the other pulse wave of the modulated carrier waves, and thereafter, these modulated carrier wave pulses are synthesized. According to such interleave processing, for example, an optical signal of 10 GHz is sent out as an optical signal of 20 Gigabit/Second.

In recent years, an optical clock (carrier wave) over 160 Gigabit/Second is coming to be considered, which is used for the optical time division multiplexing. Followings are extremely important as constituent elements of the optical clock multiplexer that is used in high-rate clock synthesis for the ultrafast optical time division multiplexing; smoothing of clock signal intensity after the synthesis, and equally spacing of clocks by correcting minor phase shifting that is caused by a change of temperature of the clock multiplexer main unit and externally connected equipment. Therefore, it becomes necessary to correct a peak value and a phase of the optical clock by using a spatial light modulator module.

FIG. 36 is an illustration to explain a configuration example which implements the optical clock multiplexer used for the optical time division multiplexing. In the configuration example as shown in FIG. 36, the optical clock multiplexer 100 is provided with an input port 102 and an output port 103. Optical signals inputted from the input port 102 are separated by an optical coupler/spectrometer 104. Some optical signals being separated are modulated by a light modulator 101, and the other optical signals are allowed to go through a fixed delay element 106, in which a delay time is fixed, and then both optical signals are coupled by the optical coupler/spectrometer 105. The optical signals coupled by the optical coupler/spectrometer 105 are outputted from the output port 103. Here in the light modulator 101, intensity of the optical signals and phase amount thereof are adjusted, thereby multiplying the optical clock that is used for the optical time division multiplexing.

FIG. 37 shows one example of the light modulator used for wavelength division multiplexing which employs liquid crystal elements. Patent document 1 is known as a disclosure of this type of light modulator, for instance. This light modulator is applied to R-OADM (Reconfigurable Add/Drop Multiplexer). It is to be noted that FIG. 37 illustrates a reflection type configuration example, wherein FIG. 37A shows the z-y plane, and FIG. 37B shows the x-z plane.

In the light modulator 200, a spectrometer 202 (a diffraction grating in this example) and an OPMC (optical phased matrix coupling) 203 are arranged on an optical path which is connected to an input/output port 201 for inputting an input signal beam including multiple wave lengths and for outputting an output signal beam, through cylindrical lenses 211, 212, and 213 which are prepared for forming parallel light.

[Patent Document 1]
US Unexamined Patent Application Publication No. 2006/0067611A1

[Patent Document 2]
Japanese Unexamined Patent Application Publication No. 6-51340 (paragraph 0010, 0017, and 0018)

DISCLOSURE OF THE INVENTION

Problem to be Solved by the Invention

In recent years, it is demanded that an optical signal is subjected to phase modulation along with intensity modulation, because it is necessary to handle a high-rate optical pulse clock such as 160 Gigabit/Second in order to make the best use of an available wide bandwidth of an optical fiber, in an optical time division multiplexing system, and in a hybrid transmission system which incorporates a wavelength division multiplexing and the optical time division multiplexing system.

As for the light modulator as disclosed in the aforementioned patent document 1, intensity modulation is explained mainly. In paragraph 0095 of the patent document 1, it is disclosed that only a phase is adjusted, or both the phase and optical intensity are adjusted by the LCOS (liquid crystal on silicon). In the disclosure, however, only a configuration for the intensity modulation is described. Therefore, as for the phase modulation, it is assumed that another liquid crystal device is prepared separately.

In the conventional light modulator, the intensity modulation and the phase modulation of an optical signal are performed respectively in individual adjusting devices.

For instance, the patent document 2 discloses individually, configuration examples of modulation elements incorporated in an optically addressed spatial light modulator, an example of a phase modulation element using a liquid crystal, and an example of an intensity modulation element using the liquid crystal, which combines the phase modulation element with a polarizer. FIG. 38 schematically illustrates a configuration example of the light modulator as disclosed in the patent document 2, and it is a schematic illustration for explaining the configuration example of the optically addressed spatial light modulator.

In FIG. 38, the optically addressed spatial light modulator 300 incorporates a light modulator (SLM) 301 made up of a phase modulation element optically addressable, and a compensator 302 made up of a phase modulation element which allows the voltage being applied to compensate the phase of all over a significant surface, and those components are arranged on an optical path of readout light. The light modulator (SLM) 301 adjusts a phase pattern of the readout light by using the addressed light, and the compensator 302 adjusts the overall phase of the readout light. Light being phase-modulated is outputted via the polarizer 203, in a form of intensity modulated light according to a write pattern of the addressed light. Here, the light modulator (SLM) 301 and the compensator 302 are configured respectively in individual units, with a liquid crystal orientation being aligned, and these units are arranged on the optical path.

As thus described, it is configured as the following; in order to modulate the intensity of an optical signal in the light modulator, individual modulation elements are prepared being independent of each other, respectively for the phase element for writing a light pattern according to the addressed light, and for an element to perform overall phase-modulation, these modulation elements being sequentially arranged on the optical path, and thereafter the polarizer converts the phase modulation amount into intensity modulation.

Accordingly, since conversion into the intensity modulation can be performed by using the phase modulation element, it is possible to consider a configuration in which a phase modulation element for performing the phase modulation and an intensity modulation element having the same structure as the phase modulation element, further combined with a polarizer, are prepared independently, and these elements are arranged sequentially on the optical path. For this case, there is a problem that these elements need to be prepared individually for achieving the respective functions (intensity modulation and phase modulation). In the aforementioned configuration where the intensity modulation element for achieving the intensity modulating function and the phase modulation element for achieving the phase modulating function are individually provided and those elements are arranged on the optical path, there is a problem that the number of elements is increased. In addition, there are further problems that attenuation of signal intensity caused by connecting each of these elements to the optical path, and complicated phase shifting and so forth are more likely to occur, when the intensity modulating operation is performed.

Therefore, in the light modulator which requires both the intensity modulation and the phase modulation of optical signals simultaneously, it is desirable that one element is capable of controlling both of these adjusting functions independently.

In view of the situation above, an object of the present invention is to solve the aforementioned problems and to achieve adjusting functions, allowing one element to perform both the intensity modulation and the phase modulation of an optical signal, in a liquid crystal spatial light modulator, in a liquid crystal spatial light modulator module, and in a method for driving the liquid crystal spatial light modulator.

Means to Solve the Problem

The present invention is directed to a liquid crystal spatial light modulator for adjusting an optical signal, having a configuration that a region in one element is partitioned into at least two regions, and intensity modulation is performed in one region, and phase modulation is performed in the other region. With this configuration, the region for performing the intensity modulation and the region for performing the phase modulation can be formed by partitioning the region of one liquid crystal spatial light modulator into two regions, and therefore it is possible to fulfill both of the adjusting functions in one element, the intensity modulation and the phase modulation of the optical signal, independently.

In addition to the first aspect of voltage application as described above, the present invention may also include another voltage application as a second aspect. The second aspect of voltage application has a configuration that in the liquid crystal spatial light modulator for adjusting the optical signal, a bias potential is formed in addition to a gradient potential within a liquid crystal layer of one element. In this configuration, application of the gradient potential modulates a coupling coefficient on the light outputting side, thereby performing the intensity modulation, and application of the bias potential performs the phase modulation. With this configuration, the intensity modulation and the phase modulation can be performed by adjusting voltage distribution within the liquid crystal layer of one liquid crystal spatial light modulator, and therefore it is possible for one element to fulfill both adjusting functions; the intensity modulation and the phase modulation of the optical signal.

According to the present invention, in any of the first aspect and the second aspect of voltage application, it is possible for one element to fulfill both adjusting functions; the intensity modulation and the phase modulation of the optical signal.

The present invention may be directed to more than one embodiment, such as a liquid crystal spatial light modulator, a liquid crystal spatial light modulator module incorporating this liquid crystal spatial light modulator, and a method for driving the liquid crystal spatial light modulator. In addition, any of the first aspect of voltage application and the second aspect of voltage application is applicable in each of the above embodiments; the former applies voltage to the two regions, and the latter adds a bias potential.

The liquid crystal spatial light modulator according to the present invention is provided with a first substrate having multiple individual electrodes, a second substrate having a common electrode, and a liquid crystal layer held between the first substrate and the second substrate.

This liquid crystal spatial light modulator may have a configuration of a reflection type liquid crystal spatial light modulator to reflect outgoing light toward an incident light side, and a configuration of a transmission type liquid crystal spatial light modulator for outputting the light without changing the outgoing direction.

The reflection type liquid crystal spatial light modulator has a transparent substrate as a first substrate and an opaque substrate as a second substrate. The second opaque substrate is used as a reflective surface to reflect the light incident from the first substrate by the second substrate, thereby allowing the light incident from the first substrate to go and return through the liquid crystal layer and to be outputted from the first substrate, and the intensity modulation and the phase modulation are performed while the incident light goes and returns through the liquid crystal layer.

Another aspect of the reflection type liquid crystal spatial light modulator has an opaque substrate as the first substrate and a transparent substrate as the second substrate. The first substrate is used as a reflective surface to reflect the light incident from the second substrate by the first substrate, thereby allowing the light incident from the second substrate to go and return through the liquid crystal layer and to be outputted from the second substrate, and the intensity modulation and the phase modulation are performed while the incident light goes and returns through the liquid crystal layer.

The transmission type liquid crystal spatial light modulator has a transparent substrate as the first substrate and a transparent substrate as the second substrate. Light incident from the first substrate is transmitted through the liquid crystal layer and thereafter outputted from the second substrate, thereby performing the intensity modulation and the phase modulation while the incident light is transmitted through the liquid crystal layer.

The liquid crystal spatial light modulator of the present invention applies a certain voltage to each of the individual electrodes formed on the first substrate and modulates a refractive index of the liquid crystal layer, thereby performing spatial light modulation. Here, the electrodes formed on the first substrate are segmented into at least two regions, a mode for applying voltage in one region is made different from another, so that intensity modulation of light is performed in the first region, and phase modulation of light is performed in the second region. Consequently, one element is allowed to perform both the intensity modulation and the phase modulation.

Gradient voltage is applied to the first region, and according to the application of the gradient voltage, a gradient is formed in an effective phase difference within the liquid crystal layer of the first region. When the gradient is formed in the effective phase difference within the liquid crystal layer of the first region, phase shifting of outgoing light occurs within the region, causing a variation in time taken for the optical signal to move through the liquid crystal layer. Therefore, when a wavefront incident in parallel with the incident light surface of the liquid crystal spatial light modulator is outputted from the light output surface, a direction in which the wavefront proceeds is changed, thereby altering a traveling direction of the outgoing light. With the change of the traveling direction of the outgoing light, a coupling coefficient for an optical coupling system provided on the outputting side becomes smaller. Therefore, light intensity of the outgoing light is attenuated relative to the intensity of the incident light, and therefore intensity modulation of optical signals is performed.

On the other hand, a predetermined constant voltage is applied to all over the second region, and with the application of this constant voltage, a homogeneous effective phase difference is formed within the liquid crystal layer of the region. The effective phase difference formed in the liquid crystal layer for performing phase modulation of the outgoing light controls a moving time or a phase of the light passing through the liquid crystal layer, thereby varying a light delay time which is outputted from the outgoing surface. Accordingly, the phase modulation of the outgoing light is performed.

It is to be noted that as to a maximum phase difference fmax of the effective phase difference within the liquid crystal layer, there is a relationship of fmax=2p, when the maximum light wavelength is $\lambda$max which is used by the light being subjected to the spatial light modulation. With the relationship above, the phase modulation for at least one wavelength is possible while the light passes through the liquid crystal layer. In addition, in the intensity modulation by the gradient potential, there is a periodicity for the phase difference over one wavelength. Therefore, resetting every one wavelength allows adjustment of the phase corresponding to multiple wavelengths.

It is to be noted that there is a relationship of fmax=2p, when the light is transmitted through the liquid crystal layer. On the other hand, when the light goes and returns through the same liquid crystal layer in the liquid crystal element having a reflection type configuration, it is possible to establish a relationship of fmax=p.

When the maximum thickness of the liquid crystal layer is assumed as dmax, the aforementioned relationship of fmax=2p can be expressed as dmax>$\lambda$max/$\Delta$nmax, according to the relationship of f=2p$\Delta$n·d/$\lambda$. It is to be noted that $\Delta$n represents an effective birefringence of liquid crystal, $\Delta$nmax represents a maximum effective birefringence, $\lambda$ represents a wavelength, and $\lambda$max represents the maximum usable light wavelength. Therefore, according to the maximum effective birefringence $\Delta$nmax of the liquid crystal constituting the liquid crystal device, and the maximum usable light wavelength $\lambda$max, thickness "d" of the liquid crystal layer can be determined.

In the second aspect of voltage application, the liquid crystal spatial light modulator of the present invention has a configuration provided with a first substrate having multiple individual electrodes, a second substrate having a common electrode, and a liquid crystal layer held between the first substrate and the second substrate. A predetermined voltage is applied to each of the individual electrodes formed on the first substrate to modulate a refractive index of the liquid crystal layer, thereby performing the spatial light modulation. When the maximum effective birefringence of the liquid crystal is assumed as $\Delta$nmax, a maximum usable light wavelength is assumed as $\lambda$max, and "m" is assumed as integer, the thickness of the liquid crystal layer is expressed as m$\lambda$max/$\Delta$nmax<d.

Here, the intensity modulation is performed according to the following process: a voltage obtained by adding a bias voltage being a constant voltage to a gradient voltage, is applied to the electrodes formed on the first substrate, and a gradient is formed in an effective phase difference within the liquid crystal layer by the application of the gradient voltage; this gradient of the effective phase difference shifts the phase of outgoing light outputted from the light output surface within the region; a wavefront of the outgoing light is controlled; and the traveling direction thereof is adjusted, thereby adjusting a coupling coefficient of the optical coupling system provided on the outputting side.

On the other hand, the phase modulation is performed according to the following process: a bias voltage being a predetermined constant voltage is applied to form a constant effective phase difference within the liquid crystal layer; and this constant effective phase difference adjusts the phase of the outgoing light outputted from the light output surface to be homogeneous within the region, thereby performing the phase modulation of the outgoing light. Consequently, one element is capable of performing both the intensity modulation and the phase modulation.

The liquid crystal spatial light modulator according to the second embodiment may take a configuration as a reflection type liquid crystal spatial light modulator that returns the outgoing light to the incident light side, and also as a transmission type liquid crystal spatial light modulator for outputting the light without changing the outgoing direction.

The reflection type liquid crystal spatial light modulator has a transparent substrate as the first substrate and an opaque substrate as the second substrate, light incident from the first substrate is reflected by the second substrate which is used as the reflective surface, and the light goes and returns through the liquid crystal layer to be outputted from the first substrate, thereby performing the intensity modulation and the phase modulation while the incident light goes and returns through the liquid crystal layer. In the reflection type liquid crystal spatial light modulator, the light goes and returns within one liquid crystal layer, and therefore, the thickness "d" of the liquid crystal layer is expressed by the formula $\lambda$max/$\Delta$nmax<d, when "m" is assumed as 1.

Another aspect of the reflection type liquid crystal spatial light modulator has an opaque substrate as the first substrate and a transparent substrate as the second substrate, light incident from the second substrate is reflected by the first substrate used as a reflective surface, and the light goes and returns in the liquid crystal layer to be outputted from the second substrate, thereby performing the intensity modulation and the phase modulation while the incident light goes and returns through the liquid crystal layer.

In addition, the transmission type liquid crystal spatial light modulator has a transparent substrate as the first substrate and a transparent substrate as the second substrate, and after light incident from the first substrate is transmitted through the liquid crystal layer, the light is outputted from the second substrate, thereby performing the intensity modulation and the phase modulation while the incident light is transmitted through the liquid crystal layer. Since in the transmission type liquid crystal spatial light modulator, passage through one liquid crystal layer is only once, the thickness "d" of the liquid crystal layer is expressed by the formula $2\lambda max/\Delta nmax < d$, when "m" is assumed as 2.

The liquid crystal spatial light modulator is provided with individual electrodes for driving the liquid crystal, and these multiple electrodes may be arranged in one-dimensional array for arranging the electrodes in an array direction of the region, or in two-dimensional array for arranging the electrodes in a first array direction of the region and in a second array direction being orthogonal to the first array direction.

The liquid crystal spatial light modulator module of the present invention is provided with the liquid crystal spatial light modulator of the present invention as described above, and it is further provided with an input port for inputting the incident light, an output port for outputting the outgoing light, a first collimator for inputting incident light from the input port into the liquid crystal spatial light modulator in a form of a parallel light, and a second collimator for combining the light from the liquid crystal spatial light modulator and outputting the coupled light in a form of parallel light to the output port.

Here, at least either one of the first collimator and the second collimator can be replaced by an optical fiber.

A first polarization converting element may be provided between the first collimator and the liquid crystal spatial light modulator for converting by 90 degrees one direction of polarized light, and in addition, a second polarization converting element may be provided between the liquid crystal spatial light modulator and the second collimator for resuming the direction of the converted polarized light.

A first polarization converting element may be provided between the input port and the first collimator for converting by 90 degrees one direction of polarized light, and in addition, a second polarization converting element may be provided between the second collimator and the output port for resuming the direction of the converted polarized light.

It is further possible to prepare multiple second collimators on the output side, and they are capable of distributing the light whose traveling direction has been changed by the wavefront control in the liquid crystal spatial light modulator.

Thermally-diffused Expanded Core (TEC) fibers may be employed as the first collimator and the second collimator, or glass lenses directly fusion-bonded to the optical fiber may also be applicable. Alternatively, multiple optical fibers may substitute for the second collimator.

In the liquid crystal spatial light modulator, at least a part of the first substrate or the second substrate is bonded to and fixed on a thermoelectric conversion element by using metal or resin, and when voltage of an identical profile is applied, a wavelength-converted phase fluctuation of the liquid crystal layer, caused by environmental temperature variation, may be controlled to be equal to or less than $\lambda/10$ of the maximum usable light wavelength.

It is further possible to configure such that a spectrometer is provided on the optical path in front of or in the rear of the liquid crystal spatial light modulator and the spatial light modulation can be performed for each wavelength that is spectrally distributed by the spectrometer.

Furthermore, in the liquid crystal spatial light modulator, multiple individual electrodes are arranged in a first array direction of the region and in a second array direction being orthogonal to the first array direction, and light with a wavelength spectrally distributed by the spectrometer is allowed to enter the second array direction. With this two-dimensional array, the intensity modulation and the phase modulation can be performed for each wavelength.

In an aspect of a method for driving the liquid crystal spatial light modulator according to the present invention, multiple individual electrodes are integrated into multiple groups, the individual electrodes within each of the groups are connected by a common collector electrode, and both ends of the collector electrode are connected to a pair of signal electrodes. In a group associated with the first region, drive waveforms of voltages being different from each other are applied to the pair of the signal electrodes, respectively, thereby forming a gradient voltage in the first region, and in addition, in the group associated with the second region, a drive waveform of identical voltage is applied to the pair of the signal electrodes, thereby applying a predetermined constant voltage to the second region.

In addition to the first embodiment of the drive method as described above, another drive method is possible according to a second embodiment. In the second embodiment, multiple individual electrodes are integrated into multiple groups, multiple individual electrodes within each of the groups are connected by a common collector electrode, and both ends of the collector electrode are connected to a pair of signal electrodes, and a bias voltage of a constant voltage is added to drive waveforms of voltage being different respectively for the pair of the signal electrodes, thereby forming a gradient potential in the constant electric potential.

Effect of the Invention

In a liquid crystal spatial light modulator, a liquid crystal spatial light modulator module, and a method for driving the liquid crystal spatial light modulator, it is possible to achieve a function that one element is allowed to adjust both the intensity modulation and the phase modulation of an optical signal.

BRIEF DESCRIPTION OF DRAWINGS

FIG. 9 illustrates a wavefront state viewed from the upper surface direction of the liquid crystal spatial light modulator module 10A according to the present invention;

FIG. 35 illustrates optical intensity modulation and phase modulation according to VOAD 111;

DENOTATION OF REFERENCE NUMERALS

1 LIQUID CRYSTAL SPATIAL LIGHT MODULATOR
1A NON-REFLECTION COATING
1B FIRST TRANSPARENT SUBSTRATE
1C COMPOSITE ELECTRODE
1D ALIGNMENT LAYER
1E NEMATIC LIQUID CRYSTAL LAYER
1F ALIGNMENT LAYER
1G COMMON ELECTRODE
1H SECOND TRANSPARENT SUBSTRATE
1I NEMATIC LIQUID CRYSTAL LAYER
2 INPUT PORT
3 OUTPUT PORT
4 INPUT/OUTPUT PORT
10, 10C, 10D, 10E, 10F LIQUID CRYSTAL SPATIAL LIGHT MODULATOR MODULE
10A ONE-DIMENSIONAL LIQUID CRYSTAL SPATIAL LIGHT MODULATOR MODULE
10B TWO-DIMENSIONAL LIQUID CRYSTAL SPATIAL LIGHT MODULATOR MODULE
11, 13 ANAMORPHIC COLLIMATOR
12 SPECTROMETER
14 COUPLER
15, 16 POLARIZATION CONVERTER
17 SPECTRAL COUPLER
21, 23 COLLIMATOR
22 SPECTROMETER
24 COUPLER
25, 26 POLARIZATION CONVERTER
31 LIQUID CRYSTAL SPATIAL LIGHT MODULATOR
32 DIRECTOR
33 INCIDENT LINEARLY POLARIZED LIGHT
34 INCIDENT WAVEFRONT
35 OUTGOING LINEARLY POLARIZED LIGHT
36 NEMATIC LIQUID CRYSTAL LAYER
41 FIRST SIGNAL ELECTRODE
42 SECOND SIGNAL ELECTRODE
43 FIRST COLLECTOR ELECTRODE
44 FIRST ELEMENT GRATING
45 THIRD SIGNAL ELECTRODE
46 FOURTH SIGNAL ELECTRODE
47 SECOND COLLECTOR ELECTRODE
48 SECOND ELEMENT GRATING
51 FIRST INDIVIDUAL ELECTRODE
52 N-th INDIVIDUAL ELECTRODE
53 (N+1)-th INDIVIDUAL ELECTRODE
54 2N-th INDIVIDUAL ELECTRODE
55 FIRST COMPOSITE ELECTRODE
60 FIRST ACTIVE REGION
61 FIRST INDIVIDUAL ELECTRODE
62 N-th INDIVIDUAL ELECTRODE
63 THIRD COMPOSITE ELECTRODE

71 FIRST SIGNAL ELECTRODE
72 SECOND SIGNAL ELECTRODE
73 FIRST COLLECTOR ELECTRODE
74 FIRST ELEMENT GRATING
75 THIRD SIGNAL ELECTRODE
76 FOURTH SIGNAL ELECTRODE
77 ELECTRODE
78 SECOND ELEMENT GRATING
81 FIFTH SIGNAL ELECTRODE
82 SIXTH SIGNAL ELECTRODE
83 THIRD COLLECTOR ELECTRODE
85 SEVENTH SIGNAL ELECTRODE
86 EIGHTH SIGNAL ELECTRODE
87 FOURTH COLLECTOR ELECTRODE
91 FIFTH SIGNAL ELECTRODE
92 SIXTH SIGNAL ELECTRODE
95 SECOND COMPOSITE ELECTRODE
100 OPTICAL CLOCK MULTIPLEXER
101 LIGHT MODULATOR
102 INPUT PORT
103 OUTPUT PORT
104, 105 OPTICAL COUPLER
106 DELAY ELEMENT
107 COLLIMATED SPECTROMETER
110 OPTICAL CLOCK MULTIPLIER
111 VOAD (Variable Optical Attenuator and Delay)
201 INPUT/OUTPUT PORT
202 SPECTROMETER
203 POLARIZER
211, 212, 213 CYLINDRICAL LENS
301 LIGHT MODULATOR (SLM)
302 COMPENSATOR
A FIRST REGION
B SECOND REGION

BEST MODE FOR CARRYING OUT THE INVENTION

Hereinafter, with reference to the accompanying drawings, a liquid crystal spatial light modulator and a liquid crystal spatial light modulator module of the present invention will be explained.

Figure 1A:
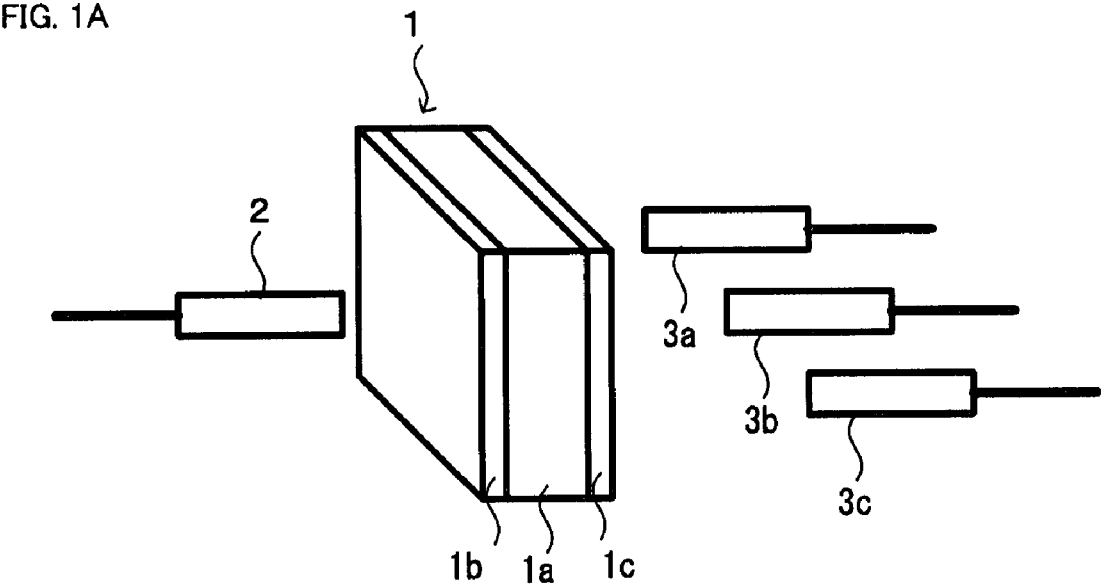
FIG. 1 illustrates a schematic configuration and functions of the liquid crystal spatial light modulator according to the present invention.
Figure 1B:
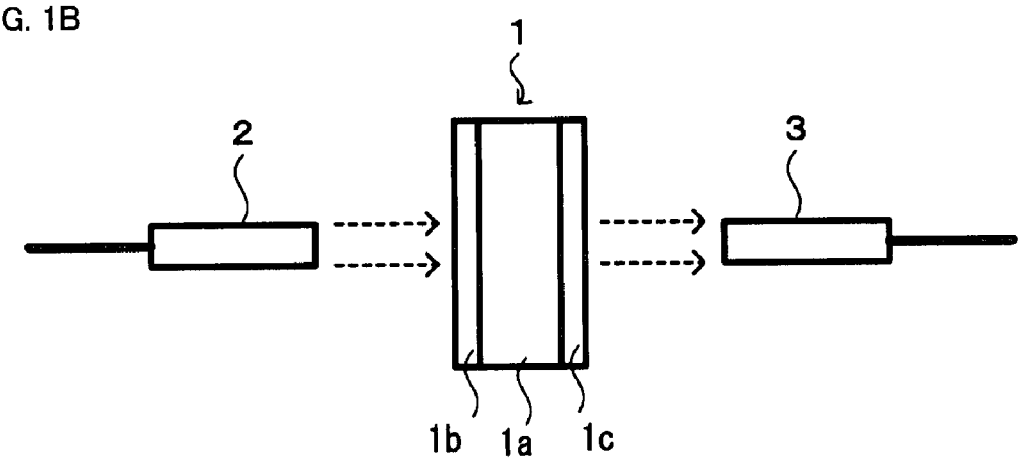
Figure 1C:
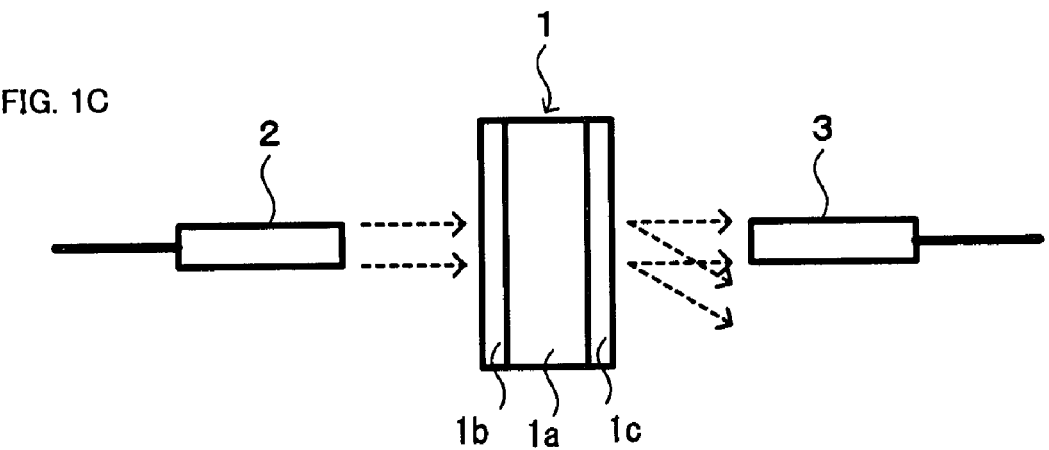

FIG. 1 illustrates a schematic configuration and functions of a transmission type liquid crystal spatial light modulator according to the present invention. FIG. 1A shows a schematic configuration of the liquid crystal spatial light modulator, and FIG. 1B and FIG. 1C show functions of phase modulation and intensity modulation which are provided in the liquid crystal spatial light modulator.

FIG. 1A shows a schematic configuration of the liquid crystal spatial light modulator 1 in which a liquid crystal layer 1a is held between a first electrode 1b and a second electrode 1c, having the function to adjust a phase of optical signal inputted from the input part 2, and the function to adjust the intensity of optical signal. Then, the spatial light modulation signal that has been adjusted by both the phase modulation and the intensity modulation is outputted from the output port 3 (3a to 3c). It is to be noted that the intensity modulation is to adjust the intensity, by attenuating the intensity of optical signal being inputted, and it functions as an optical attenuator (ATT). As for the phase modulation, it is to adjust a phase by delaying the phase of optical signal being inputted, and it functions as a phase shifter.

FIG. 1B illustrates the function of phase modulation, and the liquid crystal spatial light modulator 1 delays the phase of optical signals that are inputted from the input port 2, thereby performing the phase modulation, and outputs the signals from the output port 3.

FIG. 1C illustrates the function of intensity modulation, and the liquid crystal spatial light modulator 1 deflects the optical signals inputted from the input port 2 to change their traveling direction, thereby attenuating a light amount of the optical signals which are coupled to the output port 3. It is to be noted that an optical signal whose traveling direction has been changed by the liquid crystal spatial light modulator 1 may be discarded, or may be outputted in such a manner as being directed to any other output port 3. The liquid crystal spatial light modulator 1 may also be used as a switching element or a signal changeover element to change the input/output relationship where the optical signals inputted from the input port 2 are outputted to the output port 3.

The liquid crystal spatial light modulator 1 of the present invention adjusts voltage to be applied to the first electrode 1b so as to form a constant potential in the liquid crystal layer 1a, thereby performing the phase modulation, and forms a gradient potential in the liquid crystal layer 1a so as to change a wavefront direction and adjust an optical coupling coefficient on the outputting side, thereby performing the intensity modulation.

The liquid crystal spatial light modulator 1 of the present invention has been explained with a configuration where multiple individual electrodes are formed to apply a predetermined voltage profile to the first electrode 1b, and the second electrode 1c is used as a common electrode. On the contrary, it is also possible that the first electrode 1b is used as the common electrode, and multiple individual electrodes serve as the second electrode 1c so that the predetermined voltage profile is applied thereto.

Referring to FIG. 2, a configuration of a reflection type liquid crystal spatial light modulator 1 of the present invention will be explained.

Figure 2A:
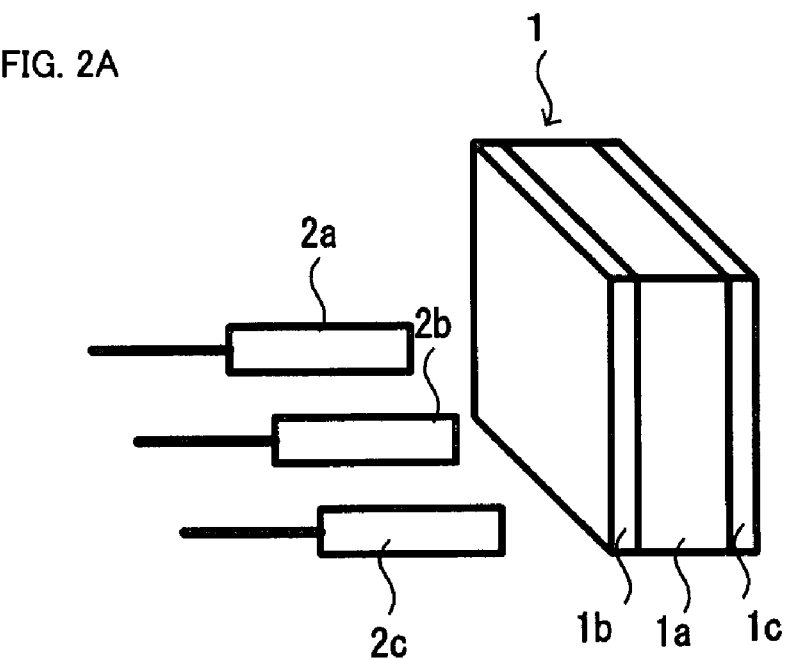
FIG. 2 illustrates a schematic configuration and functions of the reflection type liquid crystal spatial light modulator according to the present invention.
Figure 2B:
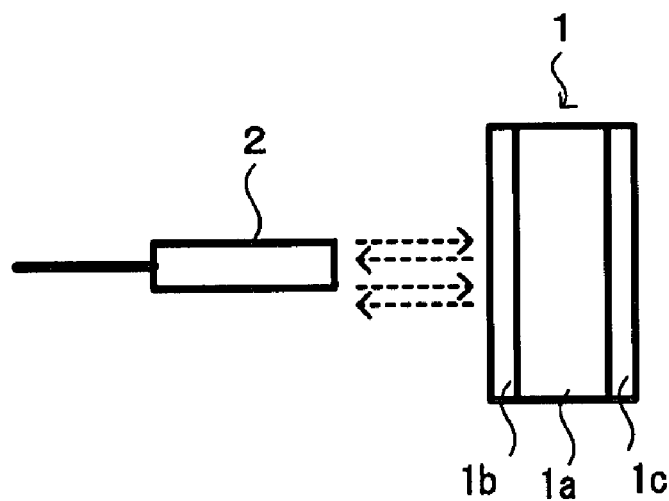
Figure 2C:
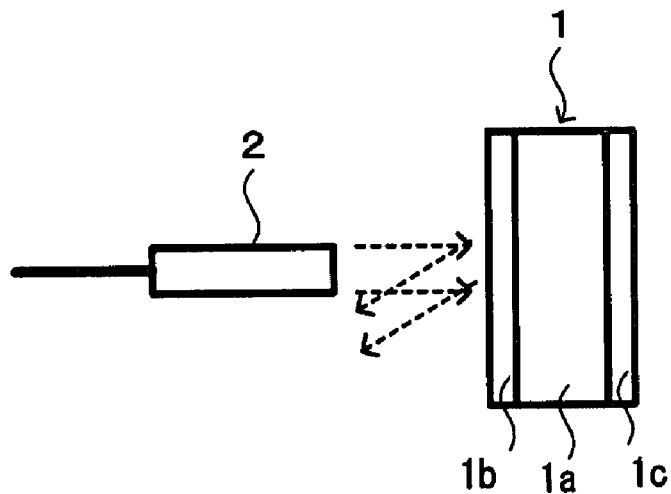

FIG. 2 illustrates a schematic configuration and functions of the reflection type liquid crystal spatial light modulator according to the present invention. FIG. 2A shows a schematic configuration of the liquid crystal spatial light modulator, and FIG. 2B and FIG. 2C show functions of phase modulation and intensity modulation provided in the liquid crystal spatial light modulator.

In FIG. 2A, the liquid crystal spatial light modulator 1 has a schematic configuration where a liquid crystal layer 1a is held between a first electrode 1b and a second electrode 1c, forming the second electrode 1c on an opaque substrate. Then, using the opaque substrate as a reflective surface, the incident light is transmitted through the liquid crystal layer 1a and reflected by the reflective surface, and again transmitted through the liquid crystal layer 1a, to output the light to the incident side, from a transparent substrate on which the first electrode 1b is formed.

Similar to the transmission type spatial light modulator, the reflection type liquid crystal spatial light modulator 1 also has a function to adjust a phase of optical signal inputted from the input port 2 and adjust intensity of the optical signal, so as to output from the input port 2 (2a to 2c) spatial light modulation signals to which adjustment of either of the phase modulation and the intensity modulation has been performed, or adjustments of both the phase modulation and the intensity modulation have been performed. It is to be noted that the intensity modulation is to adjust the intensity, by attenuating the intensity of optical signals being inputted, and it functions as an optical attenuator (ATT). As for the phase modulation, it is to adjust a phase by delaying the phase of the optical signals being inputted, and it functions as a phase shifter.

FIG. 2B illustrates the function of phase modulation, and the liquid crystal spatial light modulator 1 delays a phase of the optical signals inputted from the input 2 while the signals go and return through the liquid crystal layer 1a, thereby performing the phase modulation, and then the signals are returned to the input port 2 side.

FIG. 2C illustrates the function of intensity modulation, and the liquid crystal spatial light modulator 1 deflects the optical signals inputted from the input port 2 to change their traveling direction while the signals go and return through the liquid crystal layer 1a, thereby attenuating a light amount of the optical signals to be coupled with the input port 2. It is to be noted that an optical signal whose traveling direction has been changed by the liquid crystal spatial light modulator 1 may be discarded, or may be outputted in such a manner as being directed to any other input port 2. The liquid crystal spatial light modulator 1 may also be used as a switching element or a signal changeover element to change the input/output relationship where the optical signals inputted from the input port 2 are outputted to the input port 2.

Similar to the transmission type liquid crystal spatial light modulator, also in the reflection type liquid crystal spatial light modulator 1 of the present invention, the voltage applied to the first electrode 1b is adjusted to form a constant potential in the liquid crystal layer 1a, whereby the phase modulation is performed. In addition, a gradient potential is formed in the liquid crystal layer 1a to change the wavefront direction and adjust the optical coupling coefficient on the outputting side, whereby the intensity modulation is performed.

The reflection type liquid crystal spatial light modulator 1 may have any of the following configurations; multiple individual electrodes are formed in the first electrode 1b to apply a predetermined voltage profile and the second electrode 1c is used as a common electrode, or on the contrary, the first electrode 1b is used as the common electrode and multiple individual electrodes serve as the second electrode 1c so that the predetermined voltage profile is applied thereto. However, if a Liquid Crystal on Silicon (LCOS) element is particularly used as the reflection type liquid crystal spatial light modulator 1, it is desirable to configure such that multiple individual electrodes are used as the second electrode 1c.

Next, referring to FIG. 3, a configuration of the liquid crystal spatial light modulator 1 of the present invention will be explained. FIG. 3 illustrates sectional views of a structure of the liquid crystal spatial light modulator according to the present invention. In FIG. 3, a nematic liquid crystal layer 1I shown as one example of the liquid crystal layer is in homogeneous alignment, in such a manner that, when no electric-field is applied, directors 1E being p-type (positive type) liquid crystal molecules have a constant pretilt angle (typically, equal to or less than 5 degrees with respect to the substrate plane), according to an alignment layer 1D formed on the composite electrode 1C on the first transparent substrate 1B and the alignment layer 1F formed on the common electrode 1G on the second transparent substrate 1H, which are incorporated in the liquid crystal spatial light modulator 1.

Figure 3A:
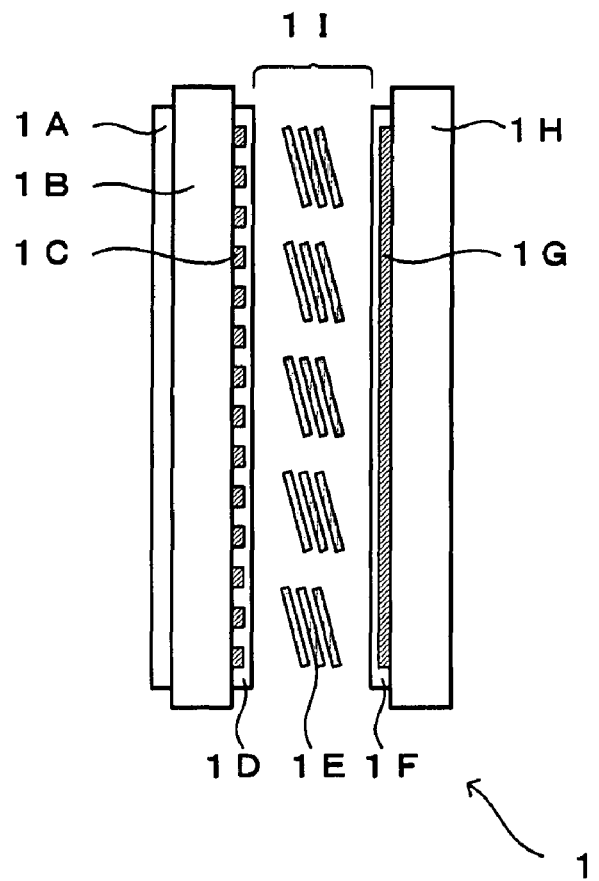
FIG. 3 illustrates sectional views of a structure of the liquid crystal spatial light modulator according to the present invention.
Figure 3B:
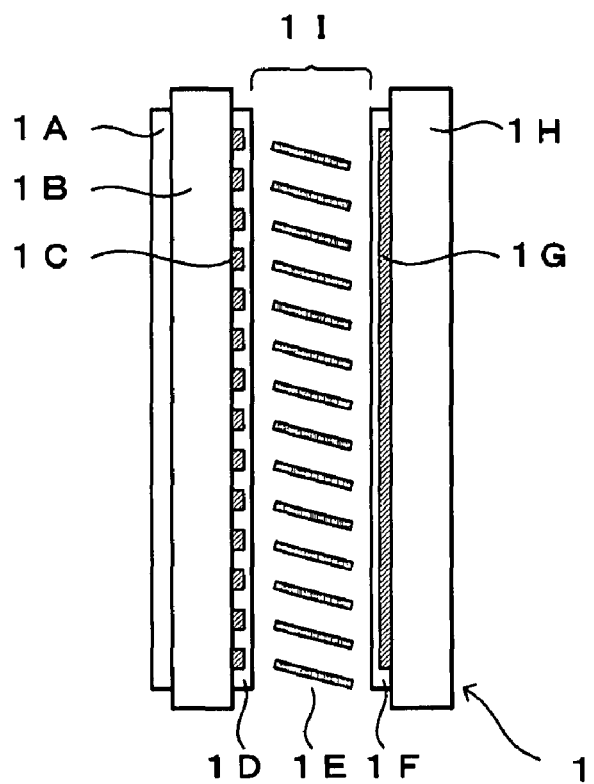

FIG. 3A shows an example of a horizontal alignment (homogeneous alignment), illustrating that incident polarized light is made to be parallel with the array direction of the composite electrode 1C, as well as being parallel with the plane on which the directors 1E are moved when an electric-field is applied. FIG. 3B shows an example of a vertical alignment (homeotrophic alignment), similarly illustrating that incident polarized light is made to be parallel with the array direction of the composite electrode 1C, as well as being parallel with the plane on which the directors 1E are moved when the electric-field is applied. The configuration shown in FIG. 3B is the same as the configuration of FIG. 3A, except that the configuration of FIG. 3B uses the nematic liquid crystal layer as n-type (negative type) and the initial alignment of the directors 1E vertically approaches the transparent substrate 1B and the transparent substrate 1H.

In particular, for example, $SiO_2$ obliquely deposited films may be used as the alignment layers 1D and 1F, functioning as vertical alignment films, to have a constant pretilt angle (typically, equal to or less than 14 degrees with respect to the substrate normal).

Though it is not clearly illustrated in FIG. 3, the first transparent substrate 1B and the second transparent substrate 1H are fixed, placing a spacer therebetween, so that the nematic liquid crystal layer 1I can keep a certain thickness from a few of micrometers (μm) to tens of micrometers (μm). In order to prevent a situation of short-circuit between the composite electrode 1C and the common electrode 1G, though not illustrated in FIG. 3, it is possible to form a transparent insulating film such as tantalum pentoxide ($Ta_2O_5$), silicon dioxide ($SiO_2$), or silicon nitride (SiN), on at least one of the composite electrode 1C and the common electrode 1G. It is also desirable to enhance a transmission factor, by forming the transparent insulating film in such a manner as including multilayered films made up of a film having a high refractive index and a film having a low refractive index. The common electrode 1G formed on the second transparent substrate 1H may be a full-length electrode made of a transparent conductive film. It is to be noted here that a structure of the composite electrode 1C will be discussed later.

When indium tin oxide (ITO) is used as the transparent conductive film which forms an optical path portion of the composite electrode 1C and the common electrode 1G, the film thickness is made to 50 nm or less. Furthermore, when a wavelength to be used is in the near infrared region, it is desirable to employ a film having a sheet resistance of approximately hundreds of O to 1 kO, generated with a high degree of oxygen concentration upon film formation, in order to improve the transmission factor.

Other than ITO, any thin film such as indium oxide ($In_2O_3$), tin oxide ($SnO_2$), zinc oxide (ZnO), and titanium added indium oxide (InTiO) is available as the transparent conductive film. Also for the case above, it is desirable to use a film having the film thickness of 50 nm or less, and the sheet resistance approximately tens of O to 1 kO.

On one surface, which comes into contact with an air space, of the first transparent substrate 1B or the second transparent substrate 1H, which is made of glass, the surface being opposite to the nematic liquid crystal layer 1I, there is formed a non-reflection coating 1A as appropriate, in order to prevent reflection by the air and the substrate interface. The non-reflection coating 1A may employ a coating of dielectric multilayer films being made of tantalum pentoxide ($Ta_2O_5$) and silicon dioxide ($SiO_2$), for instance.

Though not illustrated, it is further possible to provide a refractive index matching layer on the first transparent substrate 1B or on the second transparent substrate 1H, and the composite electrode 1C and the common electrode 1G are formed thereon.

In FIG. 3, explanation has been made with an example where the composite electrode 1C is formed on the incident side, and the common electrode 1G is formed on the output side for the sake of convenience. However, it is further possible to configure such that the incident side and the output side are switched, or both sides are provided with the composite electrode.

In the configuration as shown in FIG. 3, the polarizing direction (p-polarization or s-polarization) of the light being outputted is determined according to the relationship between the orientation of the directors 1E in the nematic liquid crystal layer 1I and the incident linearly polarized light. Therefore, it is quite significant to adjust the incident linearly polarized light to be parallel with a crystal axis direction which is taken when voltage for enlarging anisotropy of the nematic liquid crystal layer 1I is applied.

Next, with reference to FIG. 4 and FIG. 5, an explanation will be made as to functions of the phase modulation and the intensity modulation by the liquid crystal spatial light modulator according to the present invention. FIG. 4 is a schematic illustration to explain a first embodiment of the spatial light modulation (phase modulation and intensity modulation) by the liquid crystal spatial light modulator. FIG. 5 is a schematic illustration to explain a second embodiment of the spatial light modulation (phase modulation and intensity modulation) by the liquid crystal spatial light modulator.

A specified voltage is applied to each of individual electrodes formed on the first transparent substrate of the liquid crystal spatial light modulator, so as to modulate a refractive index of the liquid crystal layer, whereby the spatial light modulation is performed. This voltage application is applicable in the two embodiments.

Firstly, with reference to FIG. 4, the first embodiment of the spatial light modulation according to the liquid crystal spatial light modulator of the present invention will be explained. In the first embodiment, the electrodes formed on the first transparent substrate are segmented into two regions, and the state of voltage application varies from one region to another. Phase modulation of light is performed in the first region, and intensity modulation is performed in the second region, whereby one element performs both the phase modulation and the intensity modulation.

Figure 4A:
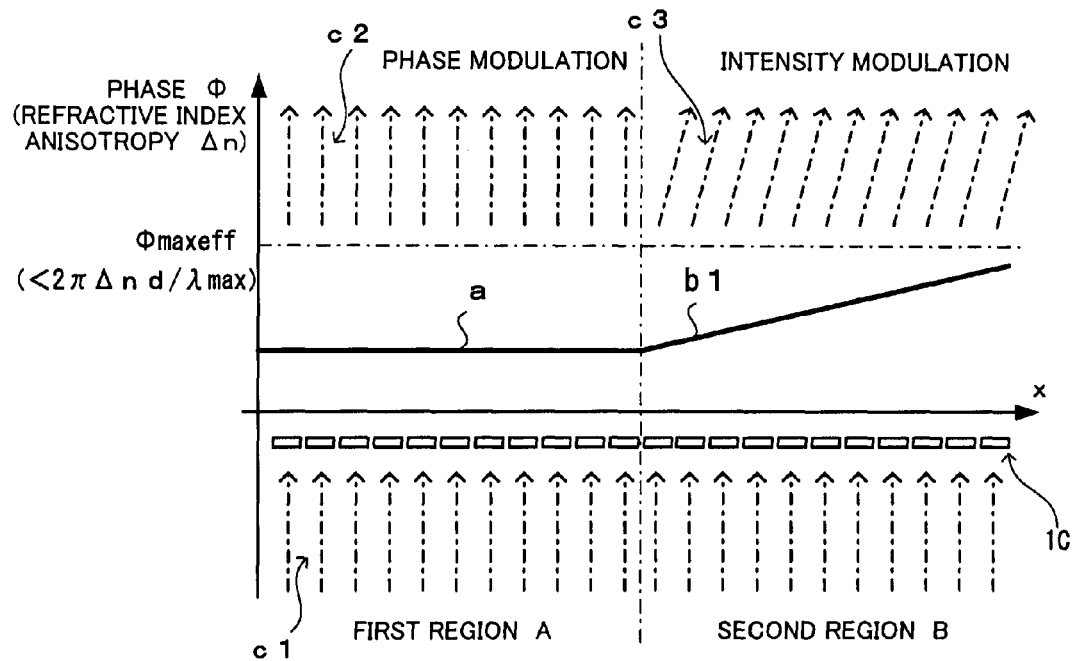
FIG. 4 schematically illustrates the first embodiment of spatial light modulation (phase modulation and intensity modulation) by the liquid crystal spatial light modulator.
Figure 4B:
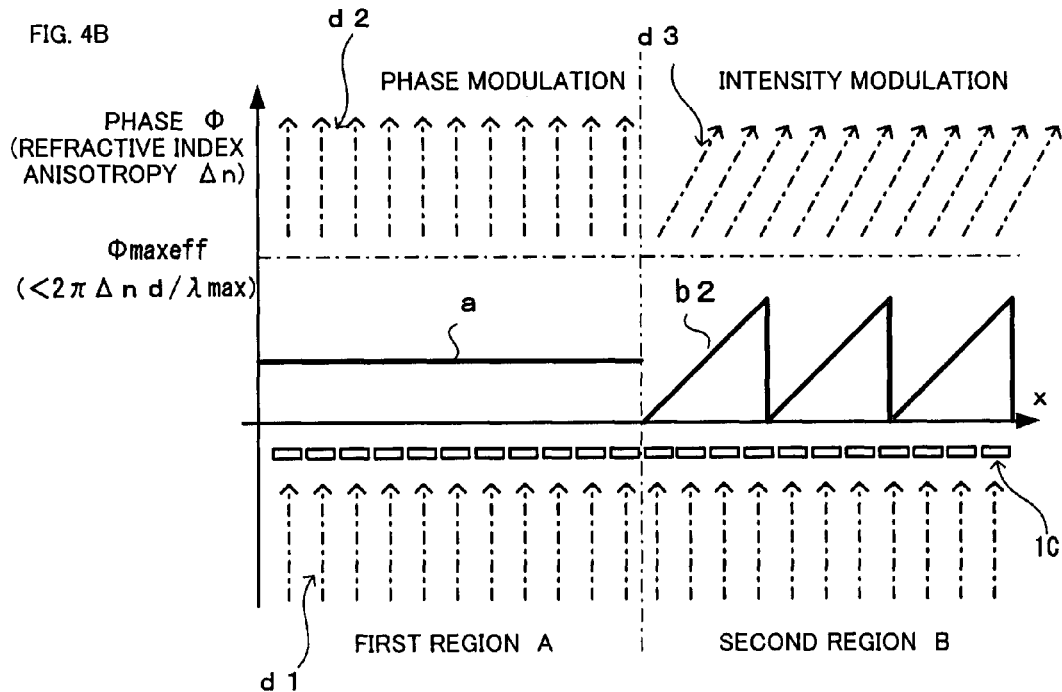
Figure 5:
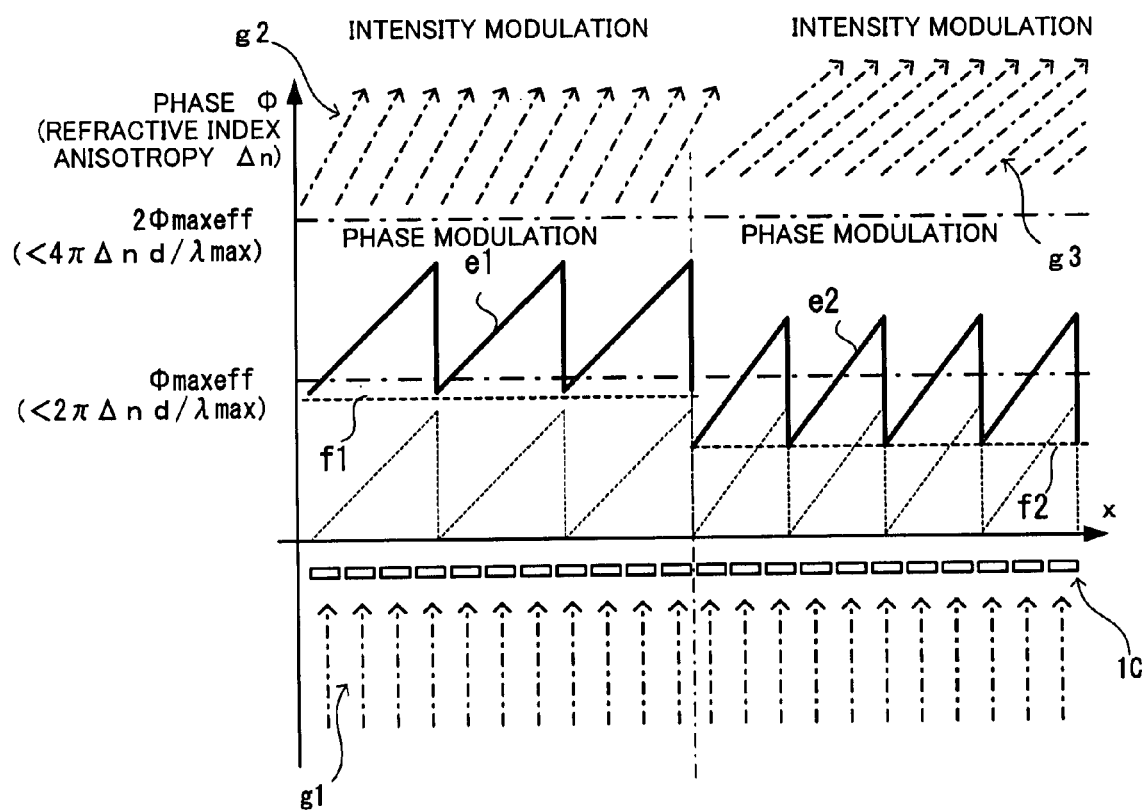
FIG. 5 schematically illustrates the second embodiment of spatial light modulation (phase modulation and intensity modulation) by the liquid crystal spatial light modulator.

In FIG. 4A and FIG. 4B, the lateral axis (x-axis) indicates a direction in which multiple electrodes 1C formed on the first transparent substrate of the liquid crystal spatial light modulator are aligned, and it is partitioned into two regions; the first region A and the second region B.

Here, each of the first region A and the second region B is illustrated as one continuous region. However, it is not necessary to be such a continuous region, and each of the regions may be partitioned into multiple regions, or two regions which are substantially divided are also applicable.

On the other hand, the vertical axis indicates a thickness direction of the liquid crystal layer, and the solid line represents phase modulation amount f and refractive index anisotropy $\Delta n$ generated in the liquid crystal layer, and the dashed-dotted arrows represent light beam directions of light incident on the liquid crystal layer, c1 (FIG. 4A), d1 (FIG. 4B), and outgoing light, c2, c3 (FIG. 4A), d2, d3 (FIG. 4B) outputted from the liquid crystal layer.

Between FIG. 4A and FIG. 4B, patterns of the phase modulation amount $\phi$ and the refractive index anisotropy $\Delta n$ in the second region B are different. It is to be noted that between the phase modulation amount $\phi$ and the refractive index anisotropy $\Delta n$, there is a relationship $\phi = 2\pi \Delta n \cdot d / \lambda$, wherein it is assumed that "$\lambda$" represents a wavelength of the light passing through the liquid crystal layer and "d" represents the thickness of the liquid crystal layer. When "$\lambda max$" is assumed as a maximum usable light wavelength, the maximum effective modulation phase amount "$\phi maxeff$" to be used as an element of the liquid crystal layer, is set to be less than $2\pi \Delta nmax \cdot d / \lambda max$. Here, $\Delta nmax$ represents a maximum effective birefringence. The phase modulation amount corresponds to a variable phase-lag, which occurs when the light is passing through the liquid crystal layer.

Firstly, the phase modulation will be explained. In FIG. 4A, the phase modulation is performed in the first region A. In the first region A, homogeneous potential is formed by applying the same voltage to the electrodes 1C that are provided in the first region A.

The light c1 which is parallel light entering the incident plane in the first region A is delayed by the homogeneous phase amount "a", while passing through the liquid crystal layer. The light delay time depends on electric potential state being applied. This relationship between the light delay time and the electric potential will be discussed later. According to the process above, outgoing light c2 that has been subjected to the phase modulation is outputted from the output surface.

Next, the intensity modulation will be explained. The intensity modulation is performed in the area indicated by the second region B in FIG. 4A. In the second region B, a gradient voltage is applied to the electrodes 1C that are provided in the second region B, thereby forming a gradient phase modulation b1.

The light c1 being parallel light that enters the incident plane of the second region B, is delayed by the gradient phase modulation b1 generated by the gradient potential, while the light is passing through the liquid crystal layer. The delay time varies depending on the electric potential, thereby causing a difference by position at the point of time when the light is outputted from the output surface. Consequently, the wavefront of the output light c3 is tilted, and the traveling direction thereof is changed. A relationship between the traveling direction of the light and the gradient phase modulation will be discussed later. It is to be noted that in FIG. 4, an example of a phase modulation curve is illustrated, which is equivalent to a brazed diffraction grating. However, if a coupling coefficient with the optical coupling system can be adjusted, a more detailed phase distribution may be superimposed or added on the brazed type phase modulation curve, or another phase distribution which is able to adjust the coupling coefficient may also be applicable.

Since the traveling direction of the outgoing light outputted from the output surface is changed, the coupling coefficient for coupling with the output port becomes smaller, thereby attenuating the incident light amount. Accordingly, the output light c2 being subjected to the intensity modulation is outputted from the output surface.

Since the thickness of the liquid crystal layer is limited in FIG. 4A, there is also a limitation for the range of angle by which the outgoing light can be changed across the full width of the second region B. FIG. 4B shows a configuration to deflect the outgoing light to change the angle of the outgoing light, exceeding the range of angle that is limited by the full width of the second region B and the phase modulation amount. The drive method shown in FIG. 4B is different from the drive method shown in FIG. 4A in the point how the gradient voltage is applied in the second region B. However, following points are common, i.e., voltage is applied by segmenting the electrodes formed on the first transparent substrate into two regions, the phase modulation is performed by applying homogeneous potential in the first region A, and the intensity modulation is performed by applying the gradient potential in the second region B, thereby changing the coupling coefficient for coupling with the optical system on the output side.

In the second region B in FIG. 4B, the electrodes 1C are segmented into multiple parts, and a gradient voltage is applied to each of the segments, thereby forming multiple gradient phase modulation items b2. Then, by increasing the tilt of each of the gradient phase modulation items b2, and performing the modulation at a smaller pitch in each of the saw-tooth modulation regions, the angle of the outgoing light d2 is changed, while exceeding the range of the angle that is limited by the full width of the second region and the phase modulation amount. It is to be noted that in a portion of the electrodes being adjacent to each other within the liquid crystal layer, the phase difference of 2p can be assumed as coordinate phase. Therefore, by resetting the applied voltage every cycle in the x-axis direction, a phase distribution of the gradient phase modulation items b2 can be formed.

Next, with reference to FIG. 5, the second embodiment of spatial light modulation according to the liquid crystal spatial light modulator of the present invention will be explained. In the second embodiment, voltage obtained by adding a constant bias voltage to the gradient voltage is applied to the electrodes formed on the first transparent substrate. By applying the gradient voltage, a gradient is formed on the effective phase modulation amount within the liquid crystal layer, and the phase of outgoing light outputted from the light output surface is shifted within the region according to the gradient of this effective phase modulation amount, thereby adjusting the traveling direction of the outgoing light and performing the intensity modulation. By applying the predetermined constant bias voltage, a constant effective phase modulation is formed in the liquid crystal layer. With this constant effective phase modulation, the phase of the outgoing light outputted from the light output surface is adjusted homogeneously in the region, thereby performing the phase modulation of the outgoing light. Accordingly, one element performs both the intensity modulation and the phase modulation.

In FIG. 5, similar to FIG. 4, the lateral axis (x-axis) represents a direction aligning multiple electrodes 1C that are formed on the first transparent substrate of the liquid crystal spatial light modulator. In this embodiment, unlike the aforementioned embodiment, there is no segmentation in the region.

On the other hand, the vertical axis represents a thickness direction of the liquid crystal layer, and the solid line represents the phase modulation amount f and the refractive index anisotropy $\Delta n$ generated in the liquid crystal layer. The dashed-dotted arrows represent a light beam direction of light g1 incident on the liquid crystal layer, and light beam directions of the outgoing light g2 and g3 outputted from the liquid crystal layer.

Compared to the configuration as shown in FIG. 4, the configuration of the second embodiment as shown in FIG. 5 is different in thickness of the liquid crystal layer, and patterns of the phase modulation amount $\phi$ and the refractive index anisotropy $\Delta n$ are also different according to the difference in thickness. In the second embodiment, the thickness of the liquid crystal layer is set in such a manner that the maximum phase modulation amount becomes $2\phi max$, being twice the amount of the first embodiment. It is to be noted that similar to the first embodiment as shown in FIG. 4, there is a relationship, phase modulation amount $\phi=2\pi\Delta n\cdot d/\lambda$, between the phase modulation amount $\phi$ and the refractive index anisotropy $\Delta n$, when "$\lambda$" is assumed as light wavelength passing through the liquid crystal layer, and "d" is assumed as the thickness of the liquid crystal layer. Therefore, in the second embodiment, the maximum phase modulation amount $2\phi max$ generated by the liquid crystal layer is set to be less than $4\pi\cdot\Delta nmax\cdot d/\lambda max$.

In this configuration, gradient voltage obtained by adding a constant bias voltage is applied to the electrodes 1C. FIG. 5 illustrates the gradient phase modulation amount e1 which is obtained by adding the constant phase modulation amount f1 that is generated by applying the bias voltage and the gradient phase modulation amount e2 which is obtained by adding the constant phase modulation amount f2 that is generated by applying another bias voltage.

In this embodiment, the phase modulation and the intensity modulation are performed simultaneously. The phase modulation is performed by the effective phase modulation with the constant phase modulation amounts f1 and f2, which are generated by applying the constant bias voltage within a predetermined region. These constant effective phase modulation amounts homogeneously delay within the region the phases of the outgoing light g2 and g3 being outputted from the light output surface.

On the other hand, the intensity modulation is performed by the gradient of the effective phase modulation within the liquid crystal layer, the gradient being formed by applying gradient voltage. The gradient of the effective phase modulation displaces the phases of the outgoing light g2 and g3 outputted from the light output surface, in a form of saw-tooth within the region, and adjusts the traveling direction of the outgoing light to control the coupling coefficient for coupling with the optical system provided on the light output side, thereby performing the intensity modulation.

In FIG. 5, by applying the bias voltage to the electrodes 1C, the constant phase modulation amount f1 or the constant phase modulation amount f2 is provided. These phase modulation amounts may vary depending on the level of the bias voltage to be added to the electrodes.

According to the second embodiment, in a region where the electrodes 1C are aligned, both the phase modulation and the intensity modulation are performed within the same region. Therefore, it is necessary that a thickness of the liquid crystal layer corresponds to the thickness required for both of the phase modulation and the intensity modulation. In this example here, it is configured such that the thickness of the liquid crystal layer is set to be at least 2fmax as the maximum phase modulation amount, being twice the thickness fmax as shown in FIG. 4.

The present invention uses the liquid crystal spatial light modulator as described above to configure a liquid crystal spatial light modulator module.

In the following, a basic configuration of the liquid crystal spatial light modulator module will be explained, for the case where spectral decomposition (spectral decomposition) is not used (liquid crystal spatial light modulator modules 10A and 10C), and for the case where spectral decomposition is used (liquid crystal spatial light modulator modules 10B and 10D).

In the configuration where the spectral decomposition is not used, separation by wavelength is not performed. Therefore, the intensity modulation and the phase modulation are performed for the incident light inputted from one input port at one time in the liquid crystal spatial light modulator.

Figure 10:
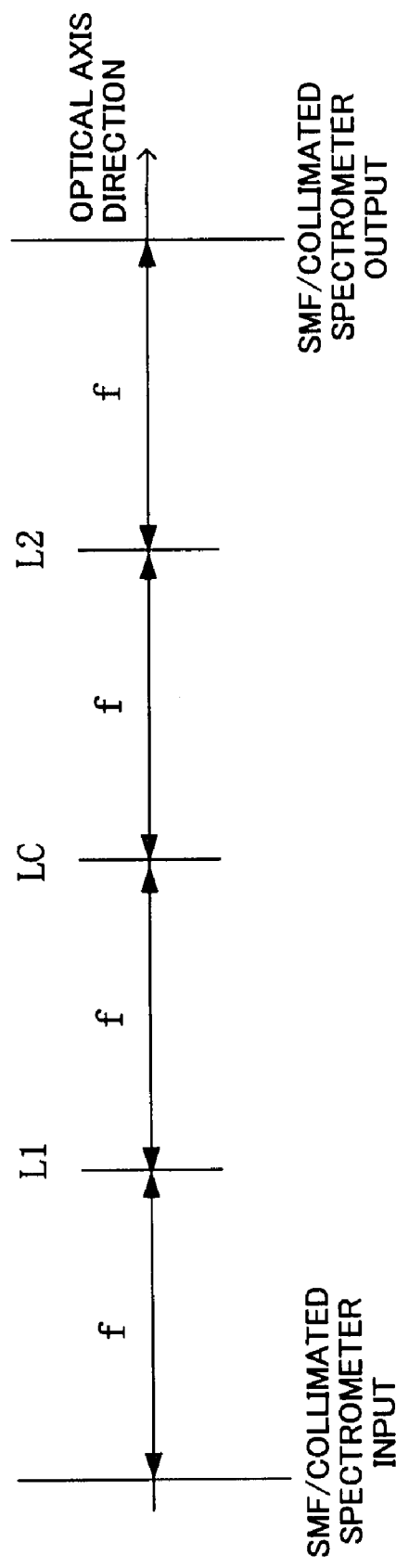
FIG. 10 illustrates equivalent light path positions in the liquid crystal spatial light modulator module 10A according to the present invention.

Firstly, with reference to FIG. 6 to FIG. 10, the liquid crystal spatial light modulator module 10A will be explained in which the spectral decomposition is not used. It is to be noted that FIG. 6 is an illustration for explaining a schematic configuration of the liquid crystal spatial light modulator module 10A, FIG. 7 illustrates a wavefront state viewed from the side surface direction of the liquid crystal spatial light modulator module 10A as shown in FIG. 6, FIG. 8 and FIG. 9 illustrate a wavefront state viewed from the upper surface direction of the liquid crystal spatial light modulator module 10A as shown in FIG. 6, and FIG. 10 illustrates equivalent light path positions.

Figure 6:
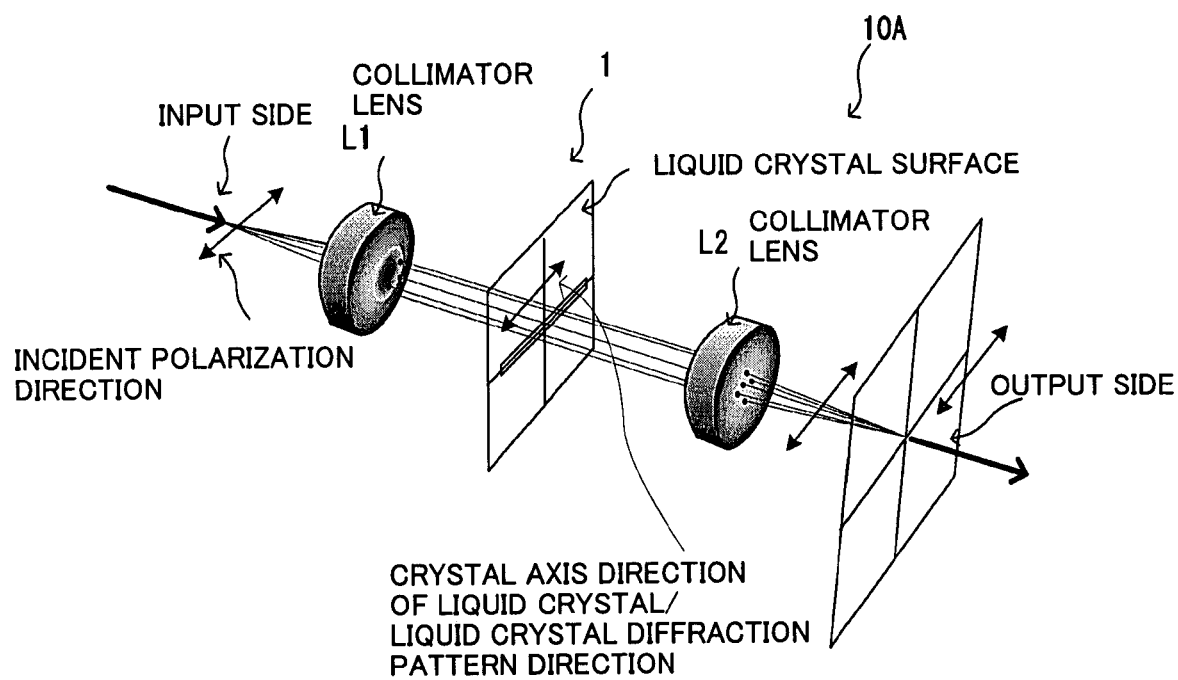
FIG. 6 illustrates a schematic configuration of the liquid crystal spatial light modulator module 10A according to the present invention.
Figure 7:
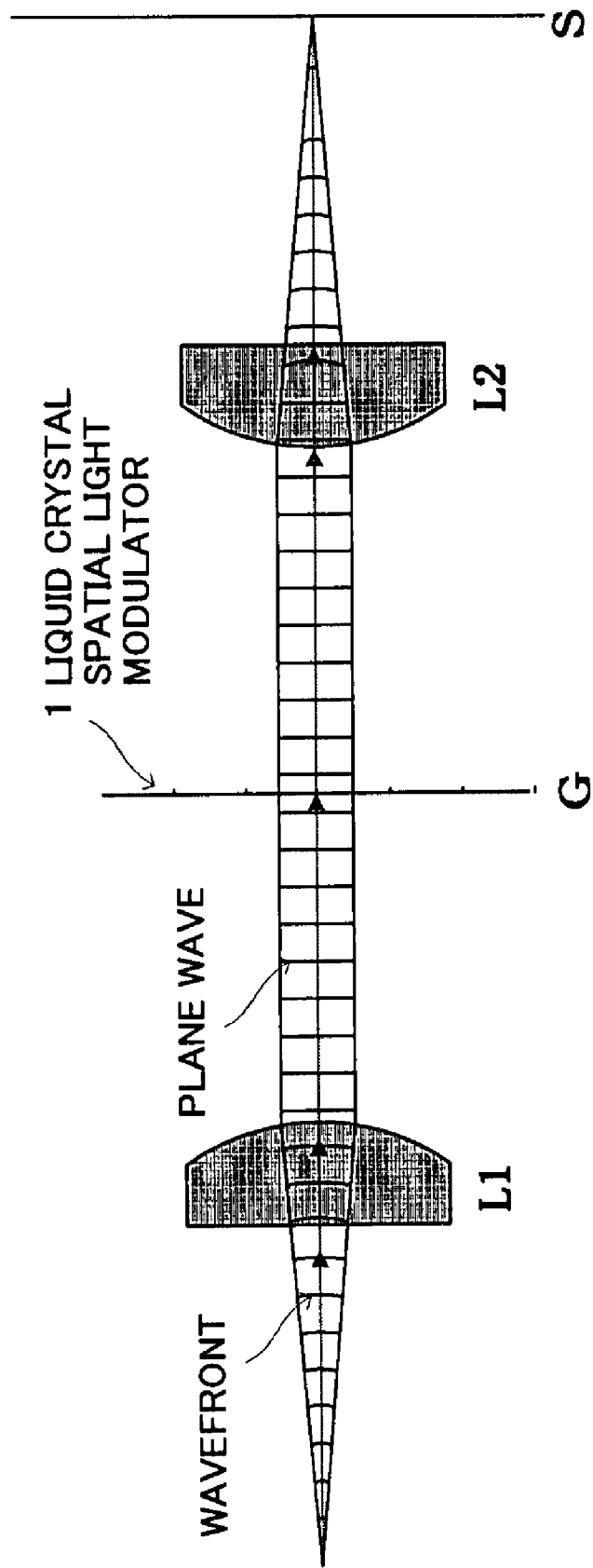
FIG. 7 illustrates a wavefront state viewed from the side surface direction of the liquid crystal spatial light modulator module 10A according to the present invention.

In FIG. 6, the liquid crystal spatial light modulator module 10A performs shaping of the incident light inputted from the input port by a collimator L1 in order to form spots to irradiate multiple liquid crystal pixels, and thereafter makes the light to enter the liquid crystal spatial light modulator 1. Here, a liquid crystal layer and electrodes are aligned in the liquid crystal spatial light modulator 1, and the light from the collimator L1 enters there. The light entered the liquid crystal spatial light modulator 1 is subjected to the phase modulation and the intensity modulation, and thereafter outputted. The outgoing light is collected by a collimator L2, so as to form a circular spot, and outputted to an output port. In this configuration, the spectral decomposition is not used, and therefore the intensity modulation and the phase modulation are not performed with respect to each wavelength.

It is to be noted that incident polarization direction, a liquid crystal director (long axis), and output polarization direction are parallel with one another, and the liquid crystal spatial light modulator 1 is provided with at least one-dimensional liquid crystal cell layer, having widths in the longitudinal direction and in the lateral direction being equal to or larger than the incident parallel beam.

In addition, in the case where the incident polarized light is orthogonal to the incident polarization direction as shown in FIG. 6, along with this incident polarized light, the liquid crystal director (long axis) and the output polarization direction are also rendered to be orthogonal to the incident polarized light as shown in FIG. 6.

FIG. 7 illustrates a wavefront state viewed from the side surface direction of the liquid crystal spatial light modulator module 10A shown in FIG. 6. It is to be noted that in FIG. 7, a position indicated by "G" represents where the liquid crystal spatial light modulator 1 is installed. The incident light that has passed through a lens of the collimator L1 becomes a plane wave, and the incident position at "G" is constant, regardless of the operation of the liquid crystal spatial light modulator 1.

FIG. 8 and FIG. 9 illustrate a wavefront state viewed from the upper surface direction of the liquid crystal spatial light modulator module 10A as shown in FIG. 6. In here, three optical fibers (SMF1$i$, SMF2$i$, and SMF3$i$) are arranged at the incident side, and three optical fibers (SMF1$o$, SMF2$o$, and SMF3$o$) are arranged at the output port side. In this configuration, the incident light is inputted from one SMF1$i$ (the optical fiber placed in the center in the figure), and the light is outputted from any one of the three optical fibers provided at the output port side. It is determined according to beam polarization performed by the liquid crystal spatial light modulator 1, which of the optical fibers is used to output the light, among the three optical fibers provided on the output side.

Figure 8A:
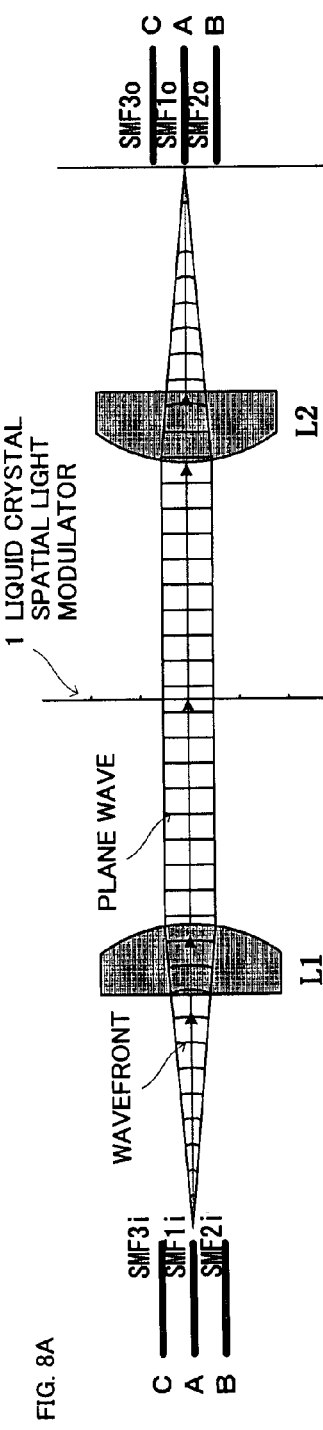
FIG. 8 illustrates a wavefront state viewed from the upper surface direction of the liquid crystal spatial light modulator module 10A according to the present invention.

FIG. 8A illustrates the case where the incident light from one incident side SMF1$i$ is outputted to SMF1$o$ on the output side. In this case, the liquid crystal spatial light modulator 1 takes an action not to perform polarization of the light beam, thereby coupling the output from the incident side SMF1$i$ with the output side SMF1$o$.

Figure 8B:
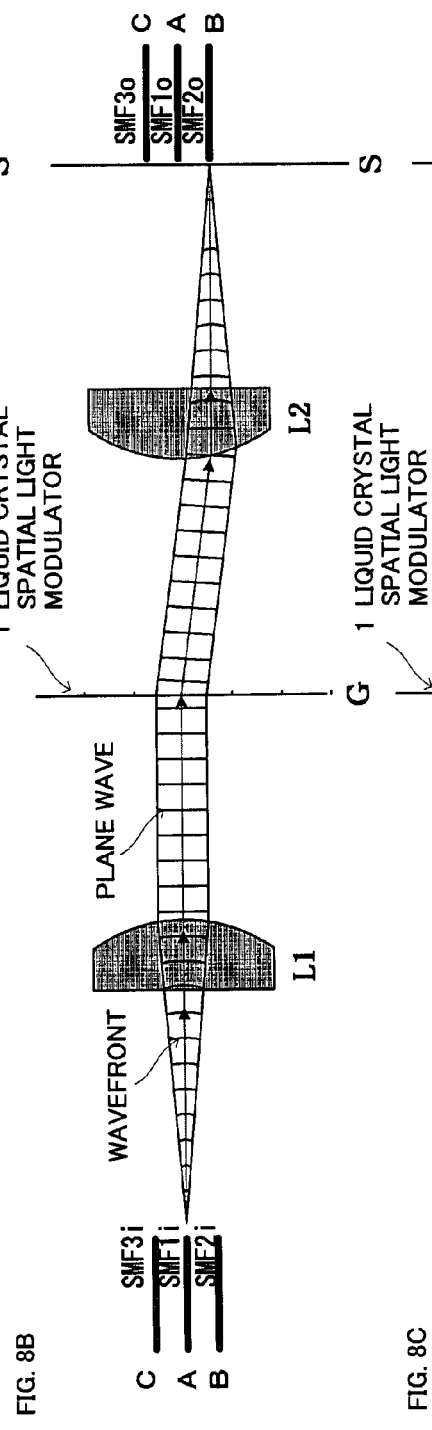

FIG. 8B illustrates the case where the incident light from one incident side SMF1$i$ is outputted to SMF2$o$ on the output side. In this case, the liquid crystal spatial light modulator 1 takes an action to perform polarization of the light beam into one direction (a lower direction in FIG. 8B), thereby coupling the output from the incident side SMF1$i$ with the output side SMF2$o$.

Figure 8C:
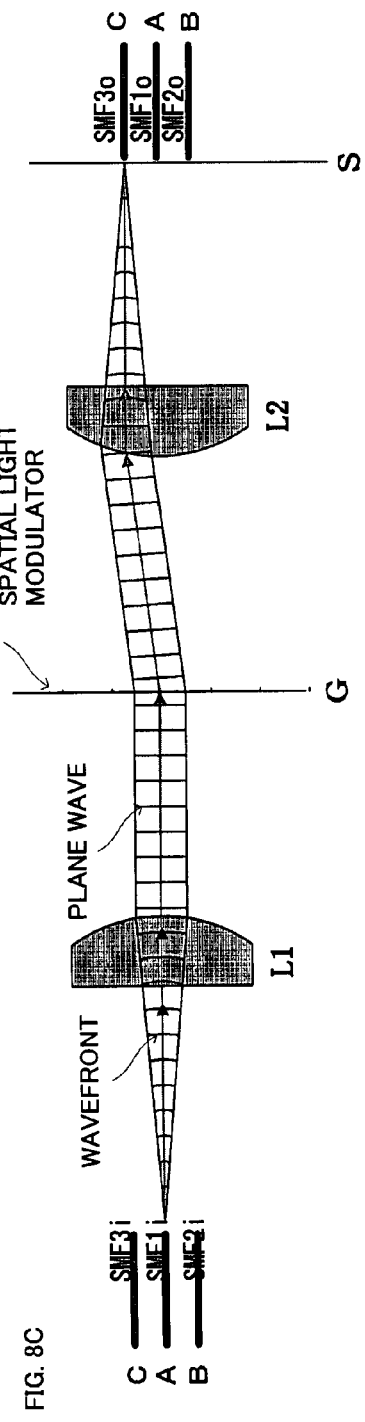

FIG. 8C illustrates the case where the incident light from one incident side SMF1$i$ is outputted to SMF3$o$ on the output side. In this case, the liquid crystal spatial light modulator 1 takes an action to perform polarization of the light beam into one direction (an upper direction in FIG. 8C), thereby coupling the output from the incident side SMF1$i$ with the output side SMF3$o$.

FIG. 10 illustrates an arrangement of the optical elements as described above, which employs the 4f-optical system for coupling an output point from the SMF1$i$ or an effective focused image of a collimated spectrometer described below on the incident side, with the SMF1$o$ or an effective focused image of a collimated spectrometer on the output side, as a focal point conjugate at the ratio of 1:1. In this configuration, when a focal distance of the lenses of the collimators L1 and L2 is assumed as "f", the liquid crystal spatial light modulator 1 is arranged in such a manner as being placed exactly at a distance of "f" from the lenses L1 and L2.

It is possible to couple an output from an arbitrary SMF or the collimated spectrometer on the incident side, with an arbitrary SMF or the collimated spectrometer on the output side. It is to be noted that in the configuration where the spectral decomposition is not used, when multiple optical signals are inputted simultaneously on the incident side, there are problems as the following; since the signals cannot be separated, individual control of the signals are disabled, and a crosstalk may occur among signals entered at one time. Therefore, only one SMF on the incident side is used as an input.

FIG. 9A illustrates the case where the incident light from one incident side SMF3$i$ is outputted to SMF2$o$ on the light output side. In this case, the liquid crystal spatial light modulator 1 takes an action to perform polarization of the light beam into one direction (a lower direction in FIG. 9A), thereby coupling the output from the incident side SMF3$i$ with the output side SMF2$o$.

FIG. 9B illustrates the case where the incident light from one incident side SMF2$i$ is outputted to SMF3$o$ on the light output side. In this case, the liquid crystal spatial light modulator 1 takes an action to perform polarization of the light beam into one direction (an upper direction in FIG. 9B), thereby coupling the output from the incident side SMF2$i$ with the output side SMF3$o$.

In the configuration as described above, the incident light whose polarization direction is aligned is inputted in the input port. FIG. 11 illustrates the configuration for inputting the incident light in the aligned polarization direction into the input port.

In order to align the polarization direction of the incident light in one direction, there is a configuration in which a light whose polarization direction is aligned in one direction at a light source side is outputted from a polarization maintaining optical fiber. There is another configuration in which a collimated spectrometer is mounted on the tip of the optical fiber, the collimated spectrometer having a function as a collimator to align the polarization direction in one direction, and a function as a spectrometer to separate the light.

Figure 11A:
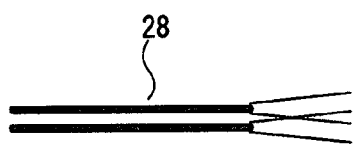
FIG. 11 illustrates a configuration for inputting into the input port, incident light beams that are aligned in the same polarization direction.

FIG. 11A illustrates a configuration in which a light whose polarization direction is aligned in one direction at the light source side is outputted from the polarization maintaining optical fiber. As the optical fiber 28, it is desirable to use the polarization maintaining optical fiber, but, alternatively, a single mode fiber (SMF) or multimode fiber (MMF) is also applicable. Since the polarization direction of the light is aligned in one direction in advance at the light source side, the light being aligned in one polarization direction is outputted from the end of the optical fiber 28. It is to be noted that diffusion of the outgoing light outputted from the end of the optical fiber 28 is determined by NA value which depends on the optical fiber. In FIG. 1A, there is shown a method for guiding two polarized components by the polarization maintaining optical fibers being different from each other. However, another configuration is possible in which both polarization waves are synthesized into one polarization maintaining optical fiber in advance, and the polarization is separated into two polarized components at a predetermined ratio as appropriate, at the output side of the polarization maintaining fiber on the receiving side.

Figure 11B:
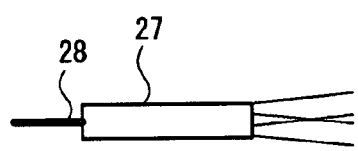
Figure 11C:
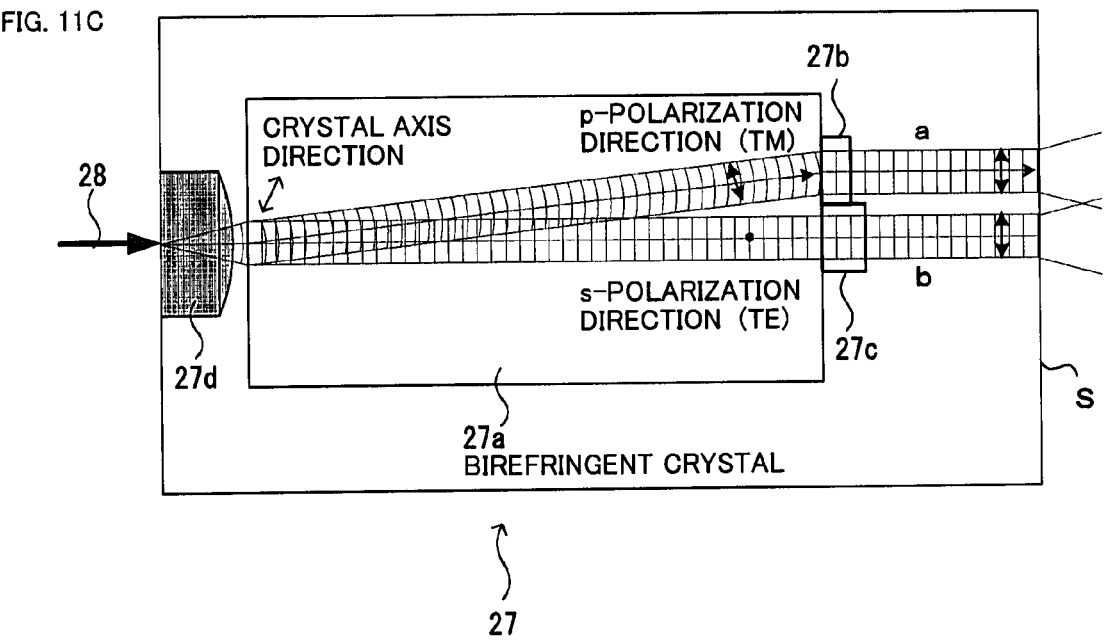

FIG. 11B and FIG. 11C illustrate an example of the configuration to install the collimated spectrometer on the tip of the optical fiber. The collimated spectrometer 27 is an element having a function as a collimator to align the polarization direction in one direction and a function as a spectrometer to separate the polarized light. In addition, the collimated spectrometer 27 is provided with a collimator lens 27d and a birefringence crystal 27a.

The light entering the collimated spectrometer 27 becomes parallel light by the collimator lens 27d, and according to the birefringence crystal 27a, the light is separated into p-polarization and s-polarization, depending on the polarization direction. In the configuration as shown in the figure, a ninety-degrees polarization rotator 27c is disposed at an output end of the birefringence crystal 27a from which the s-polarization is outputted, thereby aligning the polarization direction. It is to be noted that a rutile, YVO4, or the like, may be employed as the birefringence crystal 27a, and as the ninety-degree polarization rotator 27c, a one-half wavelength plate or a Faraday rotator may be employed.

On the other hand, a phase-difference compensator 27b for compensating a phase difference caused by the difference in the optical path is disposed at the output end of the birefringence crystal 27a from which the p-polarization is outputted. This phase-difference compensator 27b delays the phase of passing light to coincide with the optical path length of the other path, thereby rendering a phase of the beam "a" according to the p-polarization and a phase of the beam "b" according to the s-polarization to be equivalent on the output end plane S. It is to be noted that a light diffusion angle outputted from the output end plane S of the collimated spectrometer 27 is $2 \times \sin^{-1}$ (NA) radians, with respect to an apparent NA of the collimated spectrometer 27.

Figure 12:
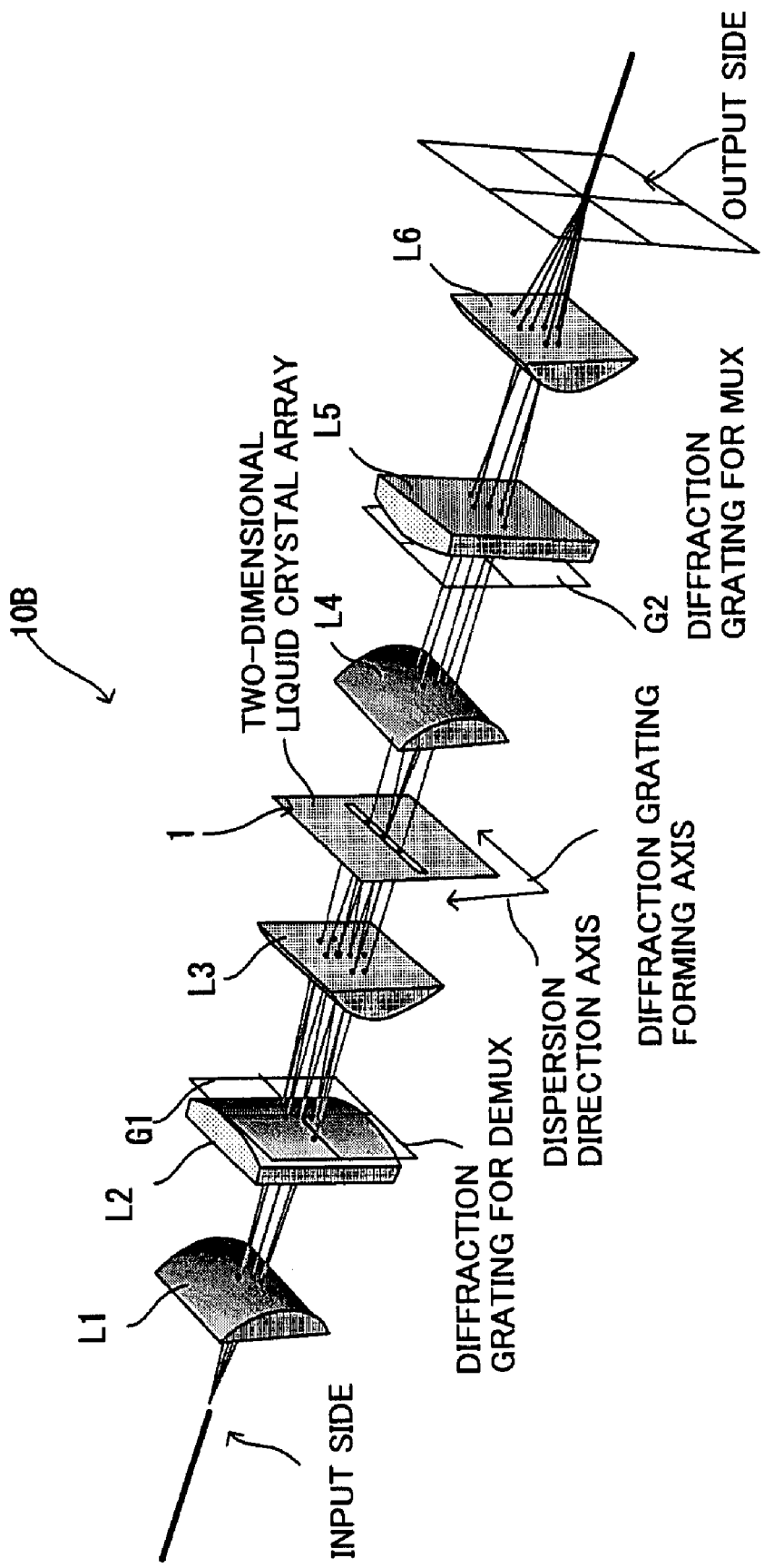
FIG. 12 illustrates a schematic configuration of the liquid crystal spatial light modulator module 10B according to the present invention.

Next, a liquid crystal spatial light modulator module 10B which performs the spectral decomposition will be explained with reference to FIG. 12 to FIG. 14. FIG. 12 is an illustration to explain a schematic configuration of the liquid crystal spatial light modulator module 10B, FIG. 13 illustrates a wavefront state viewed from the upper surface direction and the side surface direction of the liquid crystal spatial light modulator module 10B, and FIG. 14 illustrates equivalent light path positions.

In the liquid crystal spatial light modulator module 10B as shown in FIG. 12, when viewed from a dispersion direction of the liquid crystal spatial light modulator 1, the incident light inputted from the input port is collimated and shaped by an anamorphic collimator L1, such as a cylindrical lens, then further collimated and shaped by a cylindrical lens L2 in order to make a spot being long in one direction when viewed from a diffraction grating forming axis direction. Then, the light is separated by a diffraction grating for DEMUX G1 to resolve the light signals being subjected to wavelength multiplexing. Thereafter, the anamorphic collimator L3 focuses the light on the liquid crystal spatial light modulator 1 in a form of line, only in the dispersion direction of the liquid crystal spatial light modulator 1.

Here, the liquid crystal spatial light modulator 1 includes a liquid crystal layer and electrodes being arranged two-dimensionally. In the liquid crystal spatial light modulator 1, the incident light enters the bi-axial and two-dimensional liquid crystal array, the array including the diffraction grating forming axis, along which the light is extended in the form of line according to the anamorphic collimator L1 and the cylindrical lens L2, and the dispersion direction axis being orthogonal to the diffraction grating forming axis. The two-dimensional liquid crystal array has a configuration where rows of one-dimensional array in the diffraction grating forming axis are aligned in the dispersion direction axis. With this configuration, it is possible to control the optical intensity modulation and the phase modulation independently every wavelength, by inputting the light beams of wavelengths different from one another respectively in the rows of one-dimensional array.

Accordingly, the light entering the liquid crystal spatial light modulator 1 is subjected to the phase modulation and the optical intensity modulation independently every individual wavelength. Then, after the phase modulation and the optical intensity modulation are performed, the cylindrical lens L4 converts the outgoing light into parallel light in the dispersion direction of the liquid crystal spatial light modulator 1, and then the light enters the diffraction grating for MUX G2.

The diffraction grating for MUX G2 synthesizes various wavelengths of the incident light, and the light passes through the cylindrical lens L5, the light being concentrated by the anamorphic collimator L6 such as a cylindrical lens, so as to form a circular spot, and the light is outputted to the output port. With this configuration, the spectral decomposition is performed by the diffraction grating for DEMUX. Therefore, it is possible to perform the light intensity modulation and the phase modulation with respect to each wavelength, independently at various portions in the form of line within the liquid crystal spatial light modulator 1.

It is to be noted that the liquid crystal spatial light modulator 1 is provided with a two-dimensional liquid crystal cell layer, and a width in the longitudinal direction and a width in the lateral direction are respectively equal to or larger than a width of the parallel beam incident on the liquid crystal spatial light modulator 1 and a width of light irradiation range having been subjected to the resolution.

FIG. 13 illustrates a wavefront state (and a light beam direction) viewed from the upper surface direction and the side surface direction of the liquid crystal spatial light modulator module 10B as shown in FIG. 12. It is to be noted that in FIG. 13, a position indicated by LC1 represents a place where the liquid crystal spatial light modulator 1 is installed.

Figure 13A:
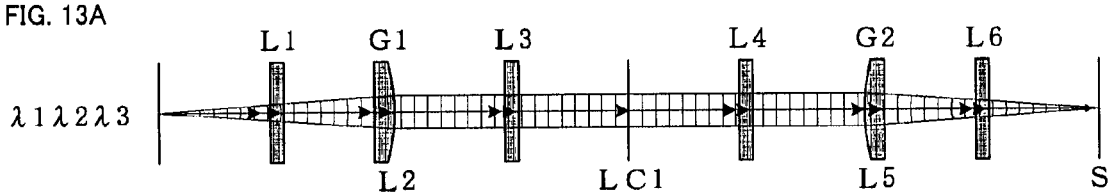
FIG. 13 illustrates a wavefront state viewed from the upper surface direction and the side surface direction of the liquid crystal spatial light modulator module 10B according to the present invention.
Figure 13B:
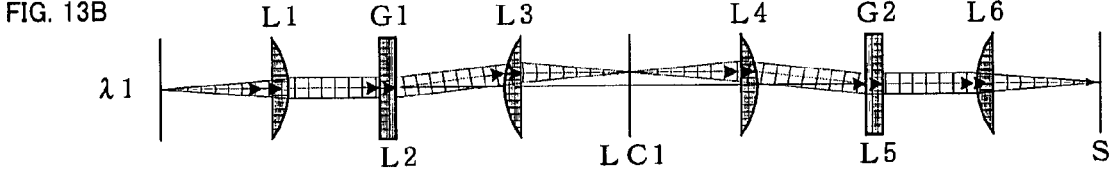
Figure 14:
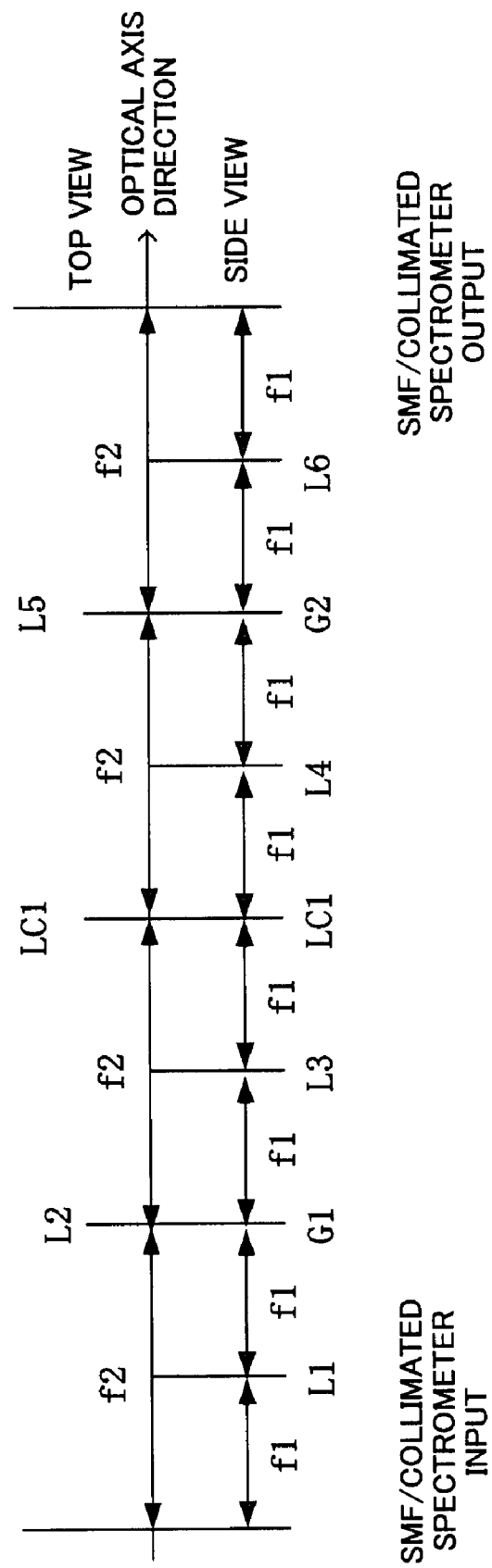
FIG. 14 illustrates equivalent light path positions of the liquid crystal spatial light modulator module 10B according to the present invention.

FIG. 13A illustrates a wavefront state viewed from the upper surface direction of the liquid crystal spatial light modulator module 10B, and FIG. 13B illustrates a wavefront state viewed from the side surface direction of the liquid crystal spatial light modulator module 10B.

Here, it is assumed that incident light beams including different wavelengths, λ1, λ2, and λ3 enter the input port, and adjusting of the light intensity modulation and the phase modulation are performed in the liquid crystal spatial light modulator 1 with respect to each wavelength.

Figure 13C:
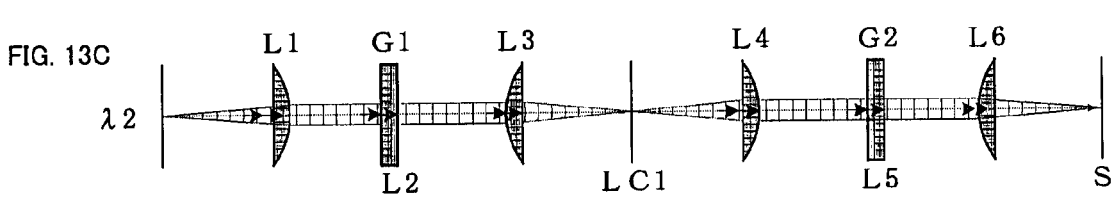
Figure 13D:
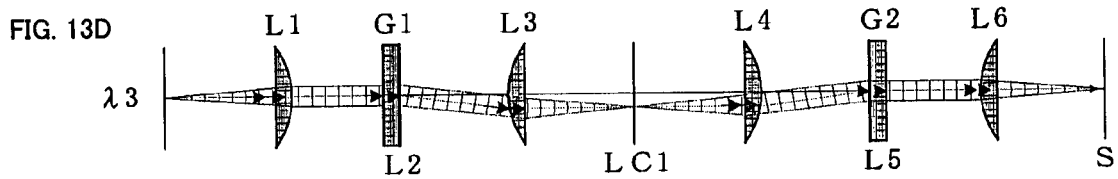

The wavelength components included in the incident light are resolved into each component in the dispersion direction axis. The illustrations viewed from the side surface direction as shown in FIG. 13B to FIG. 13D indicate the state of each of the wavelength components. By way of example, FIG. 13B illustrates the case of wavelength λ1, FIG. 13C illustrates the case of wavelength λ2, and FIG. 13D illustrates the case of wavelength λ3.

As thus described, the wavelengths are respectively focused on the positions being different in the dispersion direction axis. Therefore, adjustment of the light intensity modulation and the phase modulation are performed by the one-dimensional array at the position where the light beams of each wavelength are concentrated, thereby enabling the light intensity modulation adjustment and the phase modulation independently with respect to each wavelength.

FIG. 14 illustrates an arrangement of the spatial light elements having the configuration as described above. When viewed from the upper surface (the top view of FIG. 14), the arrangement of the spatial light elements of the liquid crystal spatial light modulator module 10B has the 4f-optical system arrangement equivalent to the arrangement of FIG. 10 as described above. The output point of the SMF or an effective focused image of the collimated spectrometer on the incident side is coupled with the SMF or that of the collimated spectrometer on the output side, as a focal point conjugate at the ratio of 1:1. On the other hand, when viewed from the side surface of spectral separating direction (side view in FIG. 14), the 4f optical system arrangement is established from the SMF output point or the effective focal point image position of the collimated spectrometer on the incident side, up to the liquid crystal spatial light modulator 1. In addition, another 4f optical system arrangement is established from the liquid crystal spatial light modulator 1 up to the SMF or the focal point of the collimated spectrometer on the output side.

Therefore, the output point of the SMF or the effective focused image position of the collimated spectrometer on the incident side is coupled as a focal point conjugate at the ratio of 1:1 on the liquid crystal spatial light modulator module 10B, and the point on the liquid crystal spatial light modulator 1 is coupled with the SMF or the focal point of the collimated spectrometer on the output side at the ratio of 1:1 as a focal point conjugate.

By using the anamorphic optical system such as a cylindrical lens, it is possible to control independently, a direction of beam polarization generated by the liquid crystal diffraction grating, and a direction of spectral decomposition generated by the two diffraction gratings.

It is to be noted that in FIG. 14, if an ideal equivalent optical circuit is assumed, which does not consider a thickness of lens and the like, a focusing length f2 of each lens viewed from the upper direction and a focusing length f1 of each lens viewed from the side surface have the following relationship, $f2=2 \cdot f1$.

Figure 15:
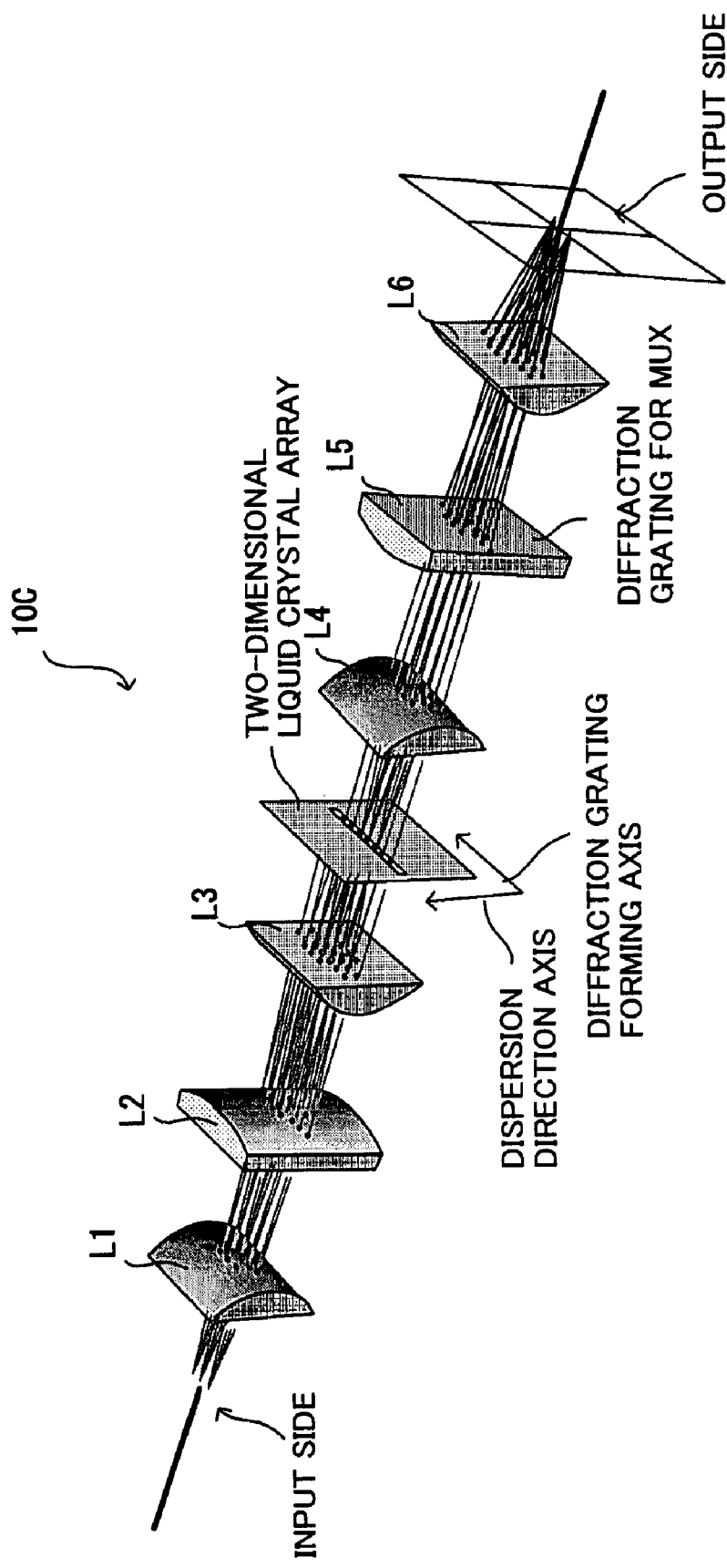
FIG. 15 illustrates a schematic configuration of the liquid crystal spatial light modulator module 10C according to the present invention.

Next, with reference to FIG. 15 and FIG. 16, there will be explained a liquid crystal spatial light modulator module 10C being a second configuration example, in which spectral decomposition is not performed. FIG. 15 illustrates a schematic configuration of the liquid crystal spatial light modulator module 10c, and FIG. 16 illustrates a wavefront state viewed from the upper surface direction and the side surface direction of the liquid crystal spatial light modulator module 10C as shown in FIG. 15.

The liquid crystal spatial light modulator module 10C has a configuration obtained by excluding the spectral decomposition gratings G1 and G2 and only including cylindrical lenses L2 and L5 in the configuration of the liquid crystal spatial light modulator module 10B. Since there is no spectral decomposition by the spectral composition gratings G1 and G2, it is not possible to perform the light intensity modulation and the phase modulation with respect to each wavelength.

Figure 16A:
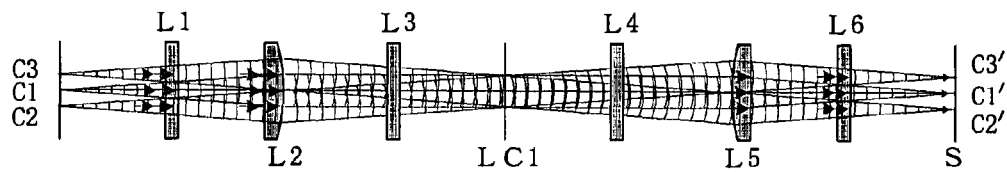
FIG. 16 illustrates a wavefront state viewed from the upper surface direction and the side surface direction of the liquid crystal spatial light modulator module 10C according to the present invention.
Figure 16B:
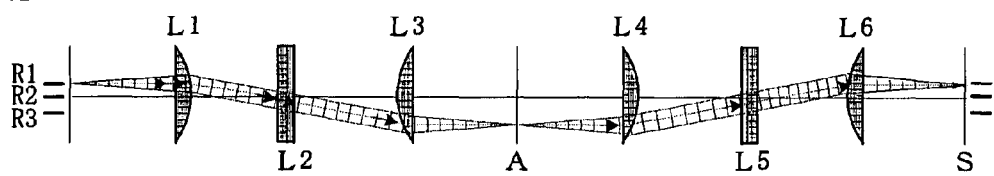
Figure 16C:
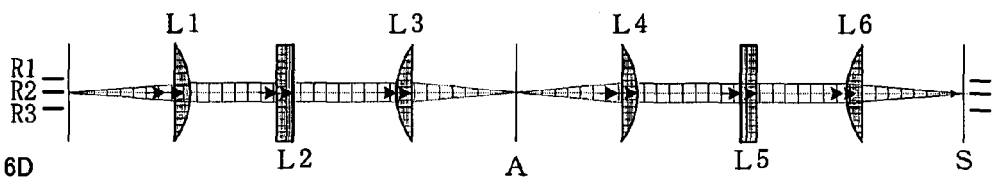
Figure 16D:
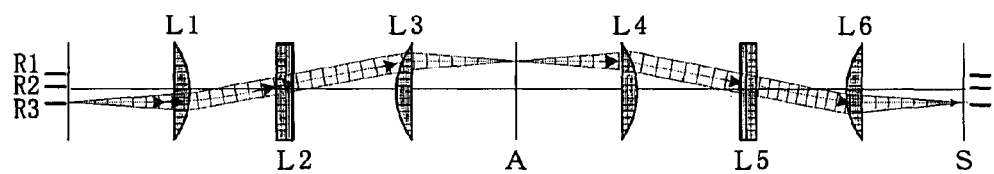
Figure 16E:
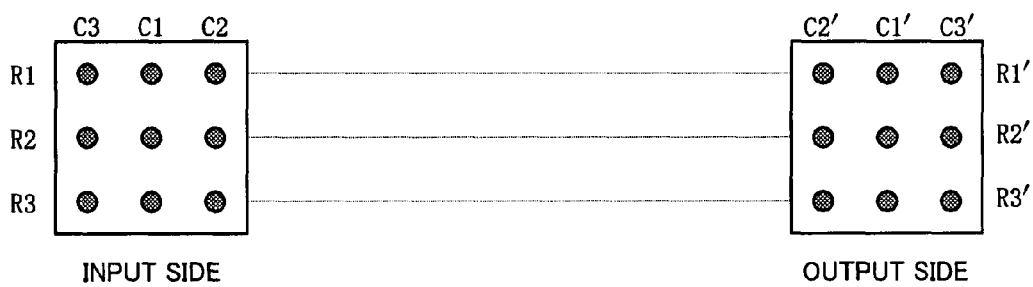

FIG. 16A illustrates a wavefront state (and a light beam direction) viewed from the upper surface direction of the liquid crystal spatial light modulator module 10C, and each of FIG. 16B to FIG. 16D illustrates a wavefront state viewed from the side surface direction of the liquid crystal spatial light modulator module 10C. FIG. 16E illustrates a configuration of the ports viewed from the input side and the output side of FIG. 16B, where nine ports as inputs, 3 lines by 3 columns, are arranged.

Here, groups of incident light beams, R1, R2, and R3, being different from one another, respectively enter the rows of the lens L1, being different in the side surface direction. With this configuration, in the column directions C3, C1, and C2 viewed from the upper surface direction as shown in FIG. 16A, the light beams are focused in one line on the modulator module surface of the liquid crystal spatial light modulator 1 not being separated. On the other hand, in the line directions viewed from the side surface direction as shown in FIG. 16B, the light beams are concentrated on different lines on the modulator module surface of the liquid crystal spatial light modulator 1, thereby separating the light. Therefore, by using the two-dimensional liquid crystal diffraction grating, the phase modulation can be performed independently on the different lines on the modulator module surface.

As a result, the configuration above achieves a function which is equivalent to the function that the intensity and phase modulator as shown in FIG. 8 having an optical path switching feature is arranged independently in each of the three lines. This configuration is effective to combine and downsize the liquid crystal spatial light modulator module with the function as shown in FIG. 8.

Figure 17:
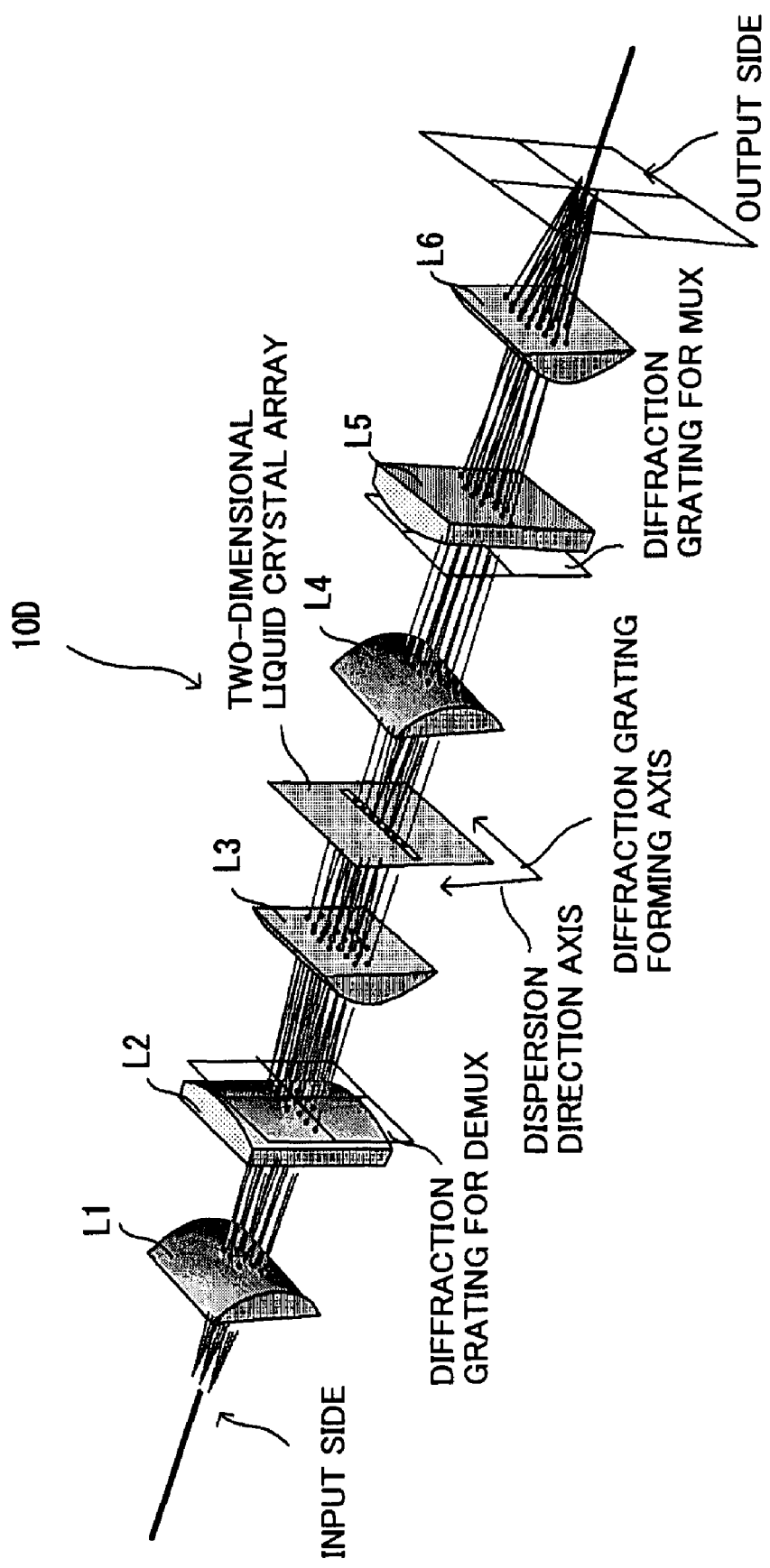
FIG. 17 illustrates a schematic configuration of the liquid crystal spatial light modulator module 10D according to the present invention.

Next, with reference to FIG. 17 and FIG. 18, the liquid crystal spatial light modulator module 10D will be explained, which is a second configuration example when the spectral decomposition is performed. FIG. 17 illustrates a schematic configuration of the liquid crystal spatial light modulator module 10D, and FIG. 18 illustrates a wavefront state viewed from the upper surface direction and the side surface direction of the liquid crystal spatial light modulator module 10D as shown in FIG. 17.

The liquid crystal spatial light modulator module 10D has a configuration similar to the configuration of the liquid crystal spatial light modulator module 10B as shown in FIG. 12 described above, and in this configuration, light beams having different wavelengths are separated at the incident side, and enter at different incident positions respectively. Since the optical configuration of the liquid crystal spatial light modulator module 10D is the same as the liquid crystal spatial light modulator module 10B as shown in FIG. 12, tedious explanation will not be made.

Figure 18A:
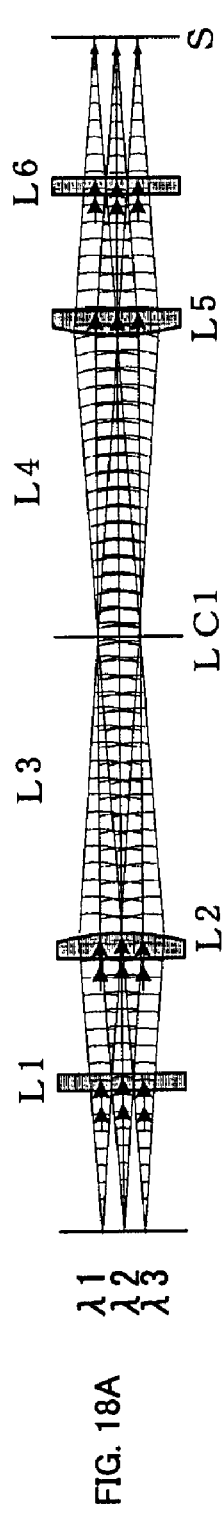
FIG. 18 illustrates a wavefront state viewed from the upper surface direction and the side surface direction of the liquid crystal spatial light modulator module 10D according to the present invention.
Figure 18B:
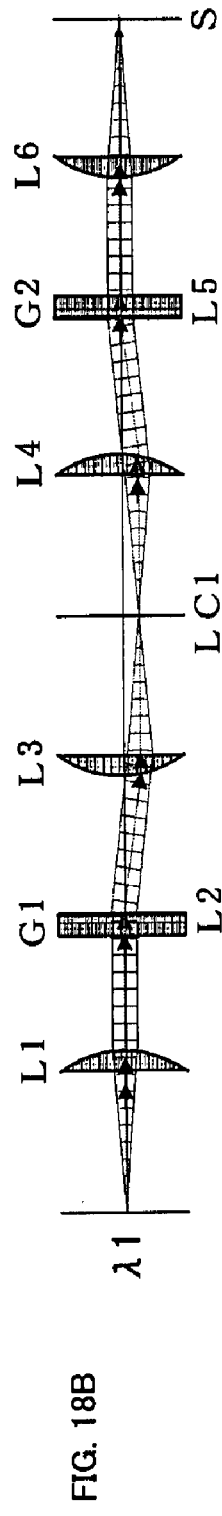
Figure 18C:
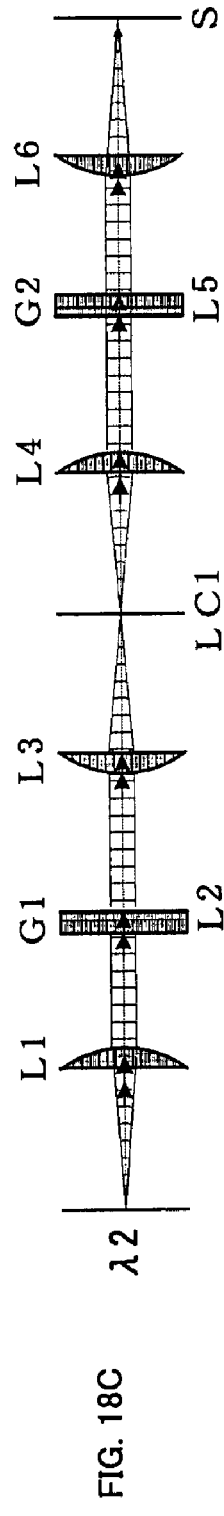
Figure 18D:
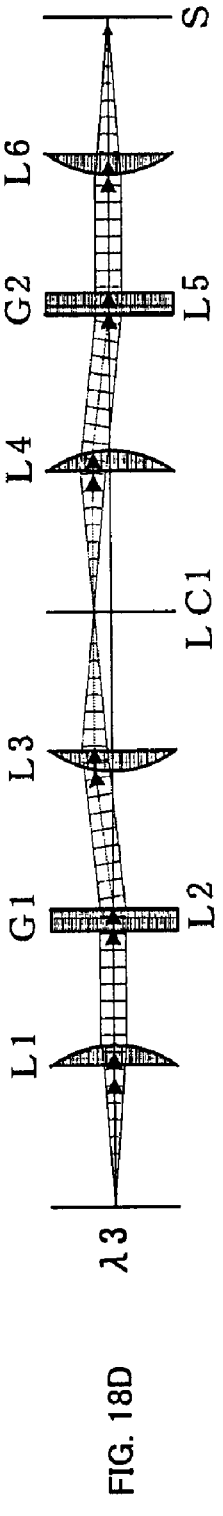

FIG. 18A illustrates a wavefront state (and light beam direction) viewed from the upper surface direction, and FIG. 18B illustrates a wavefront state viewed from the side surface direction of the liquid crystal spatial light modulator module 10D.

Here, at the input port, incident light beams having different wavelengths enter at the different positions in the upper surface direction on the lens L1. Accordingly, in the wavefront state viewed from the upper surface direction as shown in FIG. 18A, the light beams appear to be overlapping on the modulator module surface of the liquid crystal spatial light modulator 1. However, in the wavefront state viewed from the side surface direction as shown in FIG. 18B, the light beams are concentrated on respectively different lines on the modulator module surface of the liquid crystal spatial light modulator 1, according to the spectral decomposition gratings G1 and G2. In these lines, the optical intensity modulation and the phase modulation can be performed with respect to each wavelength.

If it is assumed here that three SMFs are arranged at the input side, and when the incident light beams being multiplexed by wavelength enter from the SMFs respectively, each wavelength (or a group of wavelengths) can be controlled independently in the case where there are no overlaps of the wavelengths being multiplexed by each of the SMFs. However, if there are any overlaps of wavelengths being multiplexed by each of the SMFs, it is not possible to control each wavelength independently.

By way of example, different wavelengths $\lambda 1$, $\lambda 2$, and $\lambda 3$ are inputted in the SMF 1, different wavelengths $\lambda 4$, and $\lambda 5$ are inputted in the SMF 2, and further different wavelength $\lambda 6$, $\lambda 7$, and $\lambda 8$ are inputted in the SMF 3. In this case, if wavelengths transmitted to the respective optical fibers are different, according to the diffraction grating for the spectral decomposition, optical signals are inputted into rows of one-dimensional array at different locations of the liquid crystal two-dimensional array. Therefore, it is possible to perform the optical intensity modulation, the phase modulation, and the spectral decomposition independently by the liquid crystal device.

On the other hand, in the case where light of the same wavelength is inputted in the different ports, for example, wavelength $\lambda 1$ is inputted into the SMF 1, and another light of wavelength $\lambda 1$ is inputted into the SMF 2, each signal cannot be controlled independently, and this may cause a cross talk.

Figure 19:
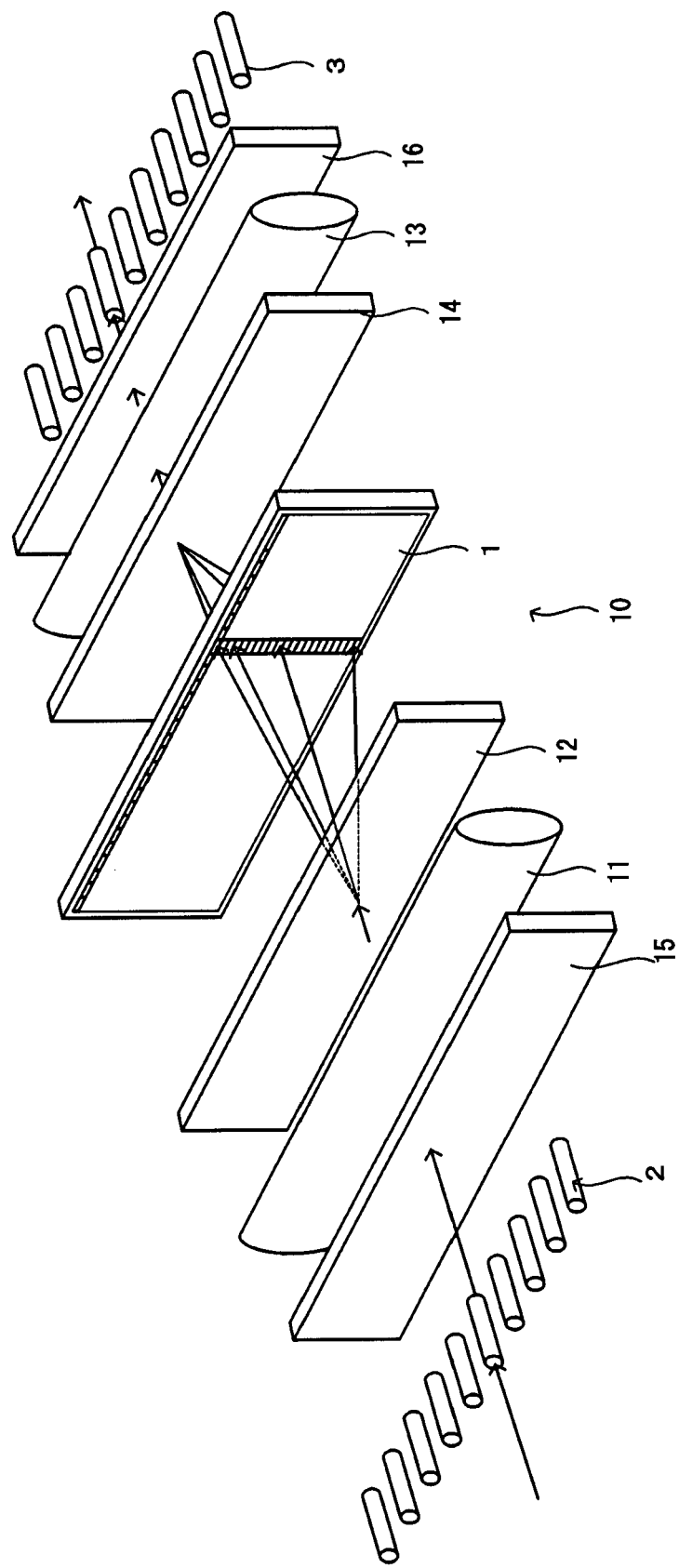
FIG. 19 illustrates a configuration example of a two-dimensional liquid crystal spatial light modulator module according to the present invention.

FIG. 19 illustrates a configuration example of the two-dimensional liquid crystal spatial light modulator module. It is to be noted that FIG. 19 shows a configuration example of a transmission type modulator. In FIG. 19, the liquid crystal spatial light modulator 1 provided in the liquid crystal spatial light modulator module 10 has a configuration in which liquid crystal layers and electrodes are arranged two-dimensionally, and the phase modulation and the intensity modulation can be performed with respect to each wavelength component.

On the incident side of the liquid crystal spatial light modulator 1, there are arranged input ports 2, a polarization conversion element 15 for converting one polarized light of the incident light to the other polarized light to convert the polarization direction to a direction which is changeable by the liquid crystal spatial light modulator 1, an anamorphic collimator 11 for collimating and shaping the incident light in a form of line on the surface of the liquid crystal spatial light modulator 1, and a spectrometer 12 which spectrally separates the incident light into each of the wavelength components $\lambda 1$ to $\lambda n$. On the other hand, on the output side of the liquid crystal spatial light modulator 1, there are arranged a coupler 14 for combining each of the wavelength components, an anamorphic collimator 13, a polarization conversion element 16 for converting the polarization state, and output ports 3. As the configuration explained with reference to FIG. 17, the anamorphic collimators 11 and 13 may have another configuration incorporating multiple lenses, i.e., additional lens are arranged between the spectrometer 12 and the liquid crystal spatial light modulator 1, and between the coupler 14 and the liquid crystal spatial light modulator 1. Here, the input ports 2 and the output ports 3 may be made of optical fibers.

The example described above indicates a transmission type configuration, but a reflection type configuration is also applicable. FIG. 20 and FIG. 21 are illustrations to explain the reflection type configuration example.

Figure 20A:
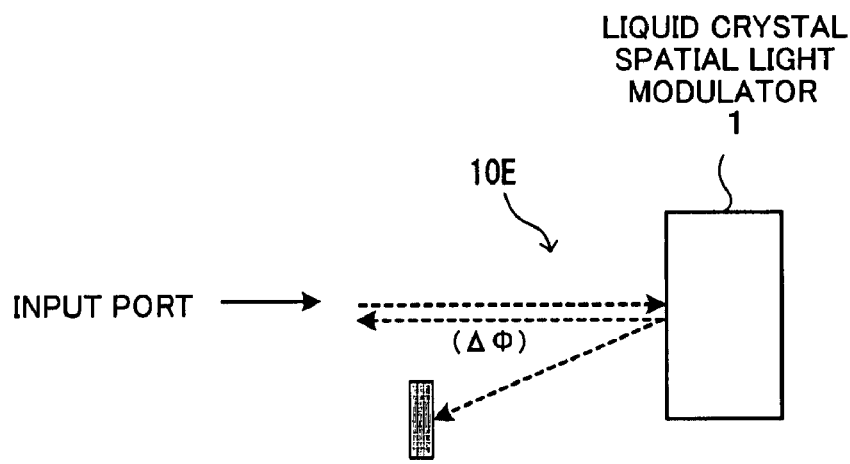
FIG. 20 illustrates a reflection type configuration example of the liquid crystal spatial light modulator module according to the present invention.
Figure 20B:
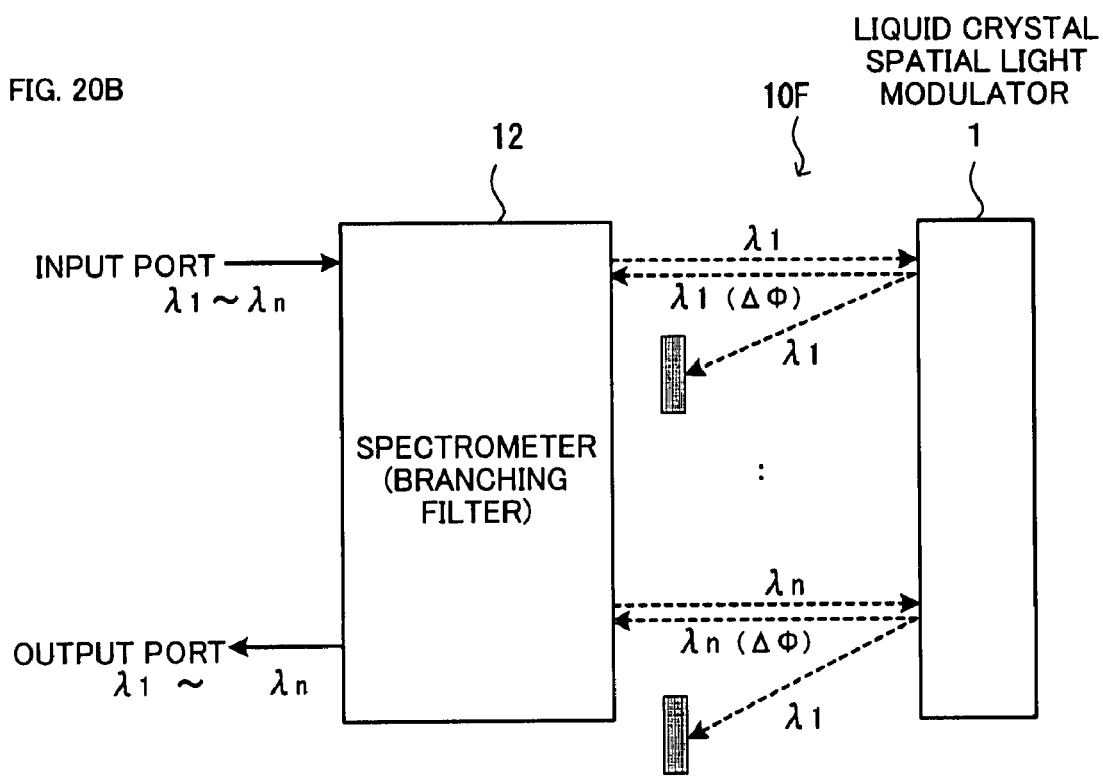
Figure 21:
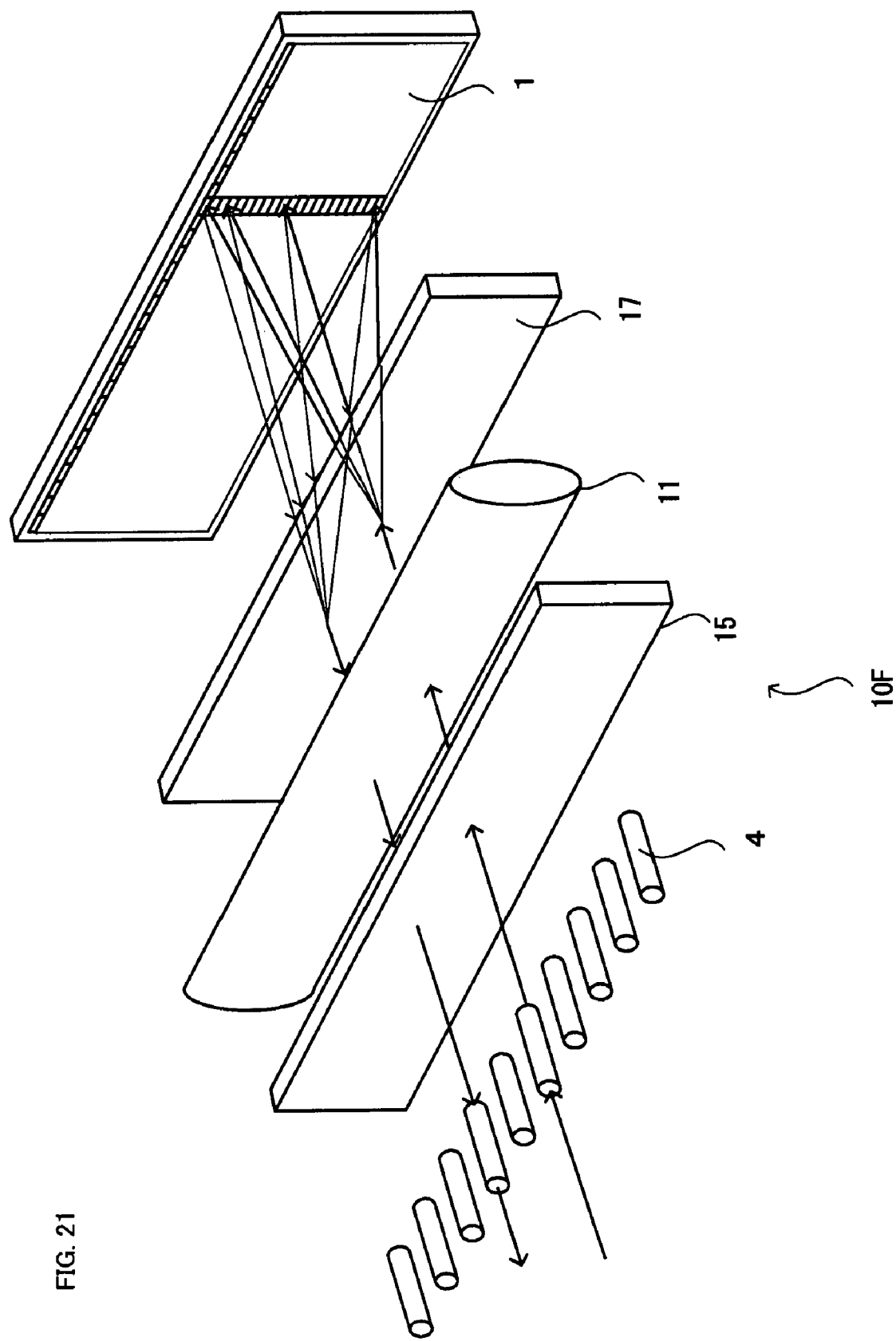
FIG. 21 illustrates a reflection type configuration example of the liquid crystal spatial light modulator module according to the present invention.

FIG. 20A is an illustration to explain a schematic configuration of one-dimensional liquid crystal optical modulator 10E, and FIG. 20B is an illustration to explain a schematic configuration of two-dimensional liquid crystal optical modulator 10F.

In the one-dimensional liquid crystal spatial light modulator module 10E, the incident light inputted from the input port enters the reflection type liquid crystal spatial light modulator 1. Here, the reflection type liquid crystal spatial light modulator 1 includes a liquid crystal layer and electrodes one-dimensionally arranged, and it is provided with a reflective surface (not illustrated). The light that has entered the liquid crystal spatial light modulator 1 is subjected to the phase modulation and the light intensity modulation, before or after being reflected by the reflective surface, and then the modulated light is outputted. The light outputted from the liquid crystal spatial light modulator 1 is returned to the input port side. It is to be noted that in the light intensity modulation, the light being discarded is outputted heading to a direction different from the input port side.

On the other hand, in the two-dimensional liquid crystal spatial light modulator module 10F, incident light inputted from the input port ($\lambda 1$ to $\lambda n$) enters the spectrometer (dispersive element) 12, and the spectrometer separates the light spectrally to allow the light beams having each of the wavelengths $\lambda 1$ to $\lambda n$ to enter the reflection type liquid crystal spatial light modulator 1.

Here, the reflection type liquid crystal spatial light modulator 1 includes liquid crystal layers and electrodes being arranged two-dimensionally, and it is provided with a reflective surface (not illustrated). The light entering the liquid crystal spatial light modulator 1 is subjected to the phase modulation and the light intensity modulation with respect to each wavelength, and thereafter the modulated light is outputted. The light outputted from the liquid crystal spatial light modulator 1 is returned to the input port side. It is to be noted that in the light intensity modulation, the light being discarded is outputted heading to a direction different from the input port side.

FIG. 21 illustrates a configuration example of the two-dimensional reflection type liquid crystal spatial light modulator module 10F as shown in FIG. 20. In FIG. 21, the liquid crystal spatial light modulator 1 provided in the liquid crystal spatial light modulator module 10F has a configuration where the liquid crystal layers and the electrodes are arranged two-dimensionally, and the phase modulation and the intensity modulation can be performed with respect to each wavelength component.

On the incident side and on the output side of the liquid crystal spatial light modulator 1, there are arranged input/output ports 4, a polarization conversion element 15 for converting the polarization state, an anamorphic collimator 11 for collimating and shaping the incident light onto a surface of the liquid crystal spatial light modulator 1 in the form of line, and a spectral coupler 17 which spectrally separates and couples the incident light into each of the wavelengths component $\lambda 1$ to $\lambda n$. In this configuration, by performing the light intensity modulation, the input port for inputting the incident light is made different from the output port for outputting the outgoing light having been optically modulated. In each of the configuration examples as described above, the input/output ports 4 may be made of optical fibers. As explained with reference to the configuration of FIG. 17, the anamorphic collimators 11 may have another configuration incorporating multiple lenses, i.e., an additional lens is arranged between the spectral coupler 17 and the liquid crystal spatial light modulator 1.

Figure 22:
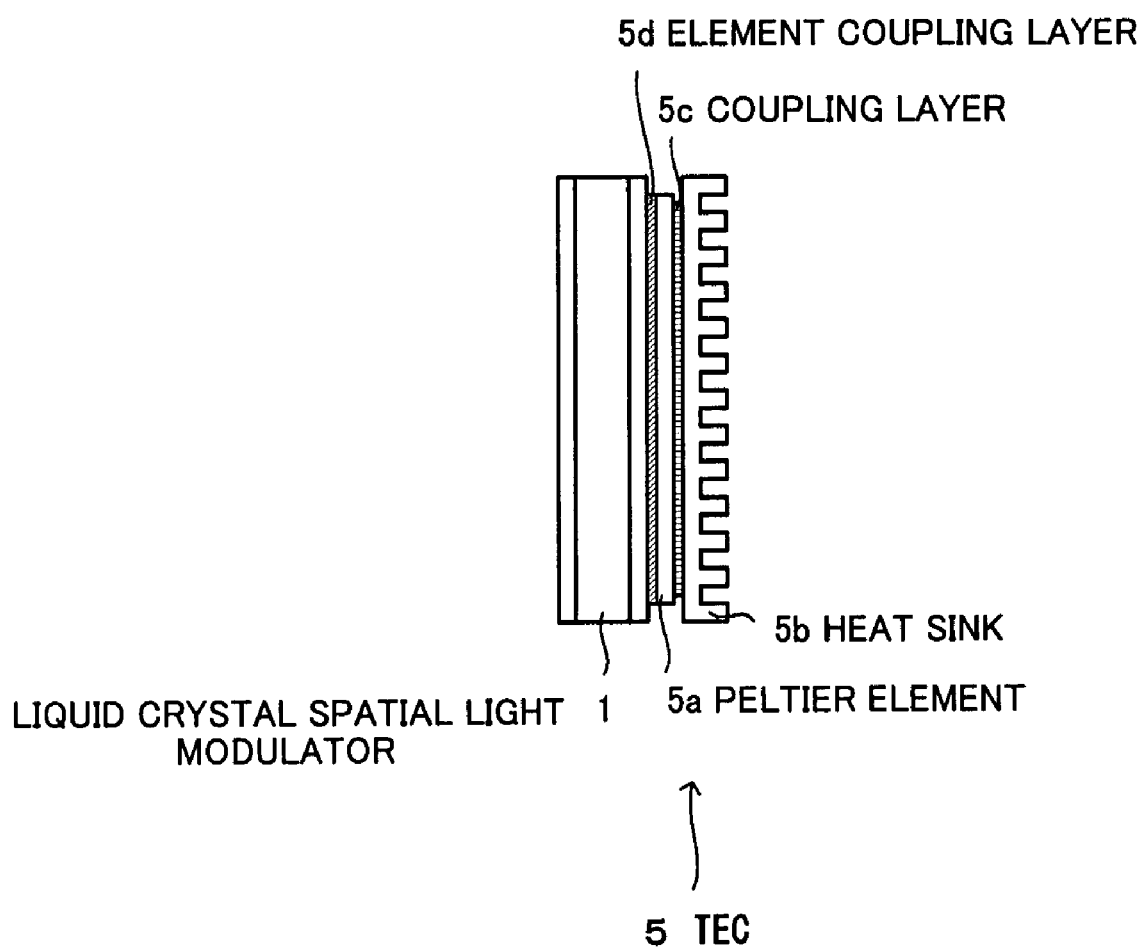
FIG. 22 illustrates one configuration example of TEC.

In the reflection type liquid crystal spatial light modulator module 10F, it is desirable to configure such that TEC (Thermo-Electric Cooler, Peltier element) is provided so as to keep temperature of the liquid crystal at a constant level irrespective of a temperature of external environment. FIG. 22 is an illustration to explain one configuration example of the TEC. The TEC 5 may have a configuration obtained by combining a Peltier element 5a and a heat sink 5b, for instance.

In FIG. 22, the TEC 5 has a configuration in which the Peltier element 5a is provided, via an element coupling layer 5d, on the backside (a surface opposite to the incident direction) of the substrate forming the reflective surface of the liquid crystal spatial light modulator 1, and the heat sink 5b is further provided sandwiching a coupling layer 5c. For the element coupling layer 5d and the coupling layer 5c, bonding agent may be employed, which is made of metal such as indium and solder or epoxy/acryl resin. In addition, when the Peltier element 5a is mounted on the liquid crystal spatial light modulator 1 or on the heat sink, it is possible to place an insulating layer such as alumina and nitride aluminum therebetween.

When the liquid crystal spatial light modulator module of the present invention is used to configure an optical clock multiplier, an optical clock being treated may become ultrahigh speed, approximately over 160 Gigabit/second, for instance. In such an ultrafast environment, a time interval between clocks may become extremely short, and fluctuations of light passing time may have a large influence, the fluctuations being caused by phase variation due to a temperature change of the liquid crystal layer and surrounding optical members. Therefore, it is quite important to maintain the temperature of the liquid crystal to be constant, irrespective of the temperature of the external environment.

Accordingly, it is desirable that a phase fluctuation of the liquid crystal layer, caused by the change in environmental temperature, is controlled to be equal to or less than $\lambda/10$ of the maximum usable light wavelength, when an identical voltage profile is applied, if the phase fluctuation is wavelength-converted. For the purpose intended above, the liquid crystal spatial light modulator 1 should be bonded and fixed on a thermoelectric cooler (TEC) such as the Peltier element 5a via metal or resin.

Figure 23:
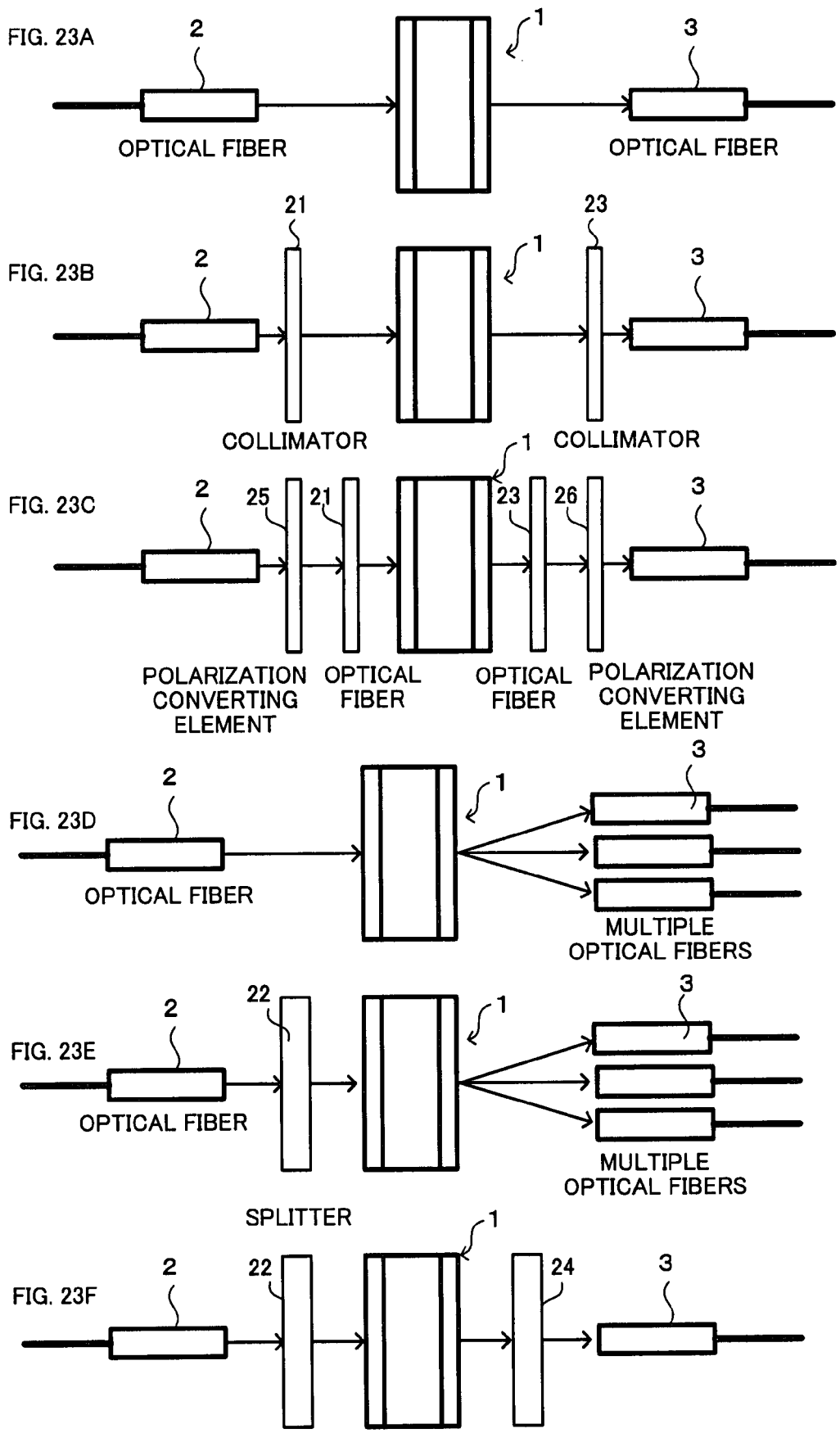
FIG. 23 illustrates configuration examples of the liquid crystal spatial light modulator module according to the present invention.

Hereinafter, a configuration example of the liquid crystal spatial light modulator module according to the present invention will be explained, with reference to FIG. 23.

FIG. 23A illustrates a configuration example in which optical fibers constitute the input port 2 and the output port 3 respectively, and the liquid crystal spatial light modulator 1 is placed between these optical fibers. Here, the optical fiber as illustrated may be provided with a function as a collimator, by employing a core expanded fiber, or by fusion-bonding a small-sized lens made of low-fusing point glass on the optical fiber.

FIG. 23B illustrates a configuration example in which, in addition to the configuration of the aforementioned FIG. 23A, a collimator 21 is placed between the input port 2 and the liquid crystal spatial light modulator 1, and a collimator 23 is placed between the liquid crystal spatial light modulator 1 and the output port 3. With the configurations as shown in FIG. 23A and FIG. 23B, parallel light is allowed to enter the liquid crystal spatial light modulator 1, by the function of the collimators 21 and 23.

FIG. 23C illustrates a configuration example in which, in addition to the configuration of the aforementioned FIG. 23B, a polarization conversion element 25 is placed between the input port 2 and the collimator 21, and a polarization conversion element 26 is placed between the collimator 23 and the output port 3. The polarization conversion element aligns the polarization to maximize an efficiency of the optical conversion operation in the liquid crystal layer of the liquid crystal spatial light modulator 1. It is to be noted that the sequence for placing the collimator 21 and the polarization conversion element 25, and the sequence for placing the collimator 23 and the polarization conversion element 26 may be changed over.

FIG. 23D illustrates a configuration example in which outgoing light having been subjected to the intensity modulation by the liquid crystal spatial light modulator 1 is outputted to multiple output ports 3, and multiple optical fibers are arranged as the output ports 3. With this configuration, it is possible to adjust the polarization angle of the outgoing light after the intensity modulation, and this allows a selection of the output port 3 used for outputting.

FIG. 23E illustrates a configuration example in which, in addition to the configuration of the aforementioned FIG. 23D, a spectrometer 22 is provided in front of the liquid crystal spatial light modulator 1, the phase modulation and the intensity modulation are performed for each of the wavelength components obtained by separating the light by the spectrometer 22, and then the outgoing light having been optically adjusted is outputted to the multiple output ports 3. Multiple optical fibers are arranged as the output ports. With this configuration, the phase modulation and the intensity modulation can be performed for each of the wavelength components, and it is further possible to output the light from a selected output port 3.

FIG. 23F illustrates a configuration example in which, in addition to the configuration of the aforementioned FIG. 23E, a coupler 24 is provided in the rear of the liquid crystal spatial light modulator 1, and each of the wavelength components are coupled by the coupler 24 to be outputted to the output port 3. With this configuration, the phase modulation and the intensity modulation can be performed for each of the wavelength components, and further, the optical components having been subjected to the phase modulation and the intensity modulation for each of the wavelengths are outputted from the output port 3, as one optical signal.

Figure 24:
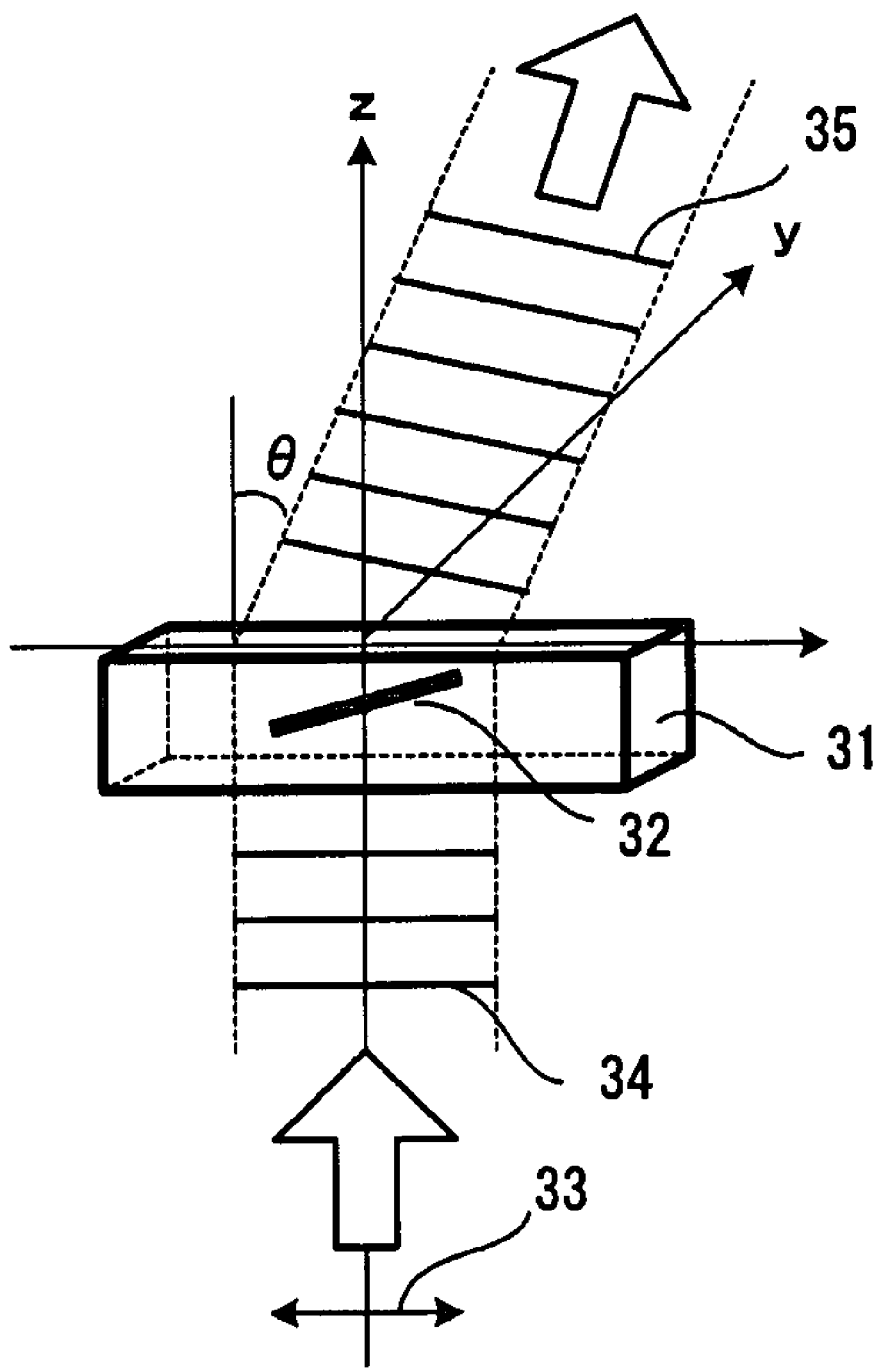
FIG. 24 is a schematic view showing a basic principle of operation of the liquid crystal spatial light modulator module according to the present invention.

Hereinafter, a liquid crystal spatial light modulator to which the present invention is applied will be explained. Firstly, an explanation will be made regarding a principle of operation of the liquid crystal spatial light modulator 31. FIG. 24 is a schematic illustration showing a basic principle of operation of the liquid crystal spatial light modulator. Here, it is assumed that in the liquid crystal spatial light modulator 31, when an external electric field is applied in the state where a director 32 is homogeneously oriented in the direction parallel with x-z plane, p-type (positive type) nematic liquid crystal is oriented in such a manner that a longitudinal axis direction of the director 32 is made parallel with an electric field direction. It is also assumed that linearly polarized light 33 oscillating in the direction parallel to the x-axis enters in the z-axis direction. An incident wavefront 34 before entering the liquid crystal spatial light modulator 31 forms a flat surface. When the electric field is applied to the liquid crystal spatial light modulator 31 to control an in-plane distribution of the director 32 so that a predetermined refractive index distribution is obtained, it is possible to convert the incident wavefront 34 into an outgoing wavefront 35 having a plane wave which is polarized only by a predetermined angle θ.

Figure 25:
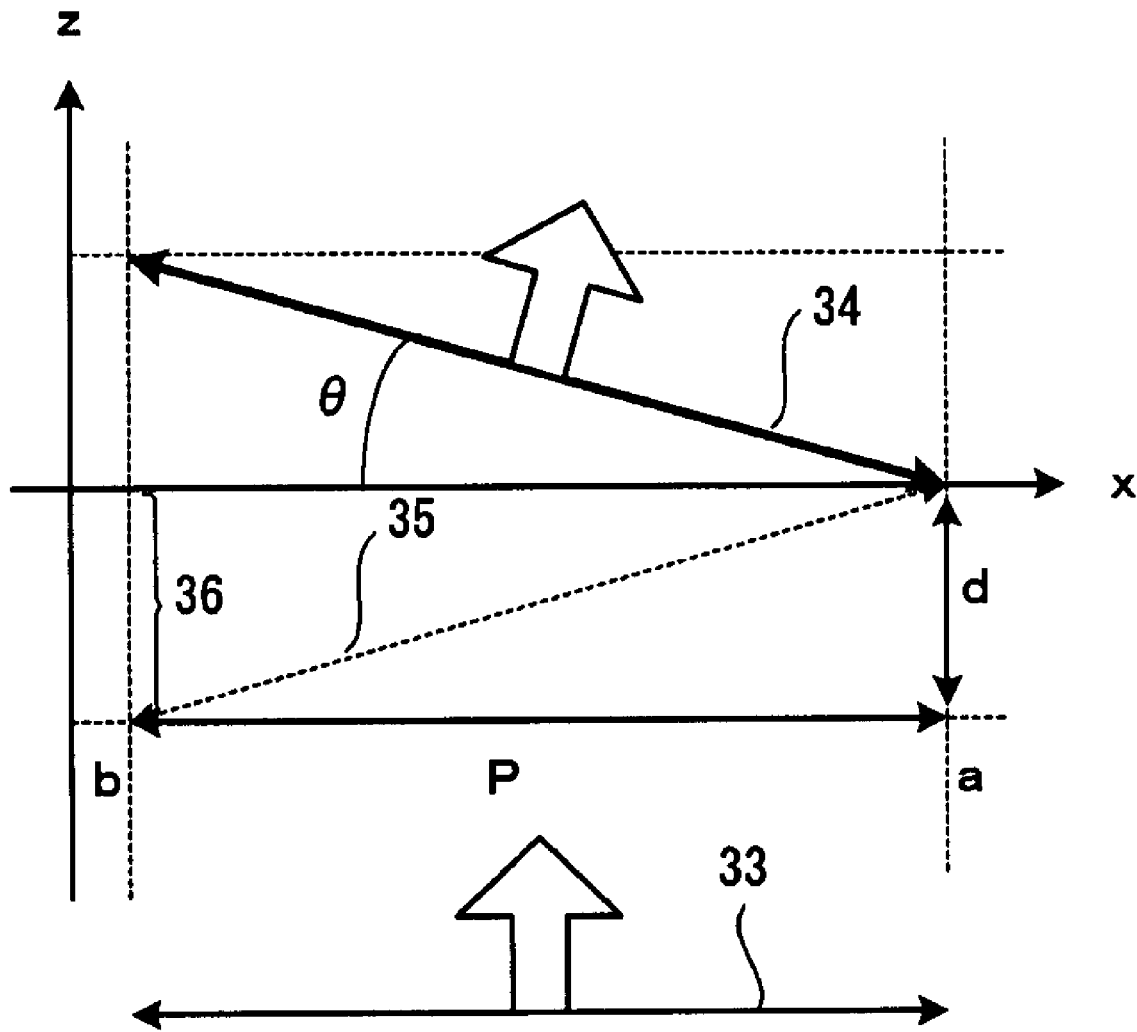
FIG. 25 illustrates a principle of operation of the liquid crystal spatial light modulator module according to the present invention.

With reference to FIG. 25, the phenomenon above will be explained more in detail. FIG. 25 illustrates a principle of operation of the liquid crystal spatial light modulator according to the present invention. In FIG. 25, an output side plane of the nematic liquid crystal layer 36 of the liquid crystal spatial light modulator 31 is assumed as x-y plane, and the liquid crystal is oriented in such a manner as being parallel with x-z plane. In this situation, incident linearly polarized light 33 perpendicularly enters the nematic liquid crystal layer 36. In this nematic liquid crystal layer 36, an operating point is determined in advance, so that the extraordinary refractive index $n_e(x)$ distribution 35, being a function of the position x, linearly changes between "a" and "b", in the distance of the element grating pitch P.

In addition, the thickness "d" of the nematic liquid crystal layer 36 is fixed. However, since the refractive index $n_e(x)$ linearly changes in the distance of pitch P, the incident linearly polarized light 33 propagating through the nematic liquid crystal layer 36 is subjected to modulation of retardation of $\Delta n(x) \cdot d$, being different by position. Here, when no is assumed as an ordinary refractive index of the liquid crystal, the formula of $\Delta n(x)=n_e(x)-n_0$ is established.

When the incident linearly polarized light 33 propagates through the nematic liquid crystal, that is, through a dielectric medium, the light propagates at a low speed in a portion where retardation is large, and on the other hand, in a portion where the retardation is small, the light propagates at a high speed. Therefore, the outgoing linearly polarized light 34 that is outputted from the nematic liquid crystal 36 has a wavefront being inclined only by $\tan\theta=d\Delta n\cdot d/P$.

Here, $d\Delta n$ represents a value of difference of retardation $\Delta n(x)$ between the point "a" and the point "b", the value being obtained by calculating the formula $d\Delta n=\Delta n(a)-\Delta n$.

As thus described, if the extraordinary refractive index $n_e(x)$ distribution 35 in the nematic liquid crystal layer 36 is linearly shaped, the wavefront of the outgoing linearly polarized light 34 also becomes a flat surface similar to the incident linearly polarized light 33. Consequently, the outgoing linearly polarized light 34 can be polarized only by θ relative to the incident linearly polarized light 33.

Figure 26:
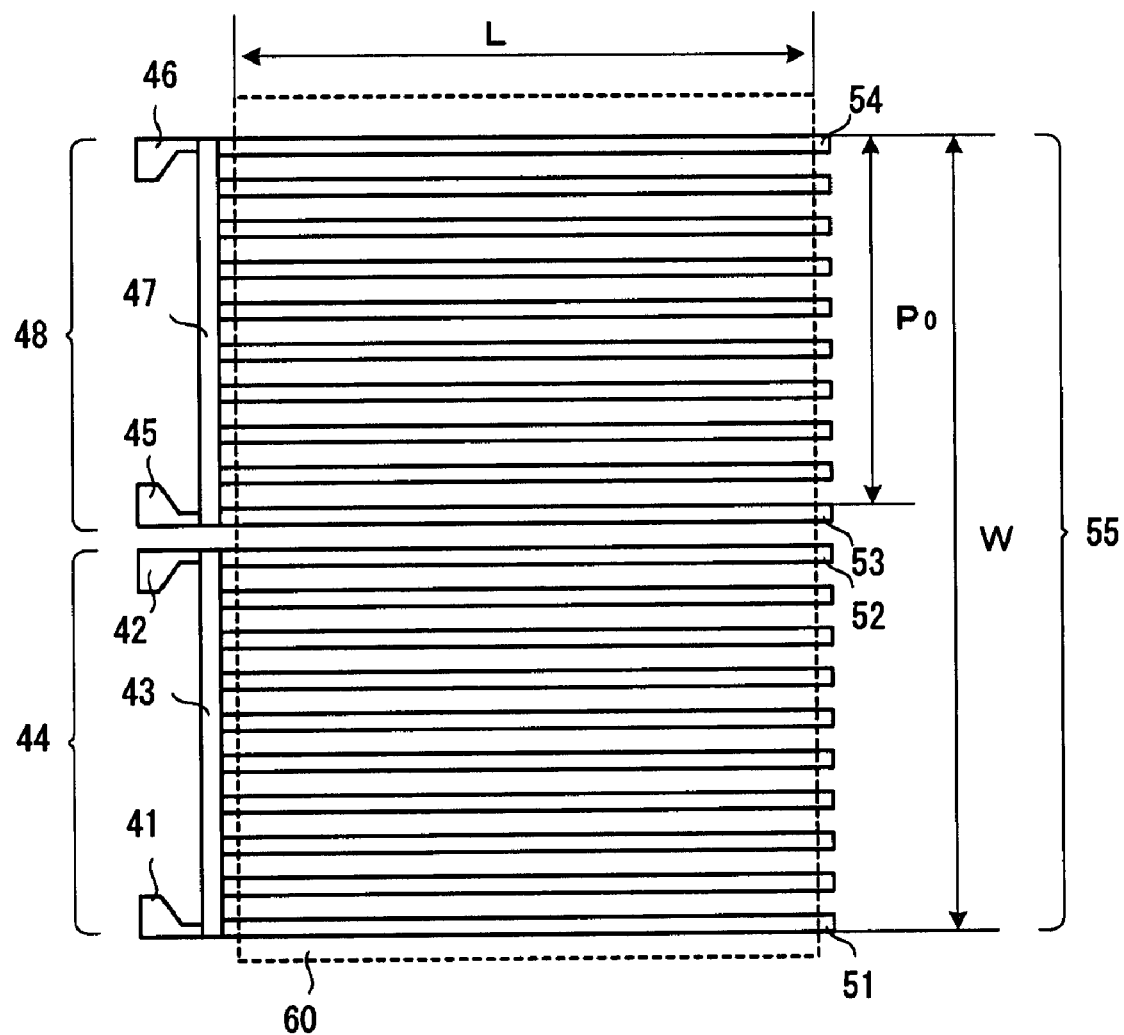
FIG. 26 illustrates a structure of a first composite electrode for forming a brazed diffraction grating of the liquid crystal spatial light modulator 1.

Next, a structure of the composite electrode will be explained, which is provided in the liquid crystal spatial light modulator of the present invention. Here, a structure of the first composite electrode will be explained for forming the brazed refraction grating of the liquid crystal spatial light modulator 1. FIG. 26 is a plan view of the first composite electrode 55 having two refraction gratings; the first element grating 44 and the second element grating 48, in a first active region 60.

In FIG. 26, the first element grating 44 includes individual electrodes; from the first individual electrode 51 to the N-th individual electrode 52. The second element grating 48 includes individual electrodes; from the (N+1)th individual electrode 53 to the 2N-th individual electrode 54. For ease of explanation, it is to be noted that in the first composite electrode 55, it is assumed that N=10 as a matter of convenience. The electrodes from the first individual electrode 51 to the 2N-th individual electrode 54 are made of a transparent conductive film such as ITO, which has the film thickness and the resistance value as described above.

The electrodes from the first individual electrode to the N-th individual electrode 52 are integrated as multiple groups (two groups in FIG. 26), in the outer side of the first active region 60. Then each of the individual electrodes in each of the groups is connected to common collector electrodes made of the same material as the individual electrode, such as ITO. In FIG. 26, the electrodes from the first individual electrode 51 to the N-th individual electrode 52 are connected by the first collector electrode 43 in the outer side of the first active region 60. The electrodes from the (N+1)th individual electrode 53 to the 2N-th individual electrode 54 are connected by the second collector electrode 47 in the similar manner.

Both ends of the first collector electrode 43 are respectively connected to a first signal electrode 41 and a second signal electrode 42, which are made of a low resistance metallic material, such as Mo and Ag alloy. A third signal electrode 45 and a fourth signal electrode 46 are respectively connected to the ends of the second collective electrode 47. It is also possible to configure the collector electrodes not only to have a film with the sheet resistance of hundreds of O to 1 kO, but also to make the film much thinner, or make the electrode width narrower so as to generate linear resistance in the longitudinal direction of the electrode.

As a matter of convenience, FIG. 26 illustrates only two diffraction grating regions; the first element grating 44 and the second element grating 48. However, in an actual liquid crystal spatial light modulator 1, it is necessary to form a predetermined number of element gratings, the number of which is associated with a diameter of beam incident on the first active region 60. As a specific design example where incident light of 850 nm band is used, it is assumed here that the light from a semiconductor laser is converted into parallel light by a collimator, and the parallel light enters the first active region 60.

In the case above, when Gaussian beam diameter of the parallel light is assumed as 300 μm, the width L of the first active region 60 is set to be from 400 μm to 1.5 mm. It is desirable that the individual electrodes of each element grating has line and space being equal to or less than 2 μm, considering a wavelength of the incident light. When the pitch $P_0$ of the element grating is assumed as from 30 μm to 100 μm, it is desirable that the width W of the first composite electrode 55 is approximately from 800 μm to 2 mm. Therefore, when the pitch $p_0$ is assumed as 30 μm, the number of the element gratings is from 27 to 67, and when the pitch $p_0$ is assumed as 100 μm, the number of the element gratings is from 8 to 20.

As is clear from the explanation above, in the liquid crystal spatial light modulator 1 that forms the brazed diffraction grating, even when one diffraction grating area is made up of N individual electrodes, the number of signal electrodes connected to control signals from a driving circuit may be 2M relative to the element grating number (M), by connecting the signal electrodes with both ends of the first collector electrode 43 and the second collector electrode 47. In particular, for the case where the number of the individual electrodes is increased, there is an advantage that the number of signal electrodes can be reduced considerably.

Figure 27:
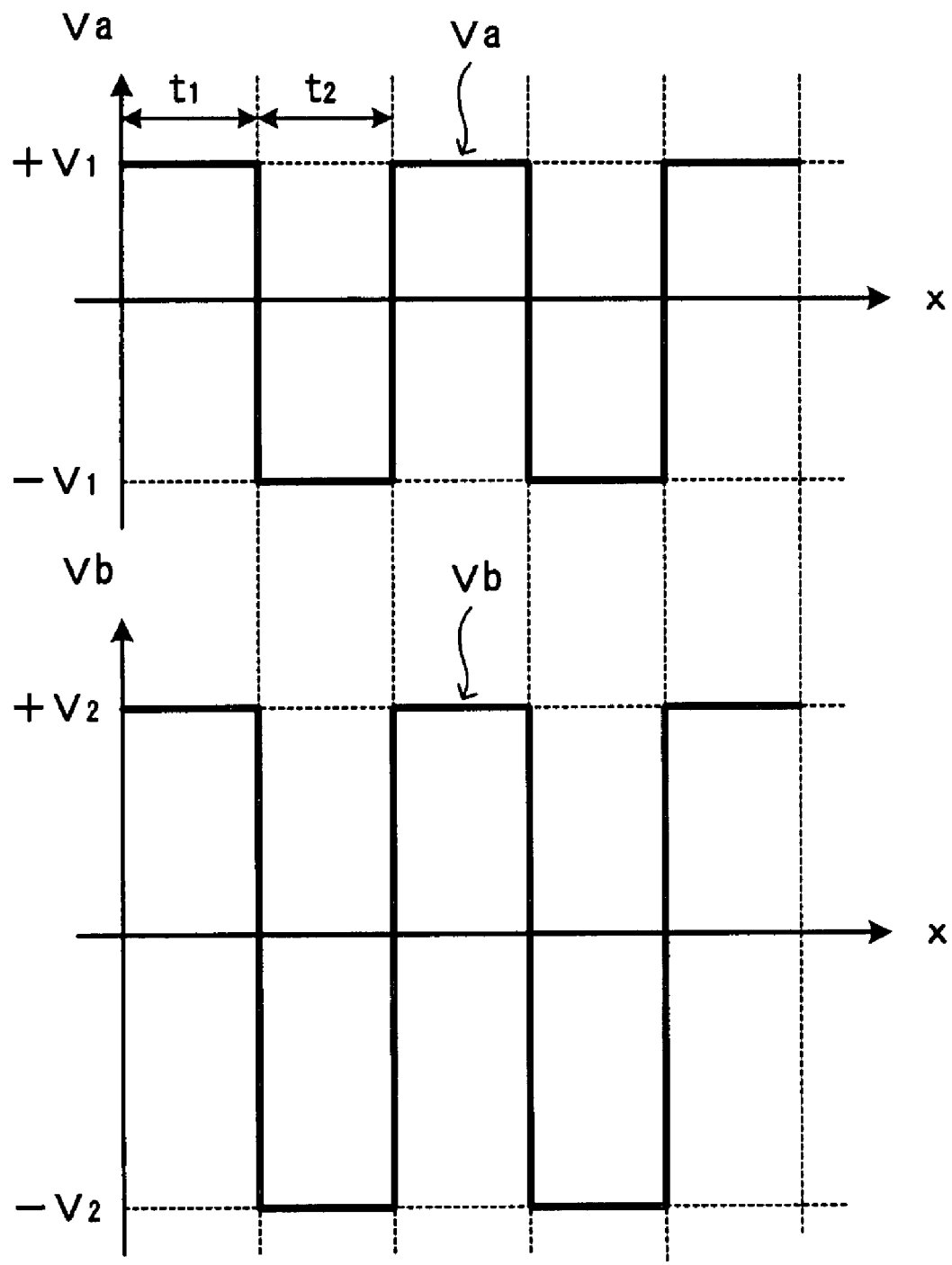
FIG. 27 illustrates a drive method for driving the liquid crystal spatial light modulator having the first composite electrode.

Next, a drive method of the liquid crystal spatial light modulator 1 having the first composite electrode 55 will be explained. Firstly, a part of the first element grating 44 will be explained. FIG. 27 shows drive waveforms. The first drive waveform Va is applied to the first signal electrode 41, and the second drive waveform Vb is applied to the second signal electrode 42. Frequency and phase of the first drive waveform Va and the second drive waveform Vb are equivalent, and only the voltage is different. Voltage of the second drive waveform Vb is set to be larger than that of the first drive waveform Va.

In the period t1, the first drive waveform Va is $+V_1$ [V], and the second drive waveform Vb is $+V_2$ [V]. Here, the common electrode 1G is assumed as 0[V]. Since the electric potential is divided by the first collector electrode 43 made of a linear resistor material such as a transparent conductive film, the voltage applied each of the first signal electrode 41 and the second signal electrode 42 is divided linearly according to arranged positions, into the individual electrodes of the first element grating 44 formed in the first active region 60. Since the individual electrodes are made of a lower resistor material relative to the impedance of the nematic liquid crystal layer 36, it is possible to render the individual electrodes to have the same electric potential in the longitudinal direction. If necessary, a period for applying the bias alternating voltage to the common electrode 1G may be provided separately, such as period 1 and period 2.

Next, an electric potential gradient according to the collector electrode will be explained. A relationship between the electric potential gradient of the first collector electrode 43 and the electric potential of each of the individual electrodes in the first composite electrode 55 (FIG. 26) will be explained in detail. In the period t1 as shown in FIG. 27, the electric potential distribution of the collector electrode 43 that connects the first signal electrode 41 and the second signal electrode 42 may correspond to the linearly shaped electric potential distribution as indicated by the first electric potential distribution Vc in FIG. 28. In the period t2 as shown in FIG.

Figure 28:
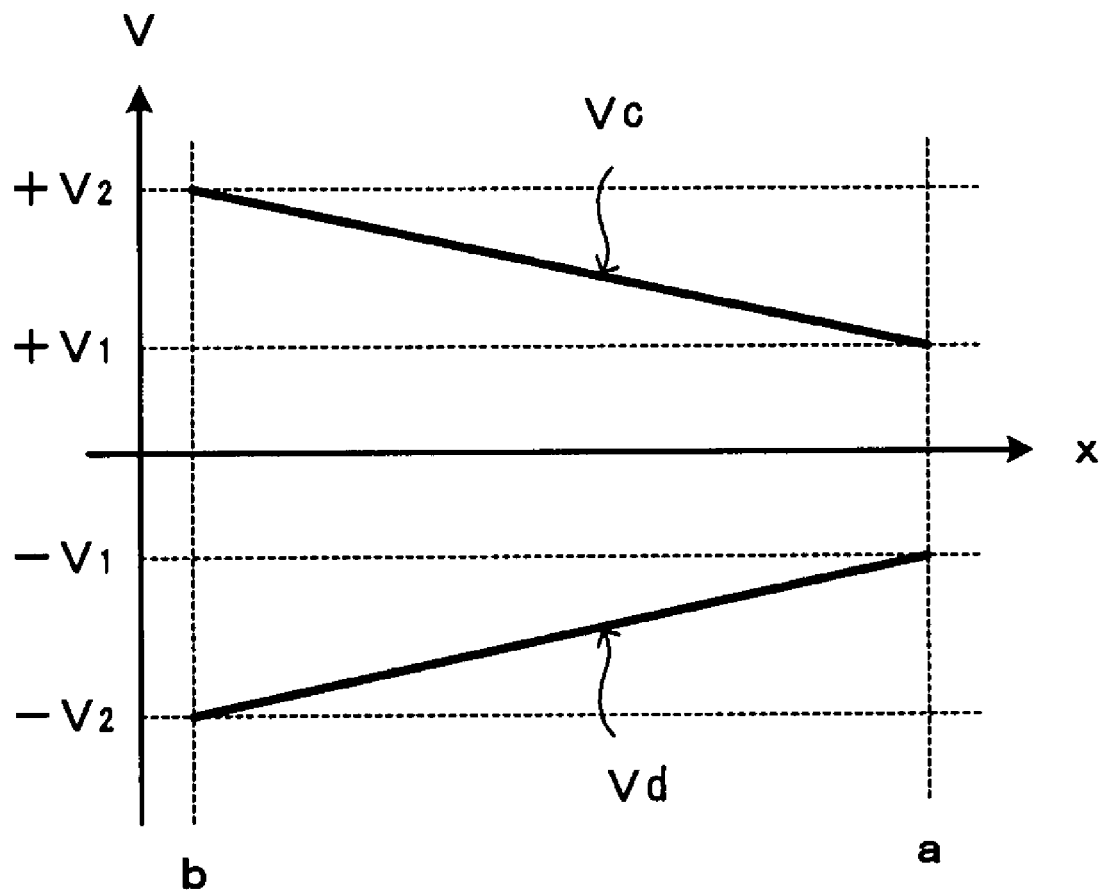
FIG. 28 illustrates an electric potential distribution of the first collector electrode.

27, the electric potential distribution of the first collector electrode 43 may correspond to the electric potential distribution as indicated by the second electric potential distribution Vd in FIG. 28.

Here, in FIG. 28, the point "a" corresponds to the individual electrode position that is connected to the first signal electrode 41, and the point "b" corresponds to the individual electrode position that is connected to the second signal electrode 42. If the drive waveform as shown in FIG. 27 corresponds to rectangular waves of 50% duty cycle, two electric potential distributions, the first and the second electric potential distributions Vc and Vd are repeated alternately in time wise. Therefore, the voltage applied to the nematic liquid crystal layer 36 via the common electrode 1G which holds 0[V] is alternated at any individual electrode position, and no DC component are added to the nematic liquid crystal layer 36. Since the nematic liquid crystal is RMS responding, it is possible to assume that on the first signal electrode 41 side, voltage $V_1$ [V] is applied constantly as the root mean square (RMS) value, voltage $V_2$ [V] is applied to the second signal electrode 42, and the electric potential divided in the first collector electrode 43 is applied to each of the individual electrodes.

Figure 29:
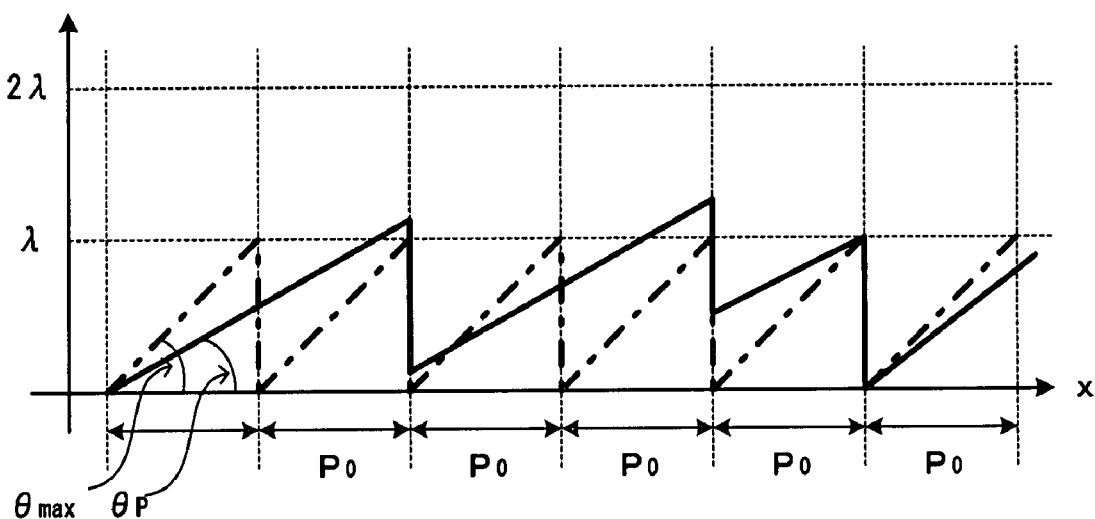
FIG. 29 is a schematic view of a phase distribution of the liquid crystal spatial light modulator according to the present invention.

FIG. 29 is a schematic block diagram showing a phase distribution of the liquid crystal spatial light modulator according to the present invention. Here, the pitch of element grating is defined as $P_0$, and the maximum deflection angle θmax is defined as tan θmax=λ/$P_0$. When the angle is θmax in the case above, which is indicated by the phase modulation curve (alternate long and short dash line), the maximum phase modulation amount may correspond to one waveform in the distance of the pitch $P_0$ of the element grating, i.e., 2p. In the case of the first composite electrode 55, the positions of the first and the second signal electrodes 41 and 42 are determined in advance. Therefore, it is impossible to perform resetting just by 2p at an arbitrary position to change the phase. In order to perform the resetting at a predetermined position, angle $\theta_p$ is considered without occurrence of higher-order light, the angle being a little smaller than θmax. On this occasion, for the phase modulation curve of $\theta_p$ (solid line), it is necessary to perform the resetting in the range from λ to 2λ. As thus described, when the first composite electrode 55 is used, it is possible to employ a drive method that performs the resetting for each element grating which has the phase modulation amount falling in the range equal to or larger than λ and smaller than 2λ, among the predetermined element gratings.

Another drive method of the liquid crystal spatial light modulator 1 provided with the first composite electrode 55 will be explained.

Figure 30:
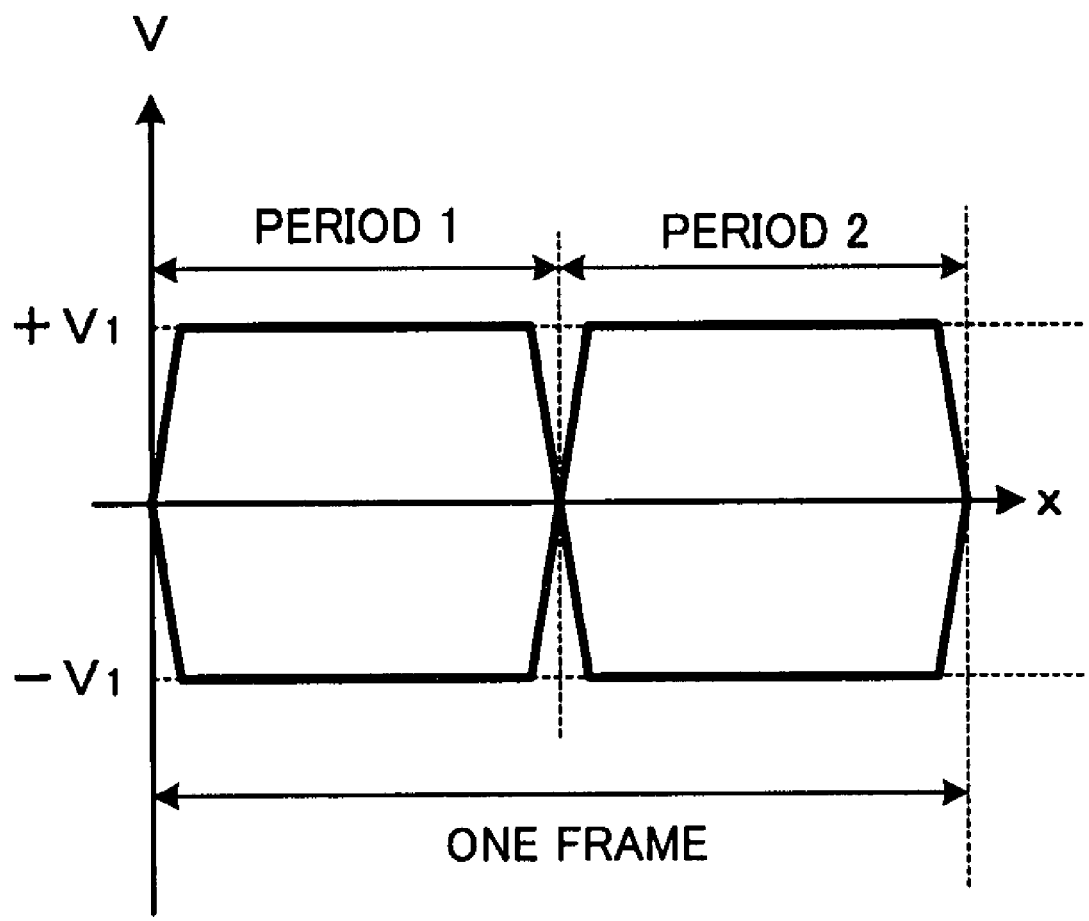
FIG. 30 illustrates a period for applying a waveform to signal electrode terminals arranged in one element grating.

FIG. 30 illustrates a period for applying a waveform to signal electrode terminals which are placed on one element grating. In this drive method, driving is performed by dividing one frame into period 1 and period 2. Specifically, in order to prevent deterioration of the nematic liquid crystal layer 36, driving is performed by providing the period 1 and the period 2 alternately, under the following conditions; in the period 1, a driving signal of alternate voltage with a mean value of 0 is applied to the first signal electrode 41 and the second signal electrode 42 is set to be 0[V] so that the second signal electrode 42 has the same electric potential as the common electrode 1G, and in the period 2, a driving signal of alternate voltage is applied to the second signal electrode 42, and the first signal electrode 41 is set to be 0[V] so that the first signal electrode 41 has the same electric potential as the common electrode 1G.

With the drive method as described above, a liquid crystal electric potential distribution generated in the element grating during one frame totalizing the period 1 and the period 2, may take values close to the root mean square (RMS) values of each of the periods. The waveforms applied in the period 1 and period 2 may be optional, and two waveforms different in amplitude may be applied, for instance. Another waveform may be applicable, in which the root mean square (RMS) values are controlled by the pulse width modulation. Furthermore, a bias alternate voltage may be applied to the common electrode, if necessary.

Next, with reference to FIG. 31, another structure of the composite electrode to form a brazed diffraction grating will be explained in detail. In addition to the structure of the first composite electrode 55 as described above (FIG. 26), the second composite electrode 95 employs a structure in which collector electrodes are disposed at both ends of multiple individual electrodes in the outer side of the first active region 60.

Figure 31:
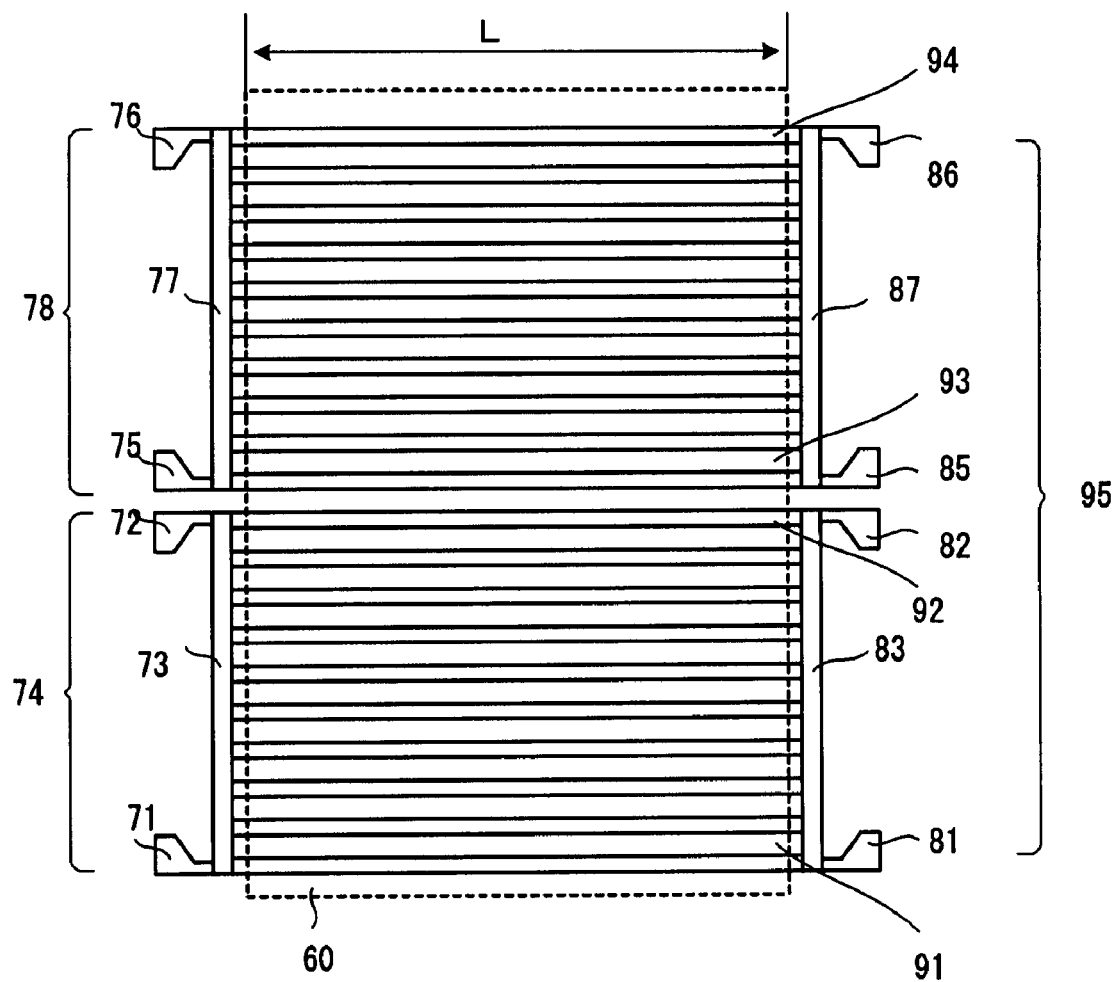
FIG. 31 illustrates another structure of the composite electrode to form a brazed diffraction grating.

In FIG. 31, a third collector electrode 83 is disposed at a position opposed to the first collector electrode 73 in the outer side of the first active region 60. A fourth collector electrode 87 is disposed at a position opposed to the second collector electrode 77 in the outer side of the first active region 60. Furthermore, the third collector electrode 83 is connected to a fifth signal electrode 81 and a sixth signal electrode 82, which are made of a low resistor metallic material such as Mo and Ag alloy, and the fourth collector electrode 87 is connected to the seventh signal electrode 85 and the eighth signal electrode 86.

In the structure of the second composite electrode 95, following pairs of signal electrodes; the first signal electrode 71 and the fifth signal electrode 81, the second signal electrode 72 and the sixth signal electrode 82, the third signal electrode 75 and the seventh signal electrode 85, and the fourth signal electrode 76 and the eighth signal electrode 86, are short circuited and driven in the outer side. It is to be noted that the drive method as explained above can be applied, without any change, as the drive method of a light deflector employing the second composite electrode 95.

The structure of the second composite electrode 95 as shown in FIG. 31 is effective in particular when the impedance of the individual electrodes becomes considerably large, relative to the impedance at the drive frequency of the nematic liquid crystal layer, in such a case that the individual electrodes are made thinner and elongated.

Figure 32:
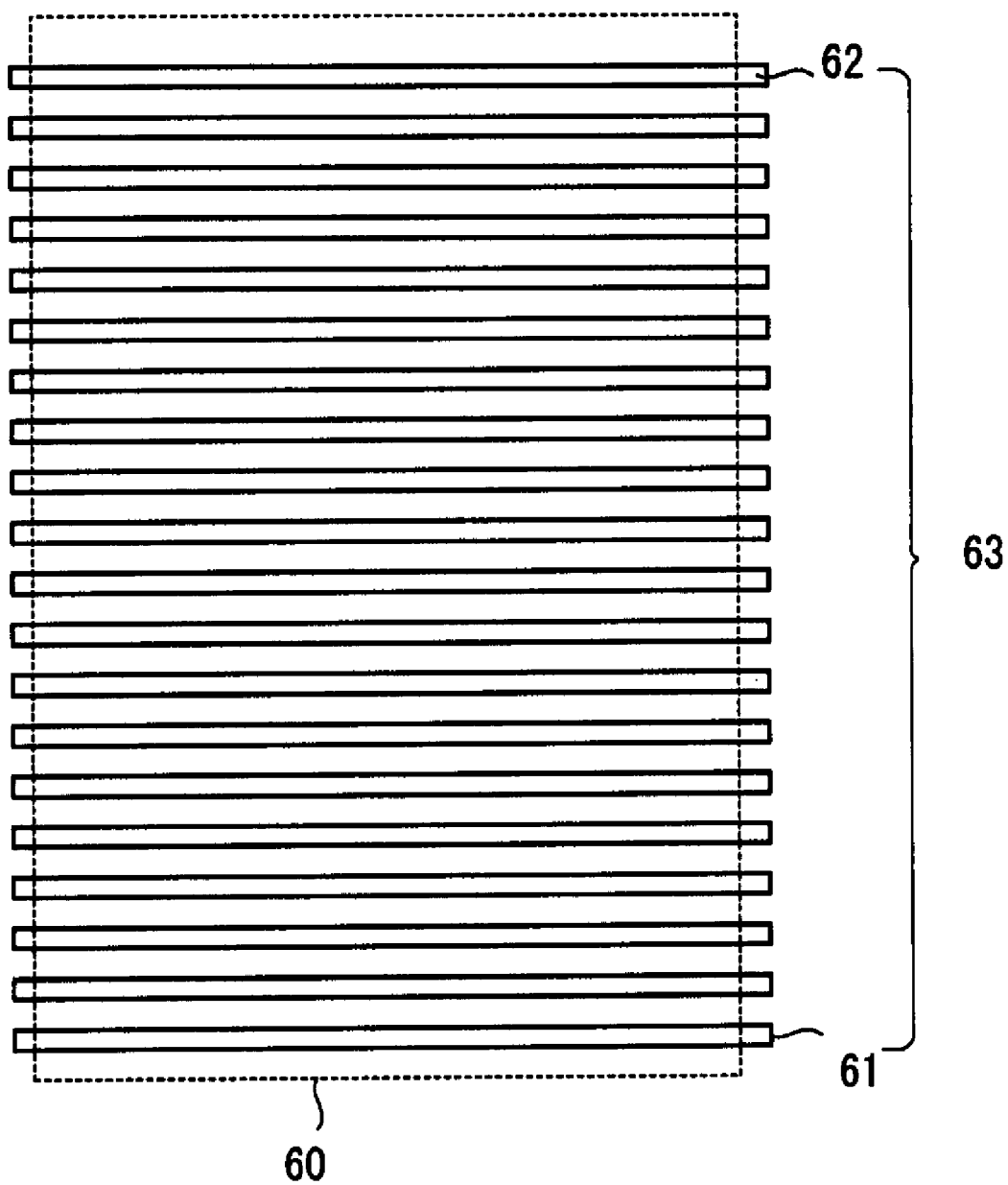
FIG. 32 is a plan view showing a relationship between a first active region and a third composite electrode for implementing the brazed diffraction grating.

Next, a third composite electrode 63 will be explained, which is another configuration particularly effective in the case where high-speed response is required. FIG. 32 is a plan view showing a relationship between the first active region 60 and the third composite electrode 63 for implementing the brazed diffraction grating. In FIG. 32, the individual electrodes from the first individual electrode 61 to the N-th individual electrode 62 form the third composite electrode 63, here assuming N=20 for the convenience, the individual electrodes being made of a transparent conductive film such as ITO.

In order to implement the brazed diffraction grating for performing optical deflection in the first active area 60, it is necessary to apply a predetermined voltage to each of the individual electrodes 61 to 62 of the third composite electrode 63. As an application means of a voltage pattern, the first individual electrode 61 to the N-th individual electrode 62 are formed separately as shown in FIG. 32, these individual electrodes are driven independently by a drive circuit such as an 1C, thereby generating electric potential differences in stages in the individual electrodes, respectively.

Figure 33:
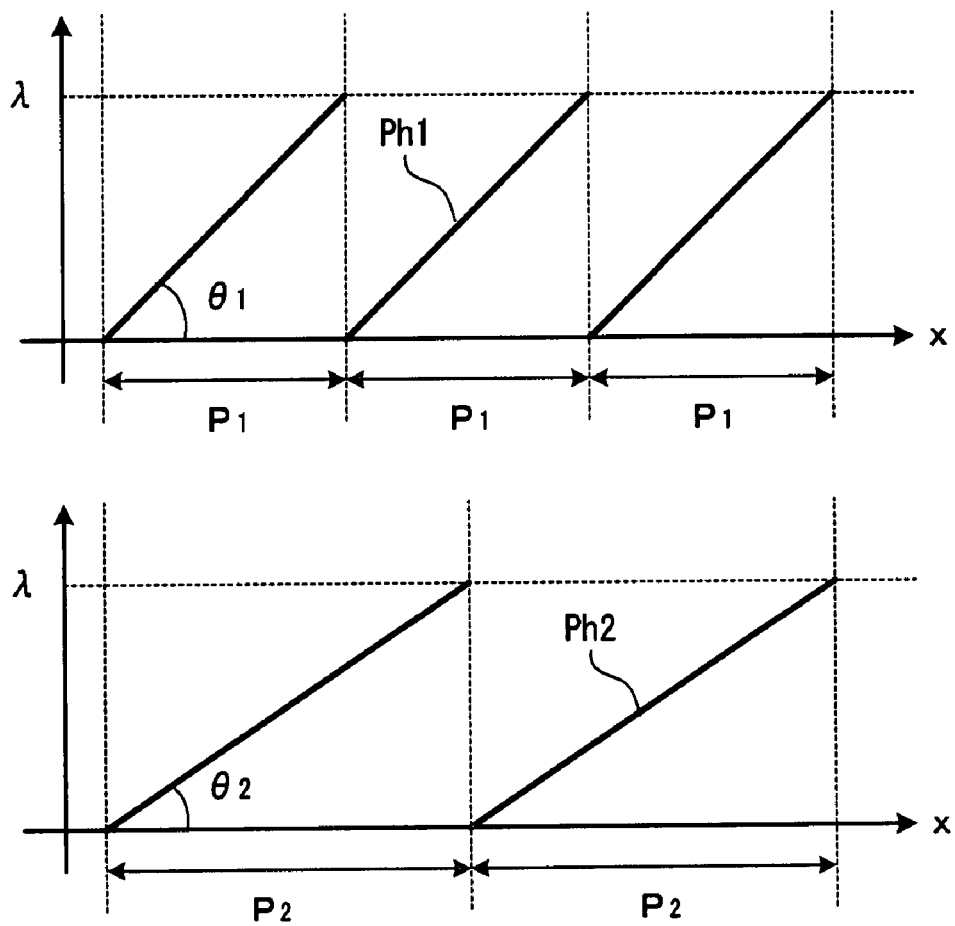
FIG. 33 illustrates a method for establishing an arbitrary deflection angle.

With reference to FIG. 33, a method for implementing an arbitrary deflection angle will be explained, by using the liquid crystal spatial light modulator 1 which employs the third composite electrode 63 described above. In the third composite electrode 63, it is possible to apply an arbitrary voltage to each of the individual electrodes independently, directly by the drive circuit. Therefore, if the modulation is possible up to 2p (one wavelength) at the minimum, any deflection angle can be obtained. For example, when a voltage for implementing a first phase modulation waveform Ph1 in the first active region 60 is applied to each of the individual electrodes, the deflection angle $\theta_1$ takes a value, which is given by the formula tan $\theta_1=\lambda/P_1$. It is to be noted that $\lambda$ indicates a relative phase difference associated with one waveform.

Here, the x-axis direction is assumed as a direction orthogonal to the individual electrode. With this configuration, in the distance of pitch $P_1$ integrating a certain individual electrodes, the phase is reset by the amount of one wavelength, thereby allowing the diffraction efficiency to be approximated to 100%.

Next, when a voltage for implementing a second phase modulation waveform Ph2 in the first active region 60 is applied to each of the individual electrodes, the deflection angle $\theta_2$ takes a value, which is given by the formula tan $\theta_2=\lambda/P_2$. As thus described, by changing a predetermined pitch $P_1$ for resetting the phase, any deflection angle $\theta$ can be easily achieved.

Next, with reference to FIG. 34, an explanation will be made regarding a configuration example to which the liquid crystal spatial light modulator module according to the present invention is applied to an optical clock multiplier.

Figure 34:
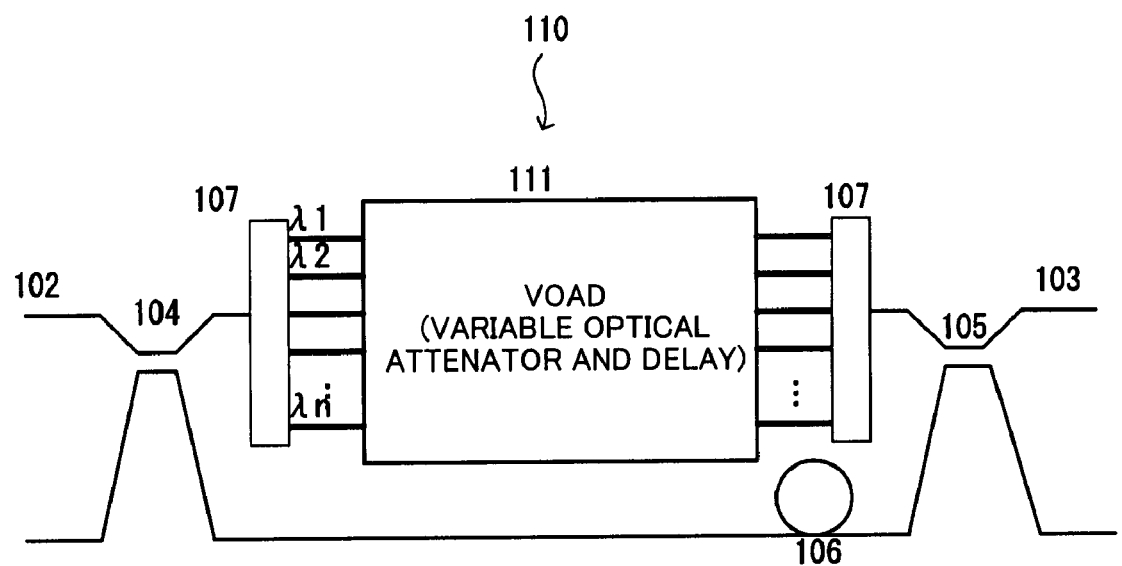
FIG. 34 illustrates a configuration example in which the liquid crystal spatial light modulator module of the present invention is applied to an optical clock multiplier.
Figure 36:
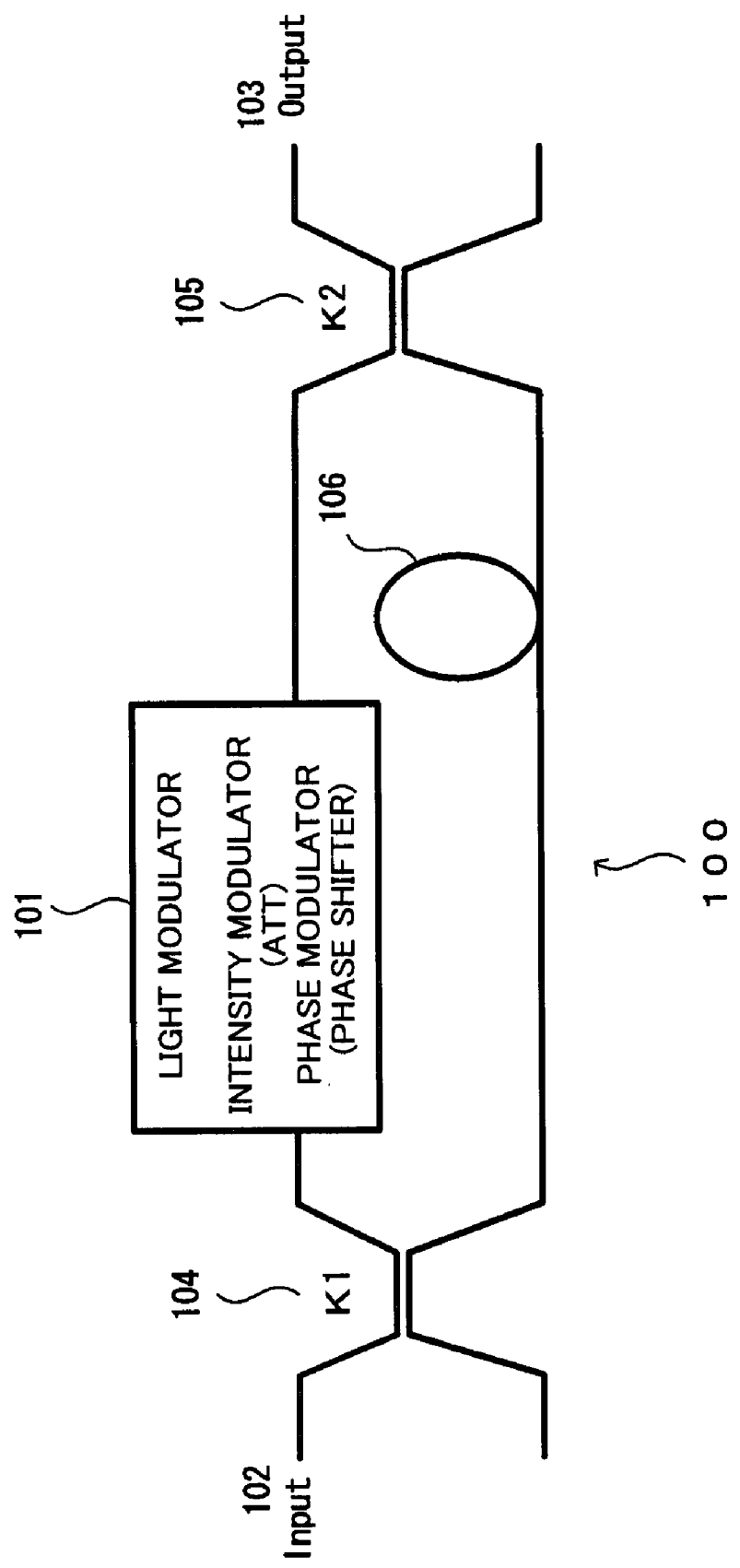
FIG. 36 illustrates a configuration example for implementing an optical time division multiplexing.
Figure 37A:
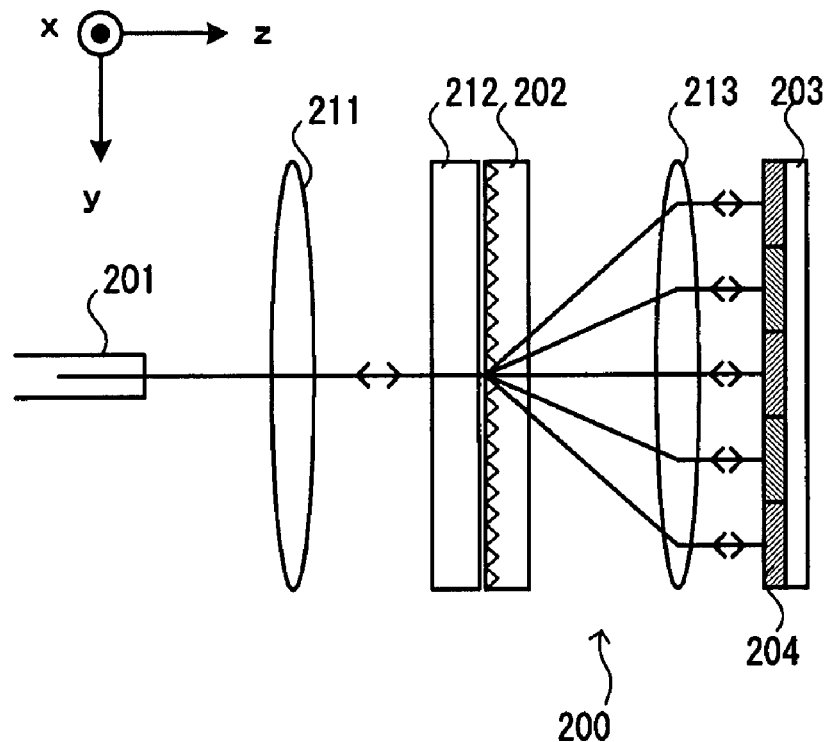
FIG. 37 illustrates examples of a spatial light modulator module that employs a liquid crystal element.
Figure 37B:
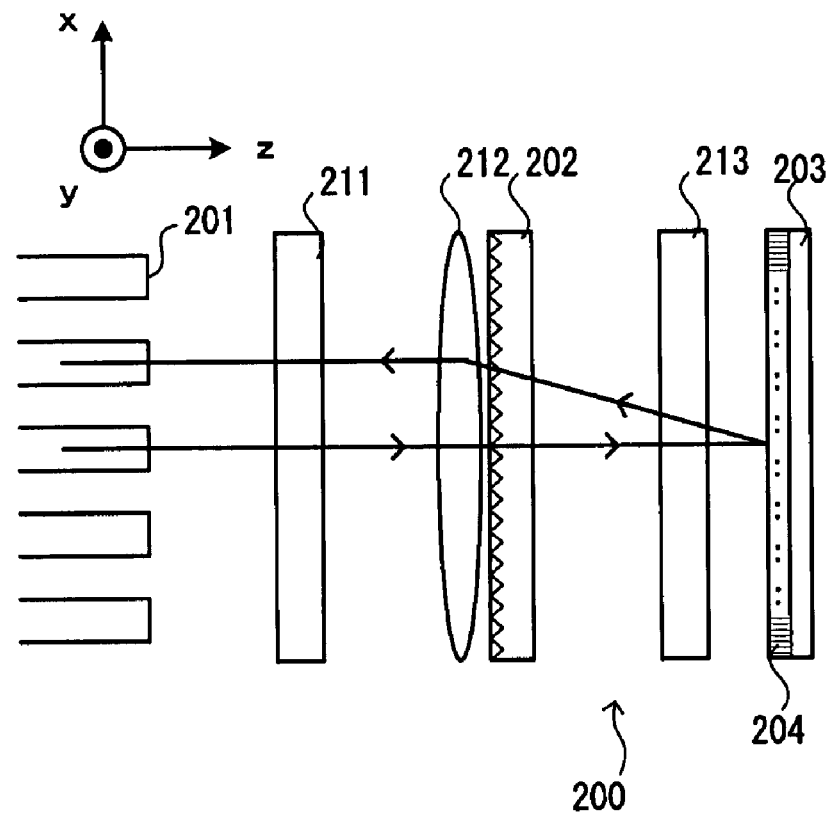
Figure 38:
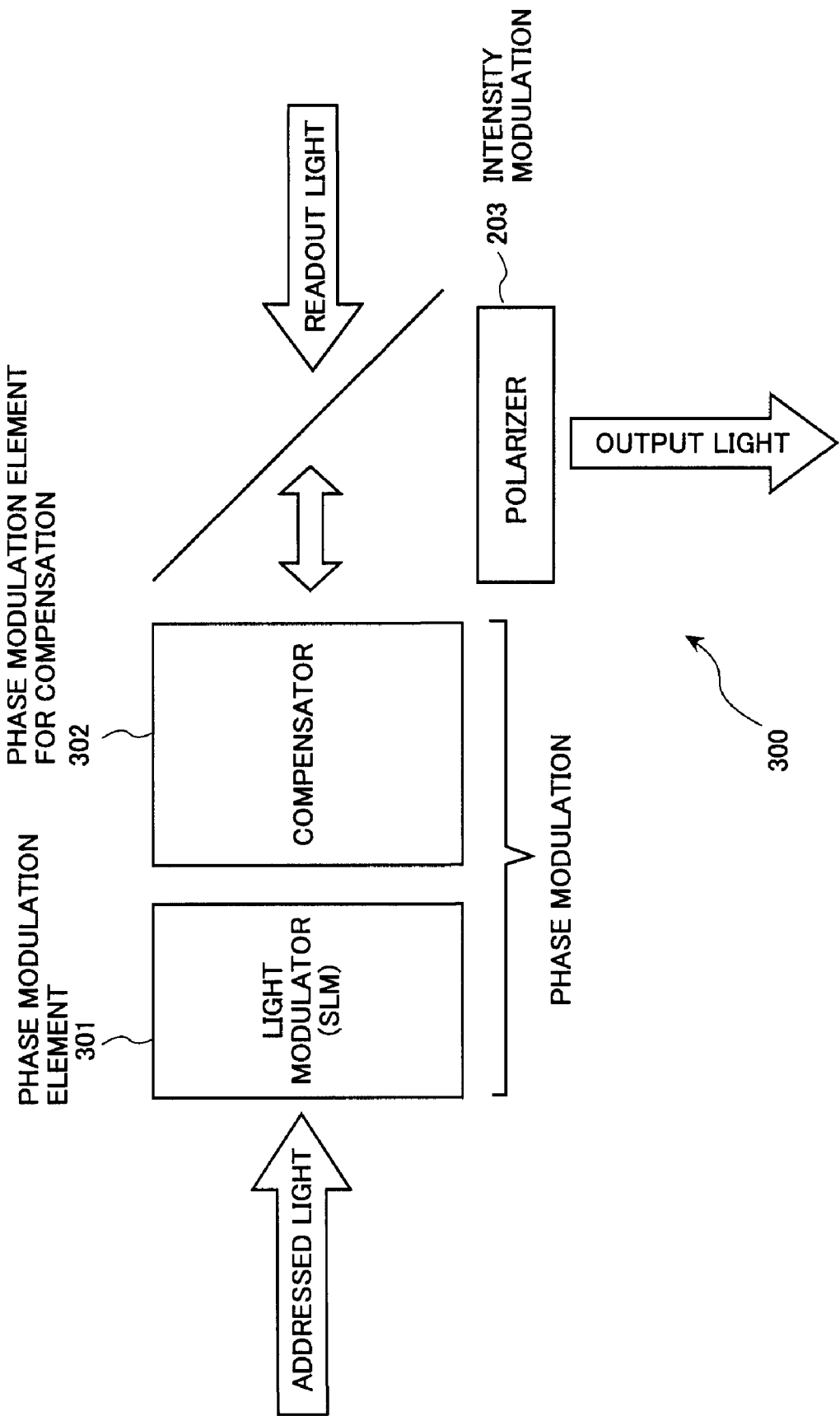
FIG. 38 is a schematic view for explaining a configuration example of an optically addressed spatial light modulator.

In FIG. 34, VOAD (Variable Optical Attenuator and Delay) 111 is configured using the liquid crystal spatial light modulator module of the present invention, which performs light intensity modulation, phase modulation, and spectral decomposition, thereby constituting an optical clock multiplier.

The optical clock multiplier 110 is provided with an input port 102 and an output port 103, and an optical signal inputted from the input port 102 is separated by an optical coupler/spectrometer 104. One optical signal being separated is modulated by the VOAD 111, the other optical signal is passed through a fixed delay element 106 in which a delay time is fixed, and both optical signals are coupled by the optical coupler/spectrometer 105. An optical clock is multiplied by a certain phase difference which is set between the optical signal outputted from the optical coupler/spectrometer 104, and the optical signal outputted from the fixed delay element 106, and the optical signal obtained by coupling in the optical coupler/spectrometer 105 is outputted from the output port 103.

The VOAD 111 performs the light intensity modulation and the phase modulation independently for each wavelength, and accordingly, the optical clock multiplier 110 offers peak equalizing and phase compensation allowing the optical clock to be multiplied, which serves as a signal carrier wave with respect to each wavelength.

FIG. 35 shows diagrams to explain the light intensity modulation and the phase modulation performed by the VOAD 111. FIG. 35A to FIG. 35C illustrate that two optical signals to perform the optical clock multiplication are under a favorable condition, and the light intensity is equivalent and a phase relationship shows a state of equivalent phase difference.

FIG. 35D to FIG. 35G illustrate that light intensity is adjusted by the light intensity modulation, when the light intensity is inhomogeneous. Here, it is shown that an optical signal is multiplied by using the optical signal as shown in FIG. 35D and the optical signal as shown in FIG. 35E. On this occasion, if the light intensity of the optical signal as shown in FIG. 35E is lower than the light intensity of the optical signal as shown in FIG. 35D, the light intensity of the optical signal being multiplied becomes inhomogeneous as shown in FIG. 35F, when the two optical signals are coupled.

In view of the situation above, the VOAD 111 attenuates the light intensity of the optical signal as shown in FIG. 35D to adjust it to have the same light intensity as the optical signal as shown in FIG. 35E, thereby forming a multiplied optical signal having homogeneous light intensity as shown in FIG. 35G.

FIG. 35H to FIG. 35K illustrate that a phase relationship is adjusted by the phase modulation, when the phase is shifted. Here, it is shown that an optical signal is multiplied by using the optical signal as shown in FIG. 35H and the optical signal as shown in FIG. 35I. On this occasion, if the phase of the optical signal as shown in FIG. 35I is shifted from the phase of the optical signal as shown in FIG. 35H, the phase interval of the optical signal being multiplied becomes inhomogeneous as shown in FIG. 35J, when the two optical signals are coupled.

In view of the situation above, the VOAD 111 shifts the phase of the optical signal as shown in FIG. 35H to adjust the phase interval relative to the phase of the optical signal as shown in FIG. 35I, thereby forming a multiplied optical signal that has a homogeneous phase interval as shown in FIG. 35K.

FIG. 34 and FIG. 35 illustrate an example of optical clock multiplier for producing a carrier wave, which generates a double bit rate at one stage. This configuration is applicable for the peak equalizing and phase adjustment of the optical clock multiplier having an arbitrary phase delay, by setting a certain delay time in the fixed delay element 106. It should be understood that the configuration of the present invention is also applicable even in the following cases; the optical clock multiplier is connected by cascade connection or parallel connection, or an optical amplifier or a signal modulator is inserted on the path.

In the description above, preferred embodiments of the liquid crystal spatial light modulator module according to the present invention have been discussed. However, the liquid crystal spatial light modulator module of the present invention is not limited to the above embodiments, and it should be understood that various modifications are available within the scope of the invention.

What is claimed is:

1. A liquid crystal spatial light modulator comprising,
   a first substrate having multiple individual electrodes,
   a second substrate having a common electrode,
   a driving circuit driving the individual electrodes, and
   a liquid crystal layer held between the first substrate and the second substrate,
   the liquid crystal spatial light modulator performing spatial light modulation by applying a predetermined voltage to each of the individual electrodes formed on the first substrate in order to modulate a refractive index of the liquid crystal layer, wherein,
   the electrodes formed on the first substrate are segmented into multiple regions including at least a first region and a second region, a mode for applying voltage in one region is made different from another, a wavefront direction is changed in the first region to adjust an optical coupling coefficient on an output side, so as to perform intensity modulation, and light is subjected to phase modulation in the second region, thereby achieving both the intensity modulation and the phase modulation, using only one element, and wherein, gradient voltage is applied to the first region, and according to the application of the gradient voltage, a gradient is formed in an effective phase difference within the liquid crystal layer of the first region, and according to the gradient in the effective phase difference, the phase of the outgoing light being outputted from the light outputting surface is shifted, thereby adjusting a traveling direction of the outgoing light and adjusting an optical coupling coefficient, so as to perform the intensity modulation, and a predetermined constant voltage is applied to all over the second region, and with the application of the constant voltage, an effective phase difference is formed within the liquid crystal layer of the second region, and according to the effective phase difference, the phase of the outgoing light outputted from the light outputting surface is adjusted homogeneously within the region, so as to perform the phase modulation of the outgoing light.

2. The liquid crystal spatial light modulator according to claim 1, wherein,
as to a maximum phase difference $\phi max$ of the effective phase difference and a maximum usable light wavelength $\lambda max$ being subjected to the spatial light modulation, there is a relationship of $\phi max \geq 2\pi$.

3. The liquid crystal spatial light modulator according to claim 2, wherein,
as to a thickness dmax of the liquid crystal layer, there is a relationship of $dmax > \lambda max/\Delta nmax$ (where $\Delta nmax$ represents a maximum effective birefringence of liquid crystal, and $\lambda max$ represents the maximum usable light wavelength).

4. A liquid crystal spatial light modulator comprising,
a first substrate having multiple individual electrodes,
a second substrate having a common electrode,
an driving circuit driving the individual electrodes, and
a liquid crystal layer held between the first substrate and the second substrate,
the liquid crystal spatial light modulator performing spatial light modulation by applying a predetermined voltage to each of the individual electrodes formed on the first substrate in order to modulate a refractive index of the liquid crystal layer, wherein,
as to a thickness d of the liquid crystal layer, there is a relationship of $m\lambda max/\Delta nmax < d$ (where $\Delta nmax$ represents a maximum effective birefringence of liquid crystal, $\lambda max$ represents a maximum usable light wavelength, and a value m is integer),
a voltage obtained by adding a bias voltage being a constant voltage to a gradient voltage, is applied to the electrodes formed on the first substrate,
a gradient is formed in an effective phase difference within the liquid crystal layer by the application of the gradient voltage, the phase of outgoing light outputted from the light output surface is shifted within the region according to the gradient of the effective phase difference, and a wavefront direction is changed, thereby adjusting an optical coupling coefficient on the output side to perform intensity modulation,
the bias voltage being a predetermined constant voltage is applied to form a constant effective phase difference within the liquid crystal layer,
the phase of the outgoing light outputted from the light output surface is adjusted homogeneously within the region according to the constant effective phase difference, thereby performing phase modulation of the outgoing light, and then both the intensity modulation and the phase modulation are performed, using only one element.

5. The liquid crystal spatial light modulator according to claim 1, wherein, one-dimensional array is taken for arranging the multiple individual electrodes in an array direction of the region, or two-dimensional array is taken for arranging the multiple individual electrodes in a first array direction of the region and in a second array direction being orthogonal to the first array direction.

6. A liquid crystal spatial light modulator module comprising,
an input port for inputting incident light,
an output port for outputting outgoing light,
the liquid crystal spatial light modulator according to claim 1,
a first collimator for inputting the incident light from the input port into the liquid crystal spatial light modulator in a form of a parallel light, and
a second collimator for coupling the light from the liquid crystal spatial light modulator and outputting the coupled light in a form of parallel light to the output port.

7. The liquid crystal spatial light modulator module according to claim 6, wherein,
an optical fiber constitutes at least one of the first collimator and the second collimator.

8. The liquid crystal spatial light modulator module according to claim 6, wherein, a first polarization converting element is provided between the first collimator and the liquid crystal spatial light modulator, for converting one polarization direction by 90 degrees, and a second polarization converting element is provided between the liquid crystal modulation element and the second collimator, for resuming the polarization direction being converted.

9. The liquid crystal spatial light modulator module according to claim 6, wherein, a first polarization converting element is provided between the input port and the first collimator, for converting one polarization direction by 90 degrees, and a second polarization converting element is provided between the second collimator and the output port, for resuming the polarization direction being converted.

10. The liquid crystal spatial light modulator module according to claim 6, wherein, the number of the second collimator being provided is more than one.

11. The liquid crystal spatial light modulator module according to claim 10, wherein, the first collimator and the second collimator are Thermally-diffused Expanded Core (TEC) fibers.

12. The liquid crystal spatial light modulator module according to claim 10, wherein, the first collimator and the second collimator are glass lenses directly fusion-bonded to the optical fibers.

13. The liquid crystal spatial light modulator module according to claim 6, wherein, multiple optical fibers are provided instead of the second collimator.

14. The liquid crystal spatial light modulator module according to claim 13, wherein, at least a part of the first substrate or the second substrate is bonded to and fixed on a thermoelectric conversion element by using metal or resin, and when voltage of an identical profile is applied, a wavelength-converted phase fluctuation of the liquid crystal layer, caused by environmental temperature variation, is controlled to be equal to or less than $\lambda/10$ of the maximum usable light wavelength.

15. The liquid crystal spatial light modulator module according to claim 6, wherein, a spectrometer is provided on an optical path in front of or in the rear of the liquid crystal spatial light modulator and the spatial light modulation can be performed with respect to each wavelength that is spectrally distributed by the spectrometer.

16. The liquid crystal spatial light modulator module according to claim 15, wherein, multiple individual electrodes are arranged in a two-dimensional array where the electrodes are arranged in a first array direction of the region and in a second array direction being orthogonal to the first array direction, and a wavelength spectrally distributed by the spectrometer is allowed to enter the second array direction.

17. A method for driving the liquid crystal spatial light modulator according to claim 1, wherein, multiple individual electrodes are integrated into multiple groups, the individual electrodes within each of the groups are connected by a collector electrode being common, both ends of the collector electrode being connected to a pair of signal electrodes, respectively, in the group associated with the first region, drive waveforms of voltage being different from each other are applied to the pair of the signal electrodes, respectively, thereby forming a gradient voltage in the first region, and in the group associated with the second region, a drive waveform of identical voltage is applied to the pair of the signal electrodes, thereby applying a predetermined constant voltage to the second region.

18. A method for driving the liquid crystal spatial light modulator according to claim 4, wherein, multiple individual electrodes are integrated into multiple groups, multiple individual electrodes within each of the groups are connected by a collector electrode being common, and both ends of the collector electrode are connected to a pair of signal electrodes, respectively, and a bias voltage of a constant voltage is added to drive waveforms of voltage being different respectively for the pair of the signal electrodes, thereby forming a gradient potential on a constant electric potential.

* * * * *